United States Patent [19]
Misaka

[11] Patent Number: 6,147,810
[45] Date of Patent: Nov. 14, 2000

[54] ZOOM LENS HAVING FOCUSING SUBUNIT IN SECOND LENS UNIT AND OPTICAL APPARATUS EQUIPPED WITH THE SAME

[75] Inventor: Makoto Misaka, Yokohama, Japan

[73] Assignee: Canon Kabushiki Kaisha, Tokyo, Japan

[21] Appl. No.: 09/086,306

[22] Filed: May 27, 1998

[30] Foreign Application Priority Data

May 30, 1997 [JP] Japan ................................. 9-141825
May 20, 1998 [JP] Japan ................................ 10-138251

[51] Int. Cl.⁷ ................................................. G02B 15/14
[52] U.S. Cl. ....................... 359/684; 359/683; 359/688; 359/690
[58] Field of Search ................................. 359/684, 686, 359/687, 683, 688, 689, 690

[56] References Cited

U.S. PATENT DOCUMENTS

| | | | |
|---|---|---|---|
| 5,136,431 | 8/1992 | Terasawa et al. | 359/684 |
| 5,144,488 | 9/1992 | Endo et al. | 359/686 |
| 5,412,507 | 5/1995 | Sato | 359/687 |
| 5,499,141 | 3/1996 | Ohtake | 359/684 |
| 5,528,427 | 6/1996 | Tanaka et al. | 359/683 |
| 5,581,404 | 12/1996 | Misaka et al. | 359/557 |
| 5,666,230 | 9/1997 | Tatsuno | 359/684 |
| 5,691,851 | 11/1997 | Nishio et al. | 359/683 |
| 5,815,320 | 9/1998 | Hoshi et al. | 359/686 |
| 5,831,772 | 11/1998 | Nishio et al. | 359/689 |

FOREIGN PATENT DOCUMENTS

| | | |
|---|---|---|
| 3-228008 | 10/1991 | Japan . |
| 5-119260 | 5/1993 | Japan . |
| 6-230285 | 8/1994 | Japan . |

*Primary Examiner*—Scott J. Sugarman
*Attorney, Agent, or Firm*—Fitzpatrick, Cella, Harper & Scinto

[57] ABSTRACT

A small-sized zoom lens in which the displacement of the focusing lens unit does not increase to an excessive degree during focusing, the zoom lens including a first lens unit of positive refractive power; a second lens unit of negative refractive power; and a subsequent lens unit of positive refractive power in that order from the object side, wherein focusing is effected by a subunit 2b of negative refractive power constituting a part of the second lens unit and wherein, assuming that the magnification of the subunit 2b at the wide-angle end is β2bw, the following condition is satisfied:

$$0 < \beta 2bw < 1.$$

24 Claims, 32 Drawing Sheets

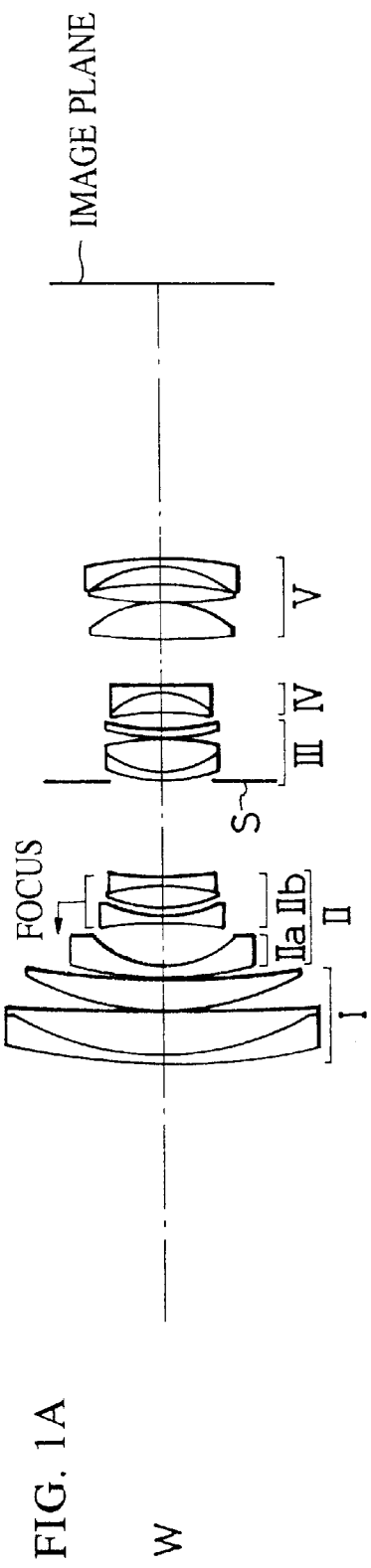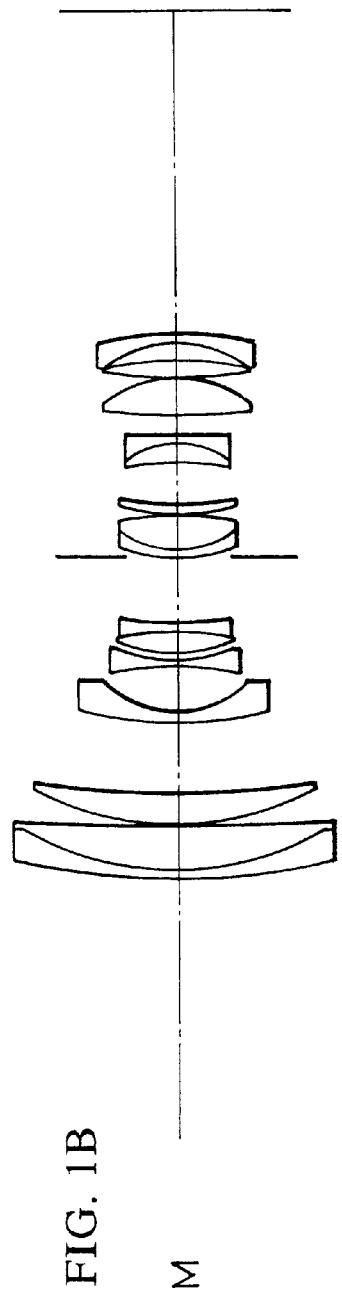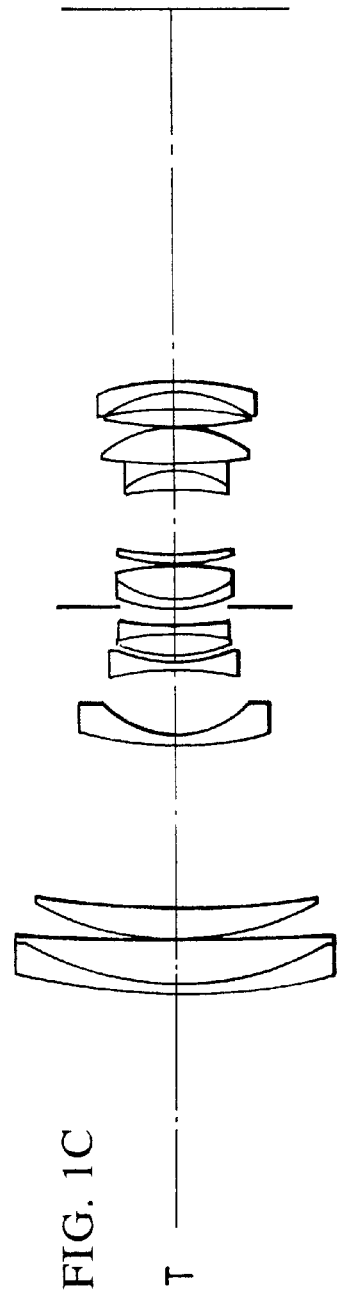
FIG. 1A W
FIG. 1B M
FIG. 1C T

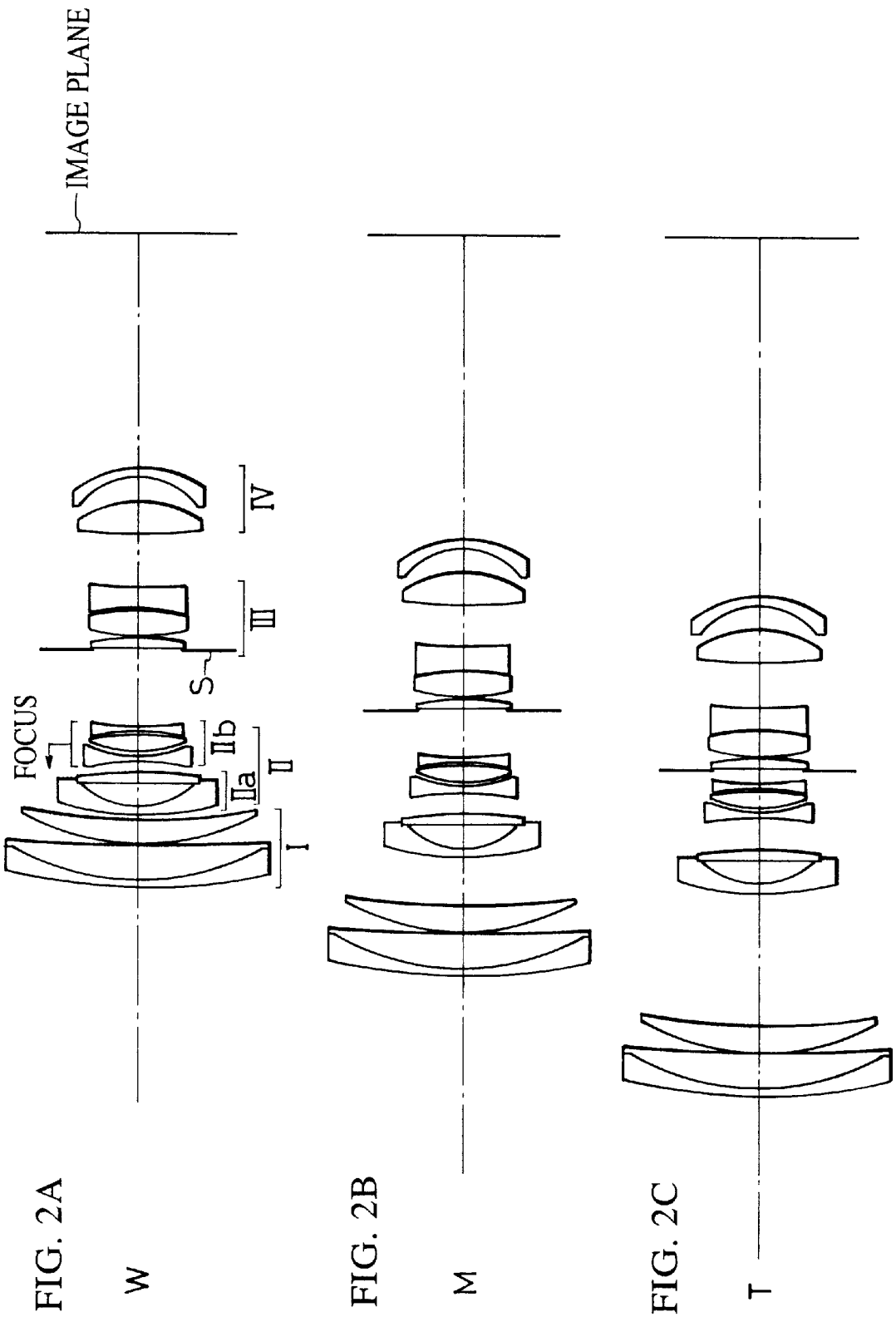
FIG. 2A W
FIG. 2B M
FIG. 2C T

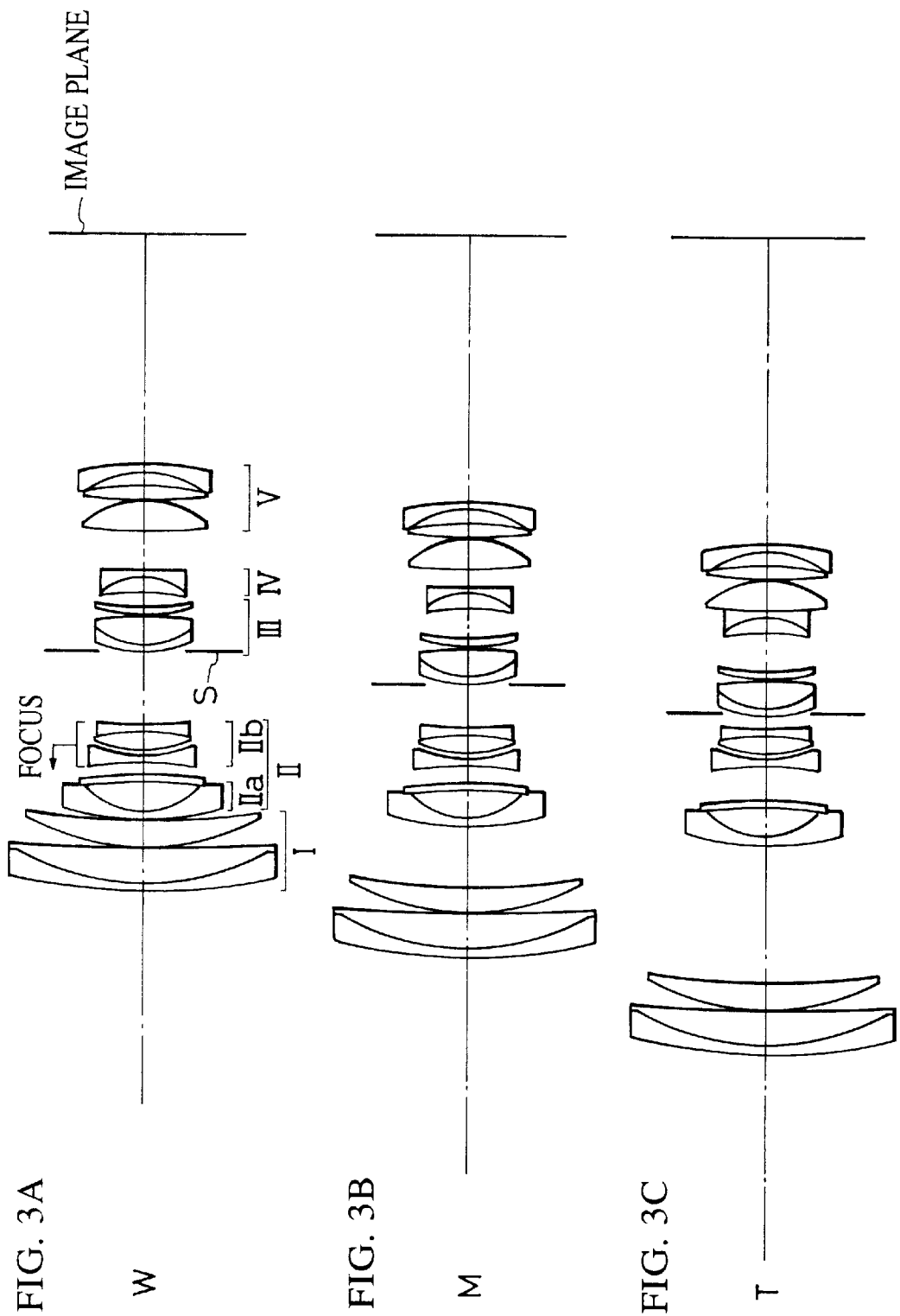

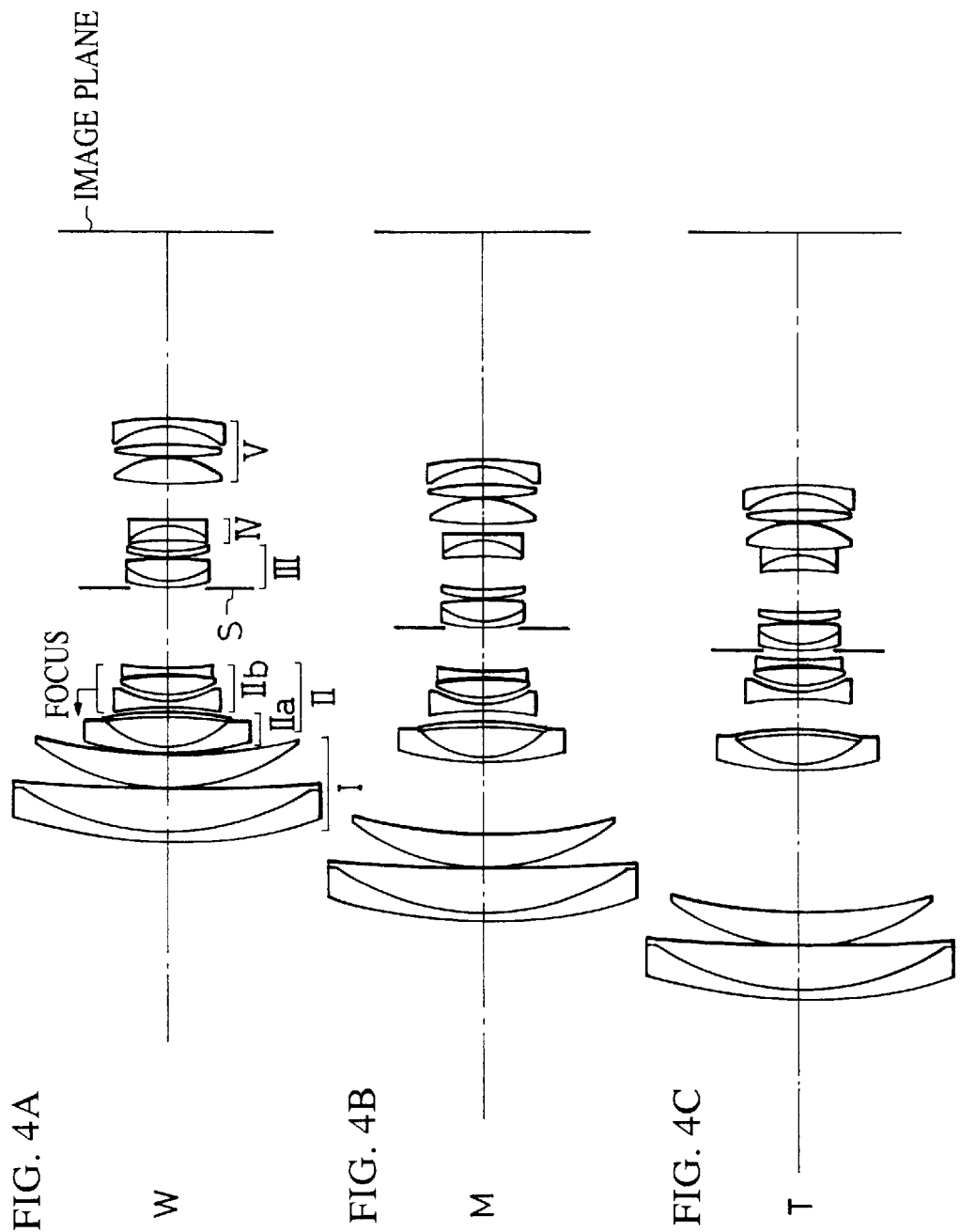
FIG. 4A W
FIG. 4B M
FIG. 4C T

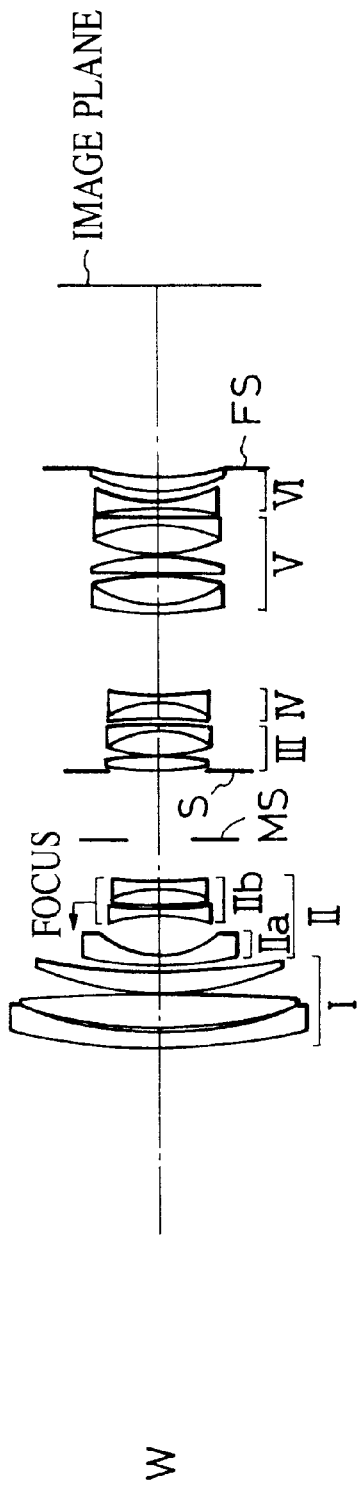
FIG. 5A W
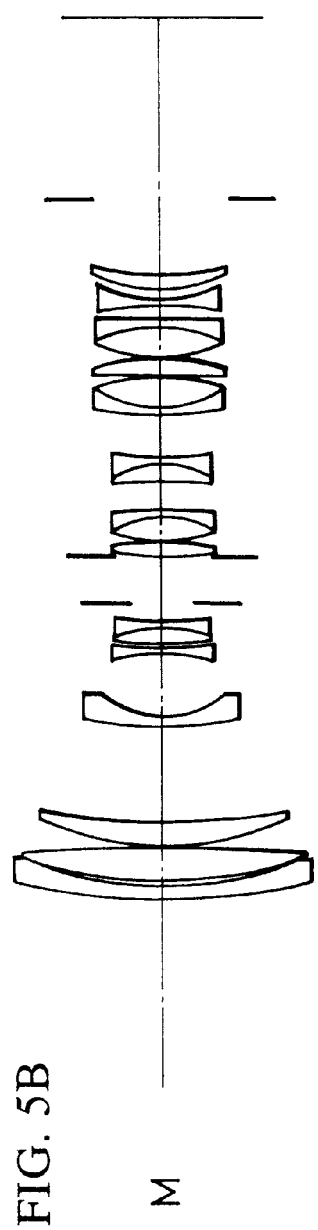
FIG. 5B M
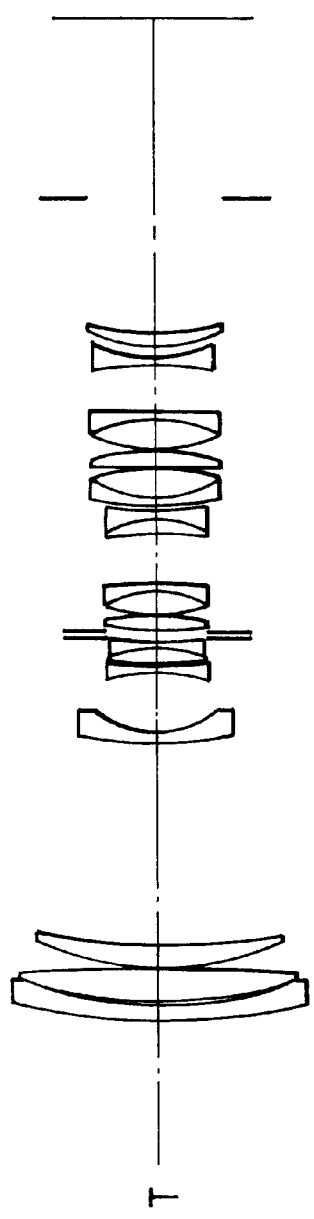
FIG. 5C T

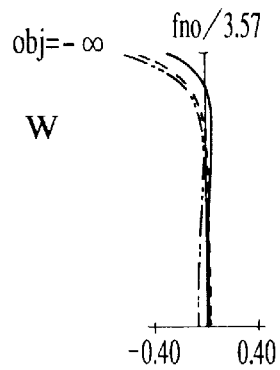
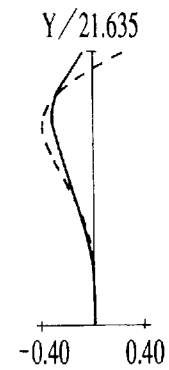
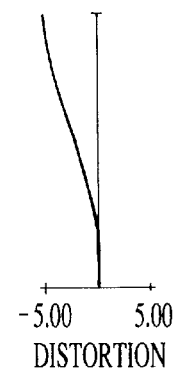
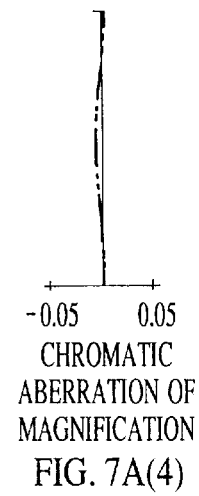

W

FIG. 7A(1) SPHERICAL ABERRATION SINE CONDITION (obj=−∞, fno/3.57)

FIG. 7A(2) ASTIGMATISM (Y/21.635)

FIG. 7A(3) DISTORTION

FIG. 7A(4) CHROMATIC ABERRATION OF MAGNIFICATION

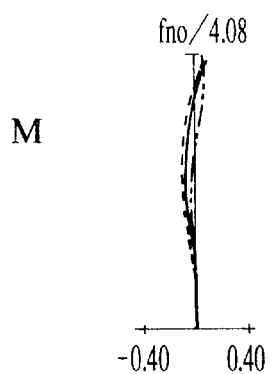
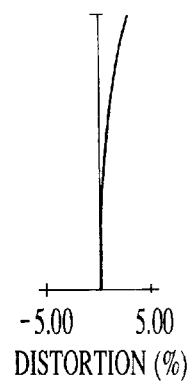
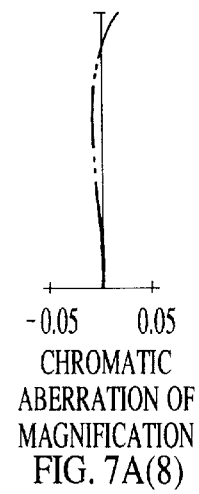

M

FIG. 7A(5) SPHERICAL ABERRATION SINE CONDITION (fno/4.08)

FIG. 7A(6) ASTIGMATISM (Y/21.635)

FIG. 7A(7) DISTORTION (%)

FIG. 7A(8) CHROMATIC ABERRATION OF MAGNIFICATION

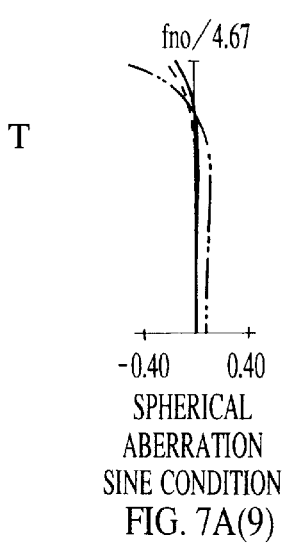
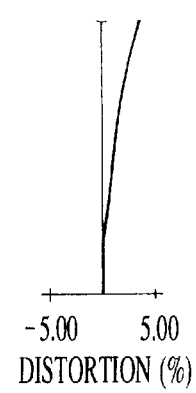
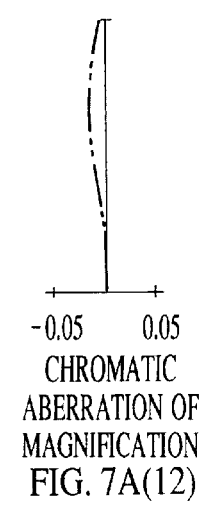

T

FIG. 7A(9) SPHERICAL ABERRATION SINE CONDITION (fno/4.67)

FIG. 7A(10) ASTIGMATISM (Y/21.635)

FIG. 7A(11) DISTORTION (%)

FIG. 7A(12) CHROMATIC ABERRATION OF MAGNIFICATION

W

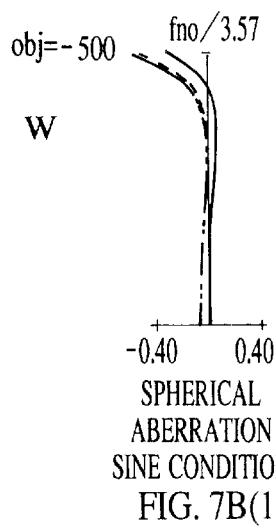
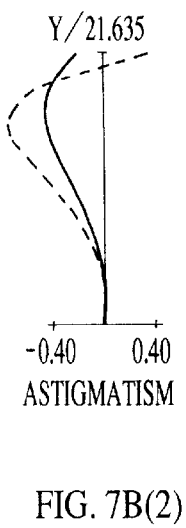
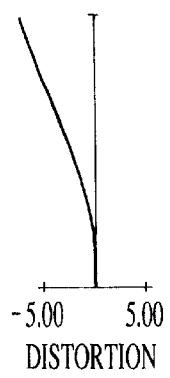
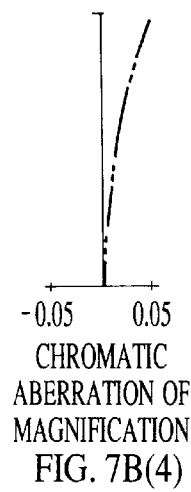

| SPHERICAL ABERRATION SINE CONDITION | ASTIGMATISM | DISTORTION | CHROMATIC ABERRATION OF MAGNIFICATION |
| --- | --- | --- | --- |
| FIG. 7B(1) | FIG. 7B(2) | FIG. 7B(3) | FIG. 7B(4) |

M

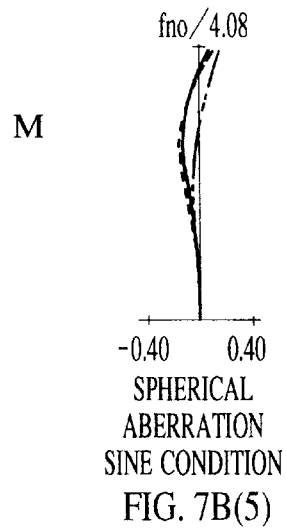
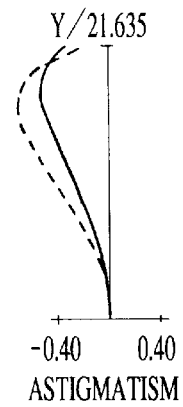
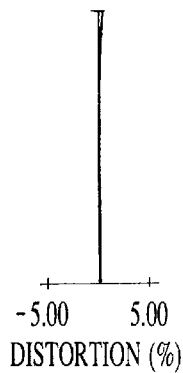
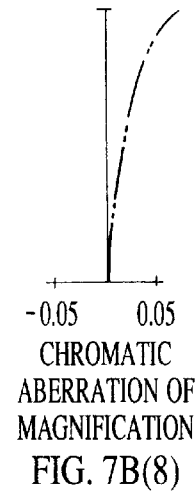

| SPHERICAL ABERRATION SINE CONDITION | ASTIGMATISM | DISTORTION (%) | CHROMATIC ABERRATION OF MAGNIFICATION |
| --- | --- | --- | --- |
| FIG. 7B(5) | FIG. 7B(6) | FIG. 7B(7) | FIG. 7B(8) |

T

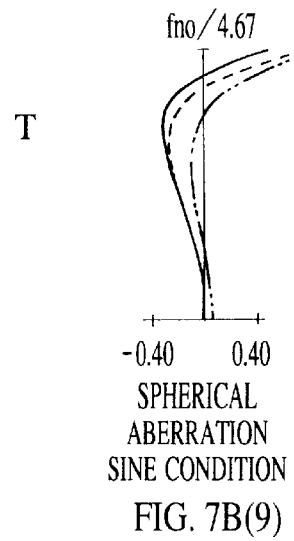
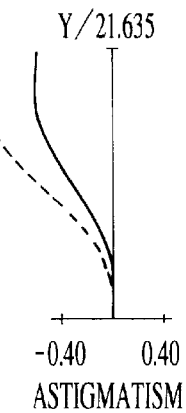
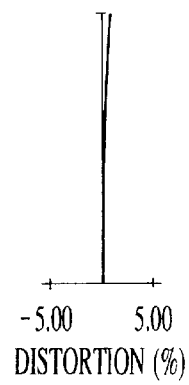
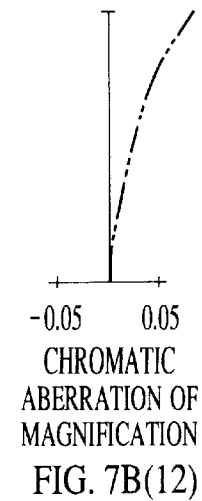

| SPHERICAL ABERRATION SINE CONDITION | ASTIGMATISM | DISTORTION (%) | CHROMATIC ABERRATION OF MAGNIFICATION |
| --- | --- | --- | --- |
| FIG. 7B(9) | FIG. 7B(10) | FIG. 7B(11) | FIG. 7B(12) | obj=−∞

W

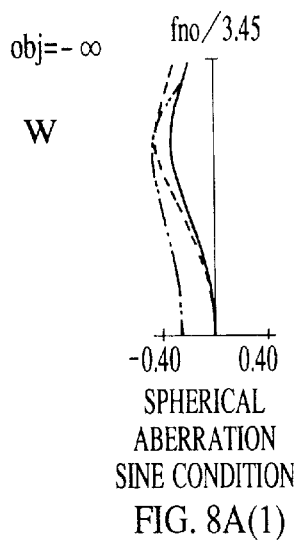 fno/3.45

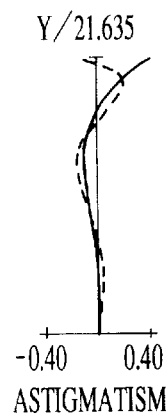 Y/21.635

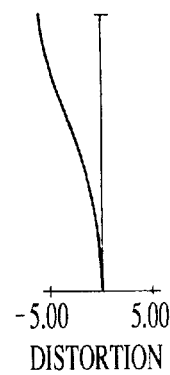

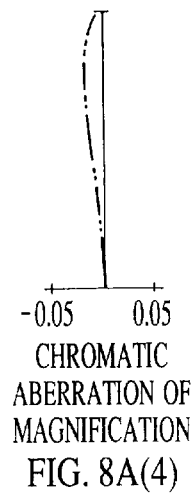

-0.40  0.40
SPHERICAL
ABERRATION
SINE CONDITION
FIG. 8A(1)

-0.40  0.40
ASTIGMATISM

FIG. 8A(2)

-5.00  5.00
DISTORTION

FIG. 8A(3)

-0.05  0.05
CHROMATIC
ABERRATION OF
MAGNIFICATION
FIG. 8A(4)

M

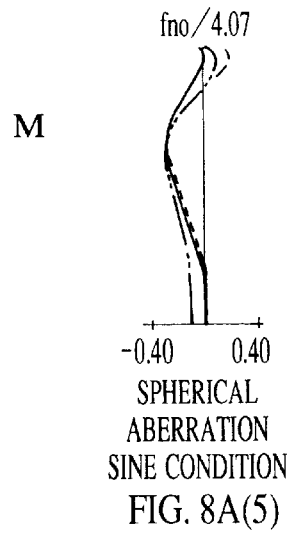 fno/4.07

 Y/21.635

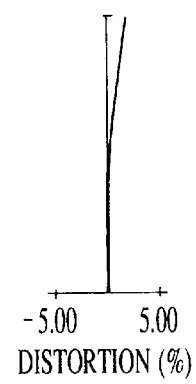

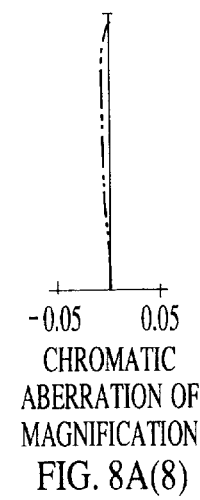

-0.40  0.40
SPHERICAL
ABERRATION
SINE CONDITION
FIG. 8A(5)

-0.40  0.40
ASTIGMATISM

FIG. 8A(6)

-5.00  5.00
DISTORTION (%)

FIG. 8A(7)

-0.05  0.05
CHROMATIC
ABERRATION OF
MAGNIFICATION
FIG. 8A(8)

T

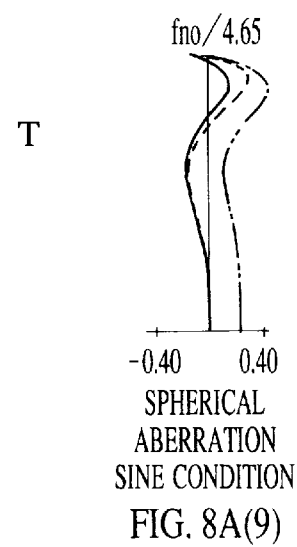 fno/4.65

 Y/21.635

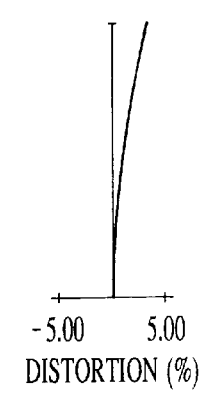

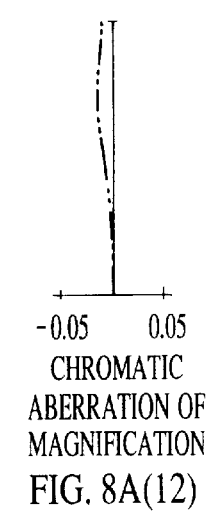

-0.40  0.40
SPHERICAL
ABERRATION
SINE CONDITION
FIG. 8A(9)

-0.40  0.40
ASTIGMATISM

FIG. 8A(10)

-5.00  5.00
DISTORTION (%)

FIG. 8A(11)

-0.05  0.05
CHROMATIC
ABERRATION OF
MAGNIFICATION
FIG. 8A(12)

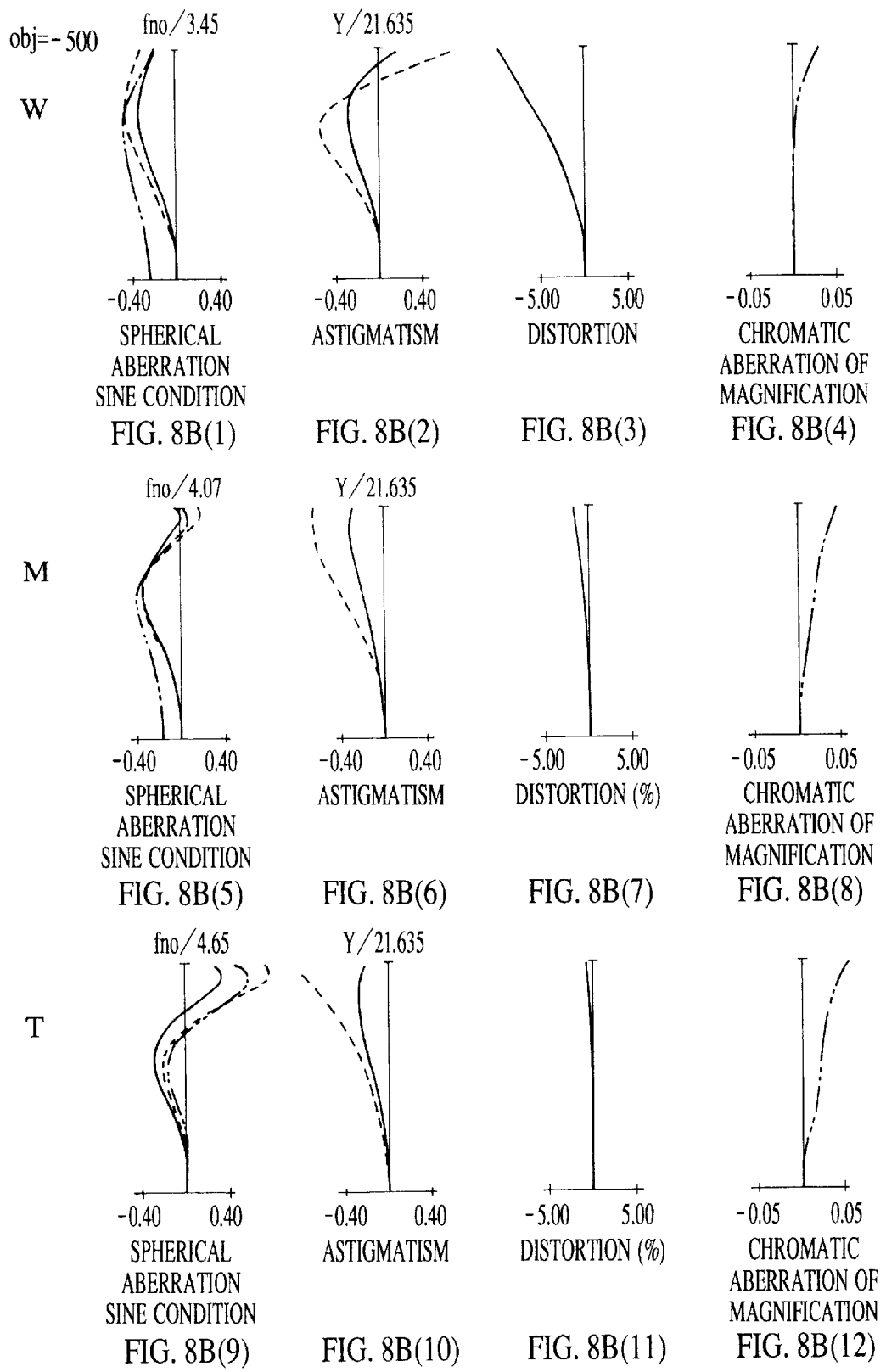

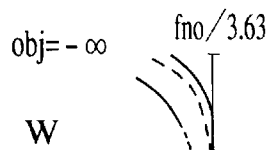
obj=-∞  fno/3.63   Y/21.635

W

-0.40  0.40
SPHERICAL
ABERRATION
SINE CONDITION
FIG. 9A(1)

-0.40  0.40
ASTIGMATISM

FIG. 9A(2)

-5.00  5.00
DISTORTION

FIG. 9A(3)

-0.05  0.05
CHROMATIC
ABERRATION OF
MAGNIFICATION
FIG. 9A(4)

fno/4.14  Y/21.635

M

-0.40  0.40
SPHERICAL
ABERRATION
SINE CONDITION
FIG. 9A(5)

-0.40  0.40
ASTIGMATISM

FIG. 9A(6)

-5.00  5.00
DISTORTION (%)

FIG. 9A(7)

-0.05  0.05
CHROMATIC
ABERRATION OF
MAGNIFICATION
FIG. 9A(8)

fno/4.67  Y/21.635

T

-0.40  0.40
SPHERICAL
ABERRATION
SINE CONDITION
FIG. 9A(9)

-0.40  0.40
ASTIGMATISM

FIG. 9A(10)

-5.00  5.00
DISTORTION (%)

FIG. 9A(11)

-0.05  0.05
CHROMATIC
ABERRATION OF
MAGNIFICATION
FIG. 9A(12)

W
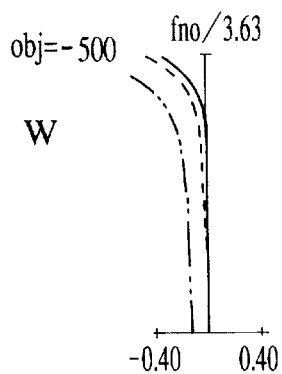 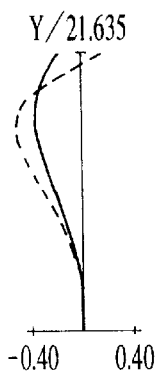 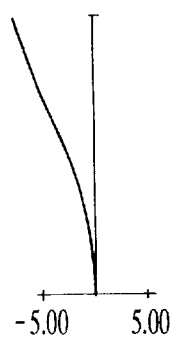 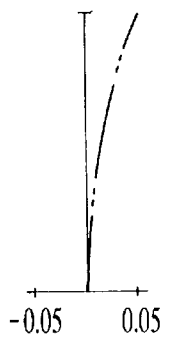

SPHERICAL ABERRATION SINE CONDITION  
FIG. 9B(1)

ASTIGMATISM  
FIG. 9B(2)

DISTORTION  
FIG. 9B(3)

CHROMATIC ABERRATION OF MAGNIFICATION  
FIG. 9B(4)

M
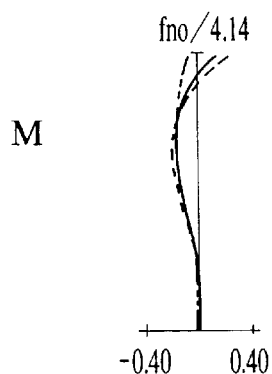 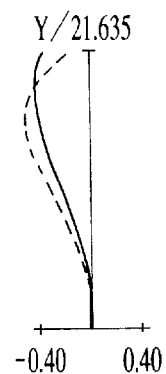 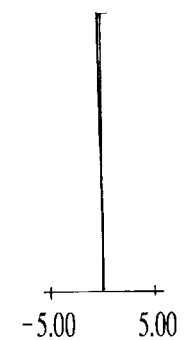 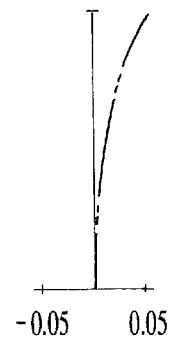

SPHERICAL ABERRATION SINE CONDITION  
FIG. 9B(5)

ASTIGMATISM  
FIG. 9B(6)

DISTORTION (%)  
FIG. 9B(7)

CHROMATIC ABERRATION OF MAGNIFICATION  
FIG. 9B(8)

T
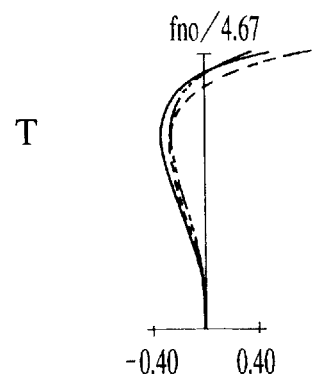 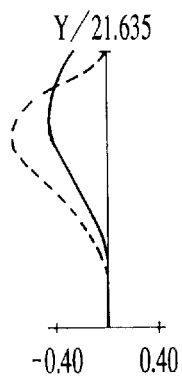 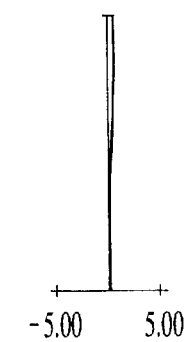 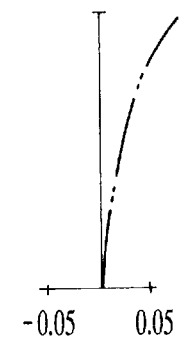

SPHERICAL ABERRATION SINE CONDITION  
FIG. 9B(9)

ASTIGMATISM  
FIG. 9B(10)

DISTORTION (%)  
FIG. 9B(11)

CHROMATIC ABERRATION OF MAGNIFICATION  
FIG. 9B(12)

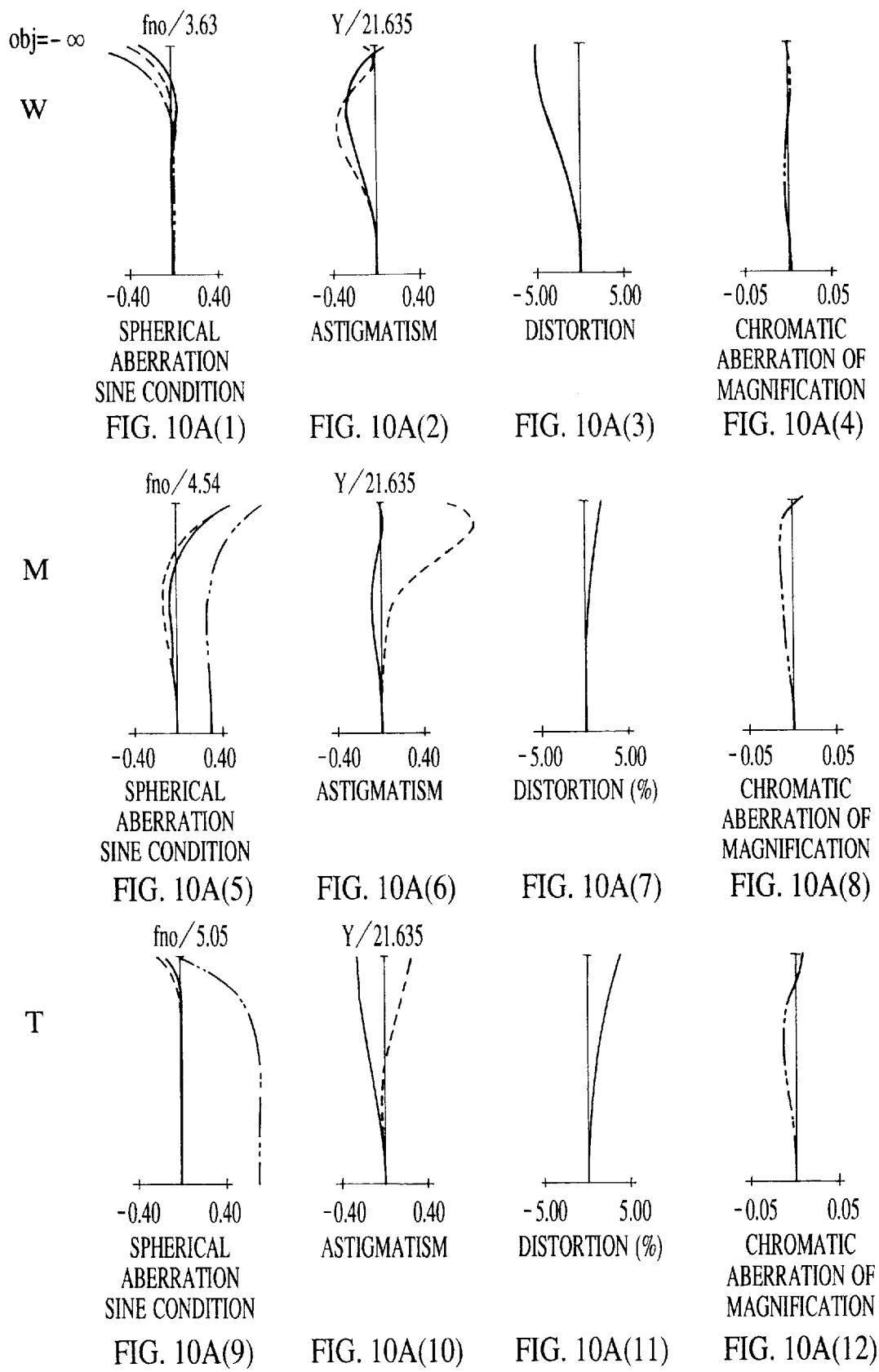

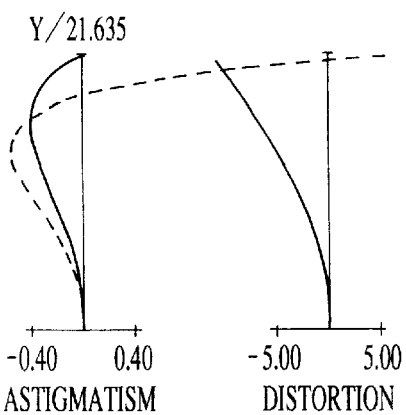
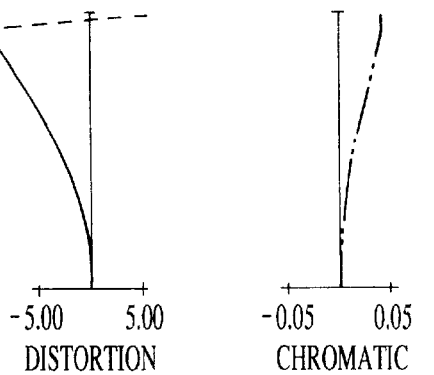
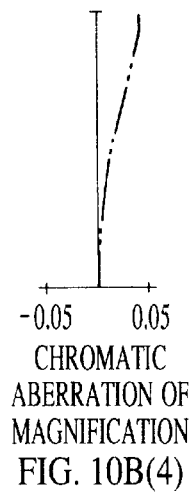

| | | | |
|---|---|---|---|
| SPHERICAL ABERRATION SINE CONDITION | ASTIGMATISM | DISTORTION | CHROMATIC ABERRATION OF MAGNIFICATION |
| FIG. 10B(1) | FIG. 10B(2) | FIG. 10B(3) | FIG. 10B(4) |

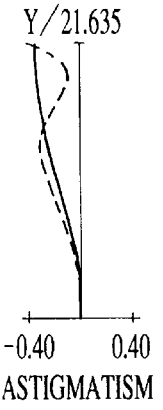
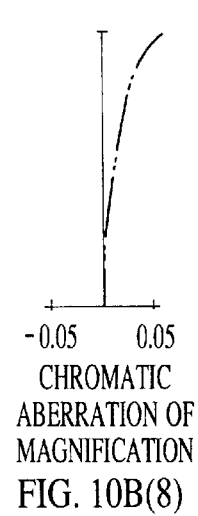

| | | | |
|---|---|---|---|
| SPHERICAL ABERRATION SINE CONDITION | ASTIGMATISM | DISTORTION (%) | CHROMATIC ABERRATION OF MAGNIFICATION |
| FIG. 10B(5) | FIG. 10B(6) | FIG. 10B(7) | FIG. 10B(8) |

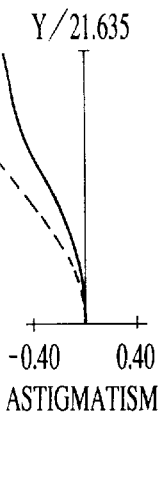
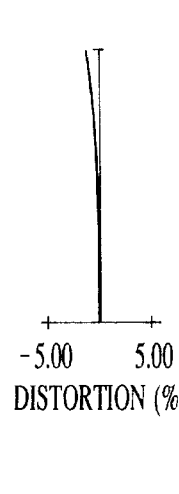
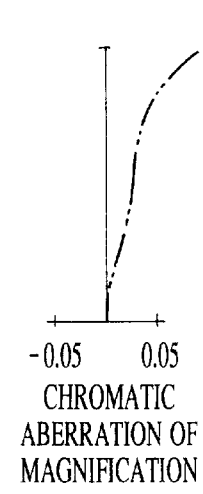

| | | | |
|---|---|---|---|
| SPHERICAL ABERRATION SINE CONDITION | ASTIGMATISM | DISTORTION (%) | CHROMATIC ABERRATION OF MAGNIFICATION |
| FIG. 10B(9) | FIG. 10B(10) | FIG. 10B(11) | FIG. 10B(12) |

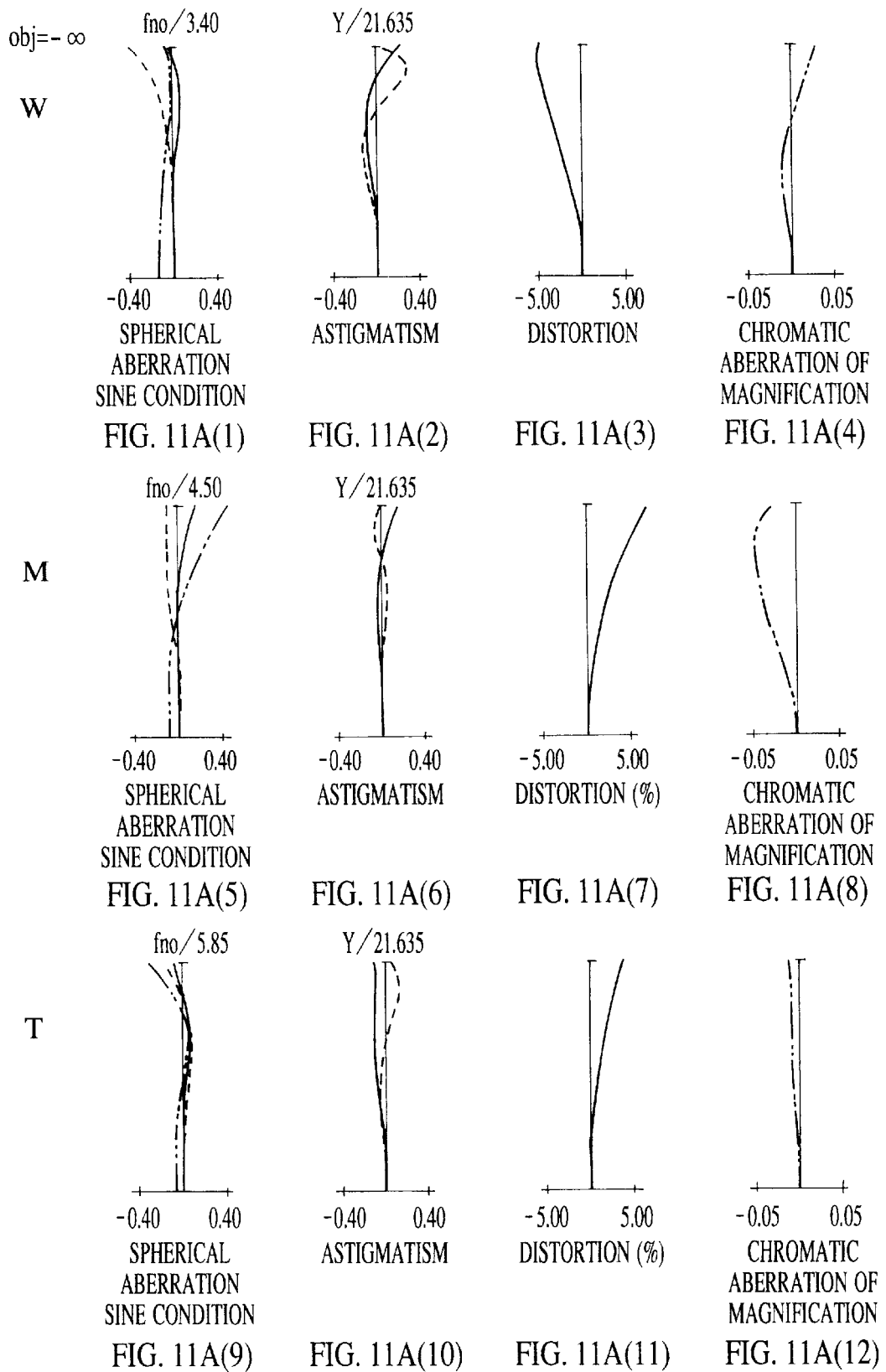

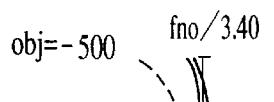
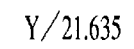
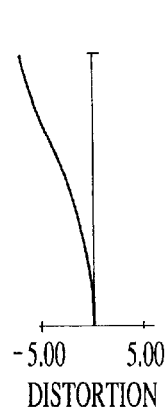
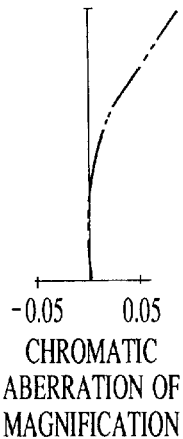

W

FIG. 11B(1)  
SPHERICAL ABERRATION SINE CONDITION

FIG. 11B(2)  
ASTIGMATISM

FIG. 11B(3)  
DISTORTION

FIG. 11B(4)  
CHROMATIC ABERRATION OF MAGNIFICATION

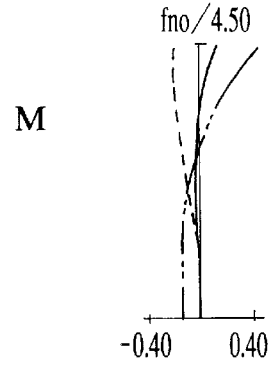
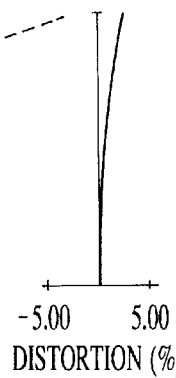
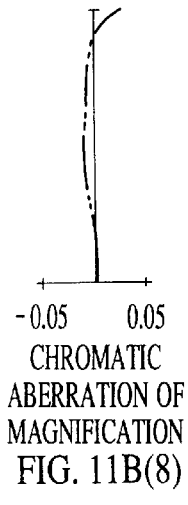

M

FIG. 11B(5)  
SPHERICAL ABERRATION SINE CONDITION

FIG. 11B(6)  
ASTIGMATISM

FIG. 11B(7)  
DISTORTION (%)

FIG. 11B(8)  
CHROMATIC ABERRATION OF MAGNIFICATION

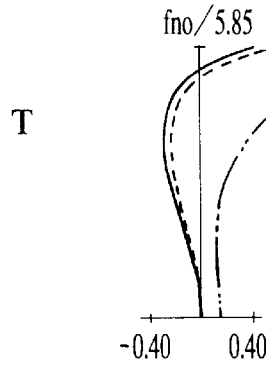
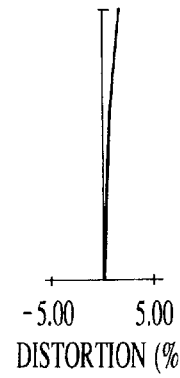
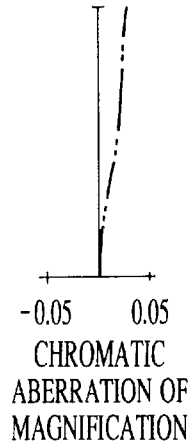

T

FIG. 11B(9)  
SPHERICAL ABERRATION SINE CONDITION

FIG. 11B(10)  
ASTIGMATISM

FIG. 11B(11)  
DISTORTION (%)

FIG. 11B(12)  
CHROMATIC ABERRATION OF MAGNIFICATION

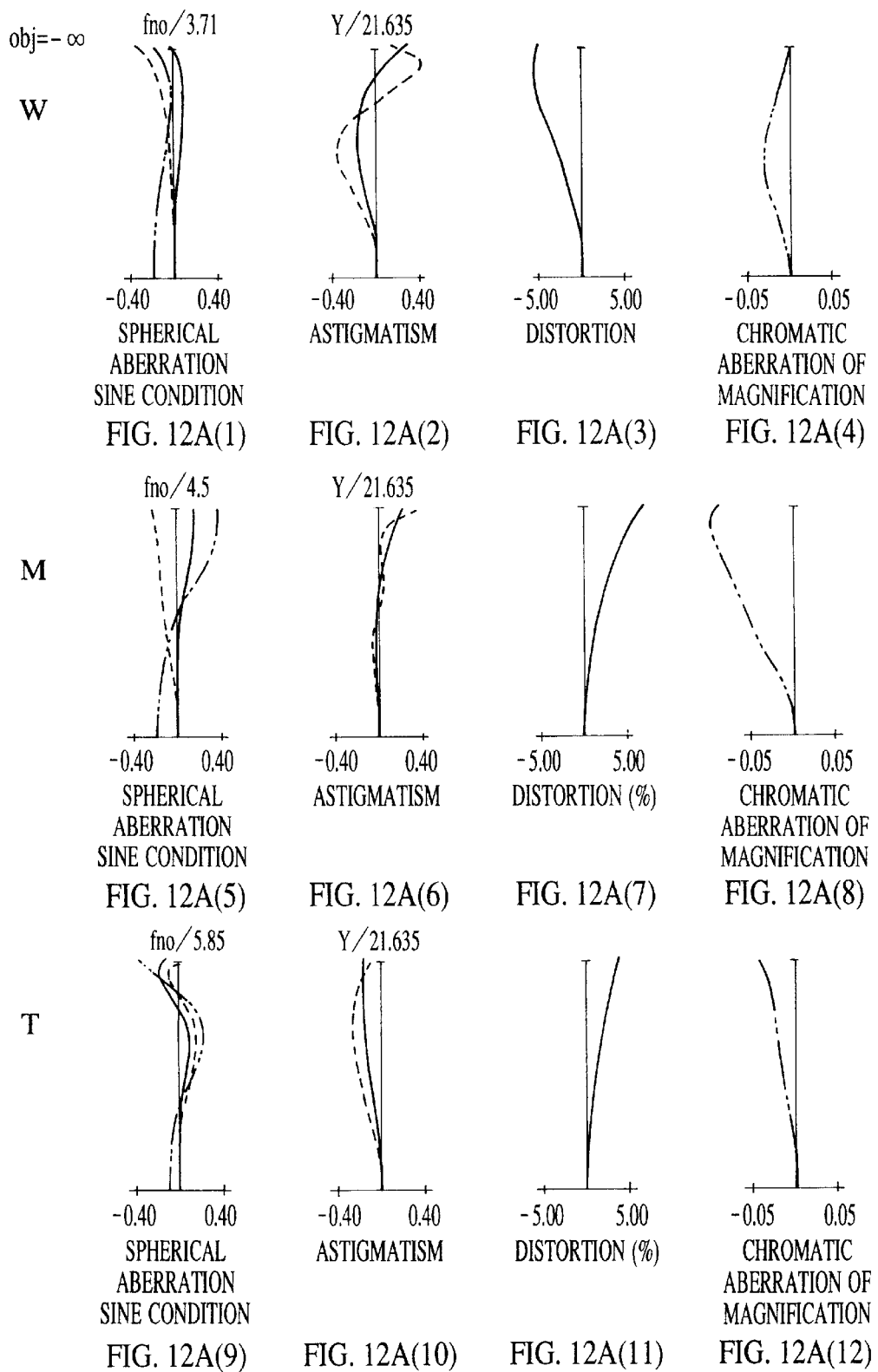

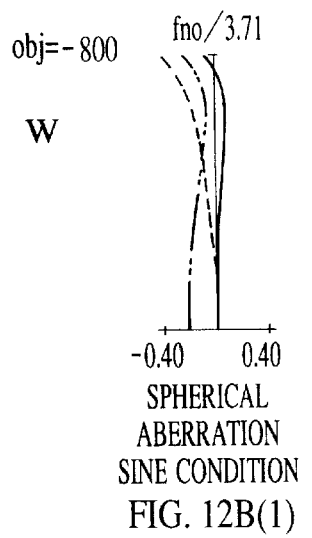
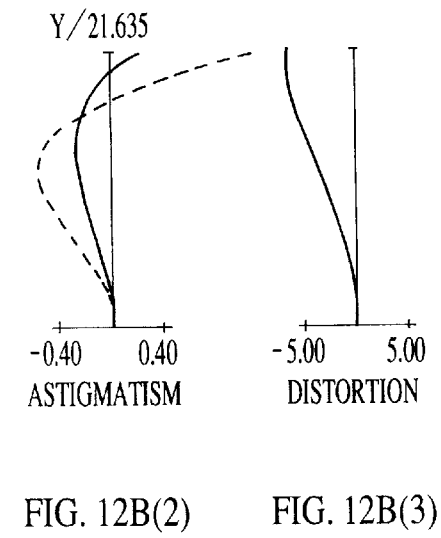
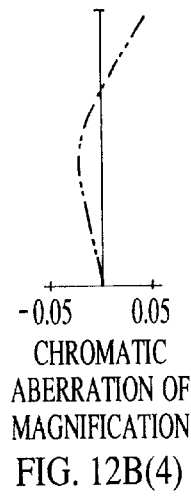

obj=−800
fno/3.71
Y/21.635

W

−0.40  0.40
SPHERICAL
ABERRATION
SINE CONDITION
FIG. 12B(1)

−0.40  0.40
ASTIGMATISM

FIG. 12B(2)

−5.00  5.00
DISTORTION

FIG. 12B(3)

−0.05  0.05
CHROMATIC
ABERRATION OF
MAGNIFICATION
FIG. 12B(4)

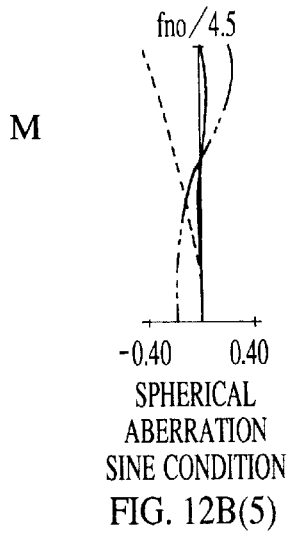
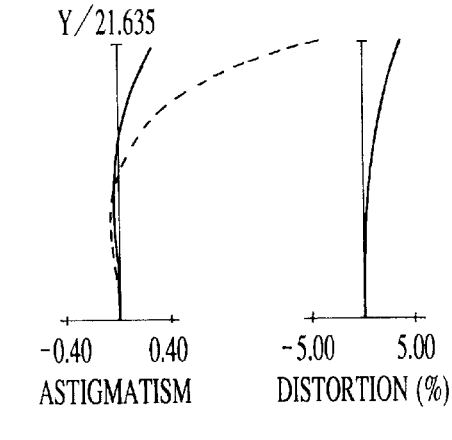
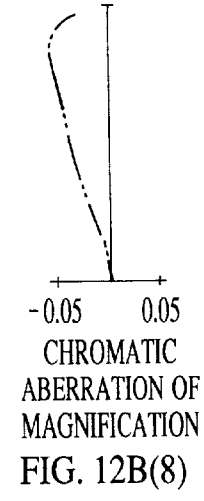

fno/4.5
Y/21.635

M

−0.40  0.40
SPHERICAL
ABERRATION
SINE CONDITION
FIG. 12B(5)

−0.40  0.40
ASTIGMATISM

FIG. 12B(6)

−5.00  5.00
DISTORTION (%)

FIG. 12B(7)

−0.05  0.05
CHROMATIC
ABERRATION OF
MAGNIFICATION
FIG. 12B(8)

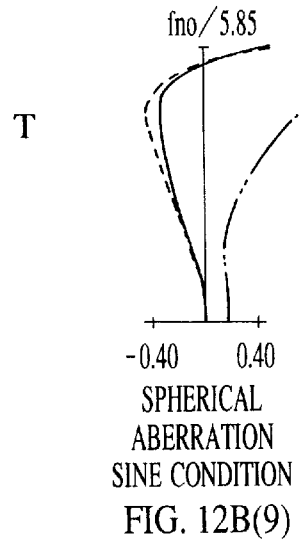
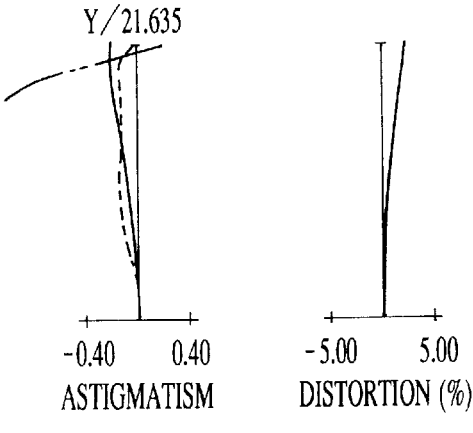
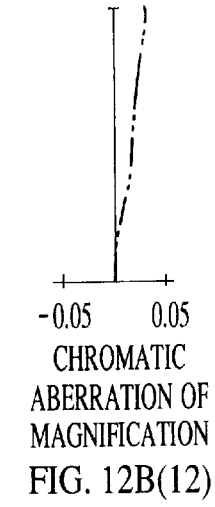

fno/5.85
Y/21.635

T

−0.40  0.40
SPHERICAL
ABERRATION
SINE CONDITION
FIG. 12B(9)

−0.40  0.40
ASTIGMATISM

FIG. 12B(10)

−5.00  5.00
DISTORTION (%)

FIG. 12B(11)

−0.05  0.05
CHROMATIC
ABERRATION OF
MAGNIFICATION
FIG. 12B(12)

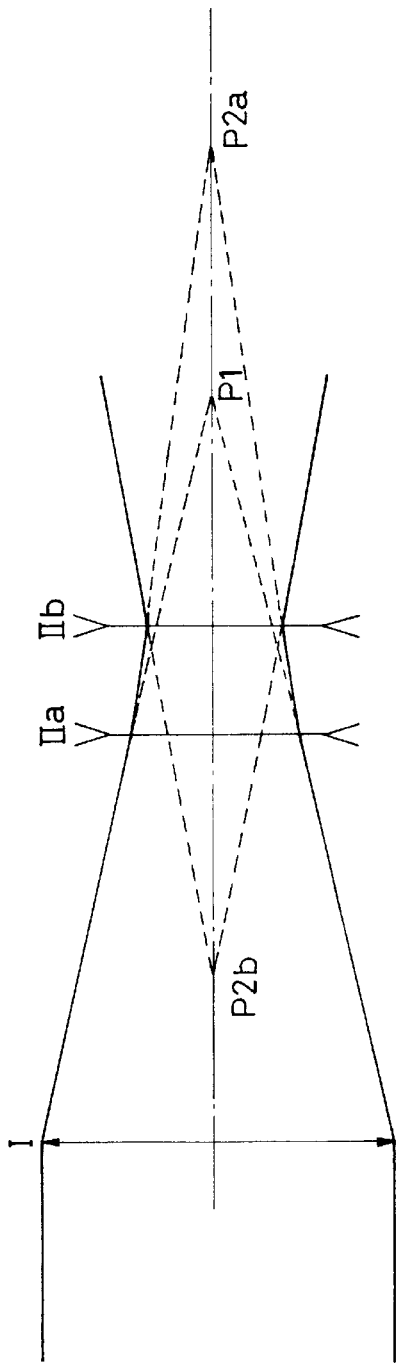
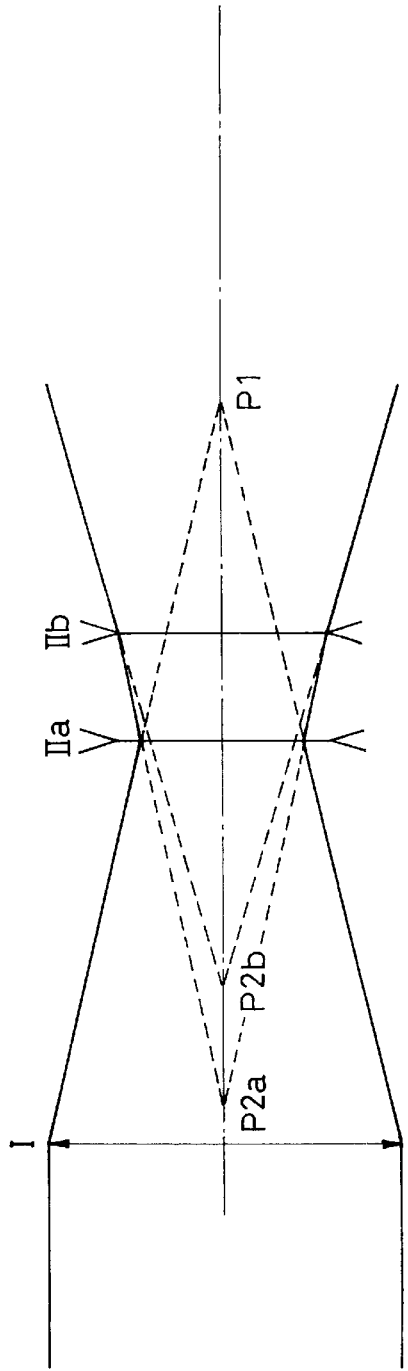
FIG. 13A  WHEN MAGNIFICATION OF SUBUNIT 2a IS POSITIVE
FIG. 13B  WHEN MAGNIFICATION OF SUBUNIT 2a IS NEGATIVE

W

M

T

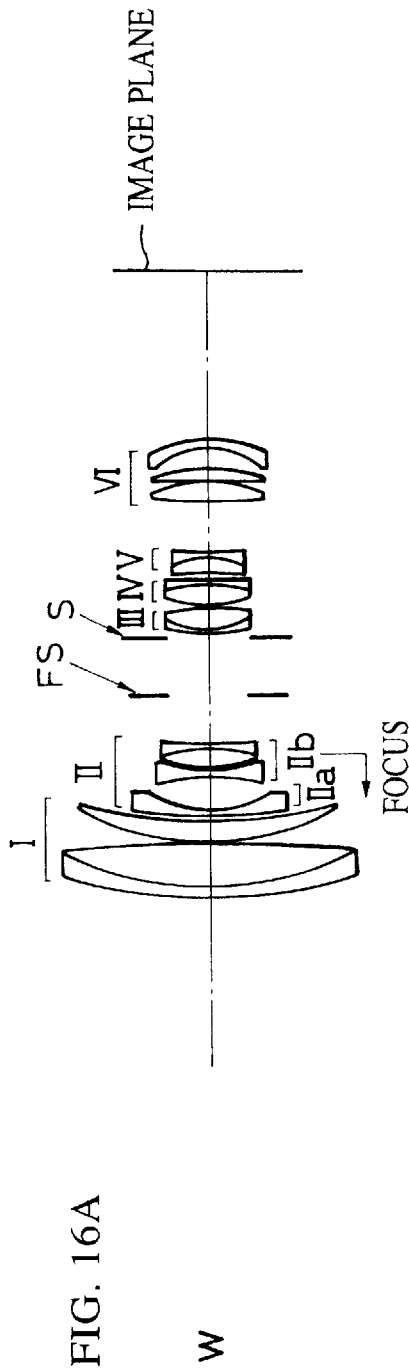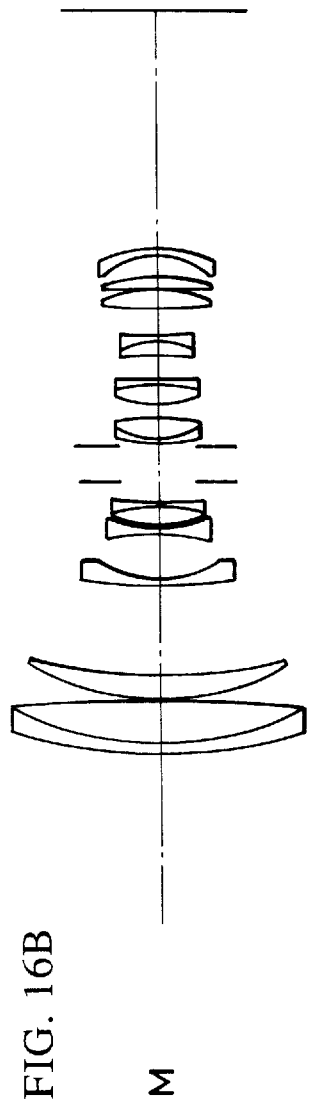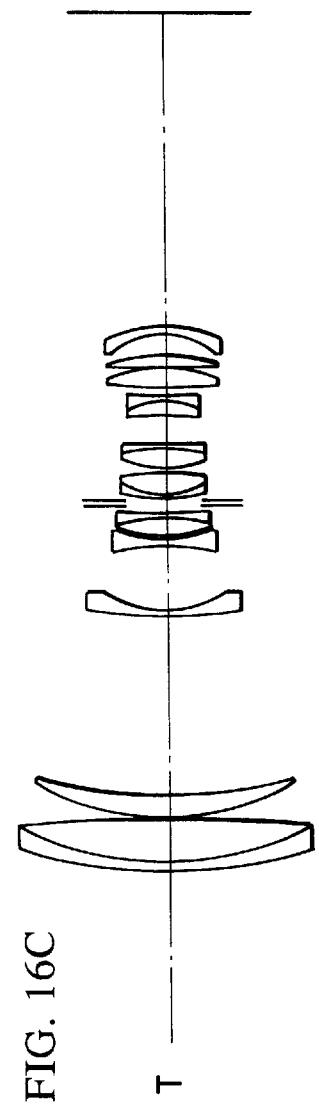
FIG. 16A W
FIG. 16B M
FIG. 16C T

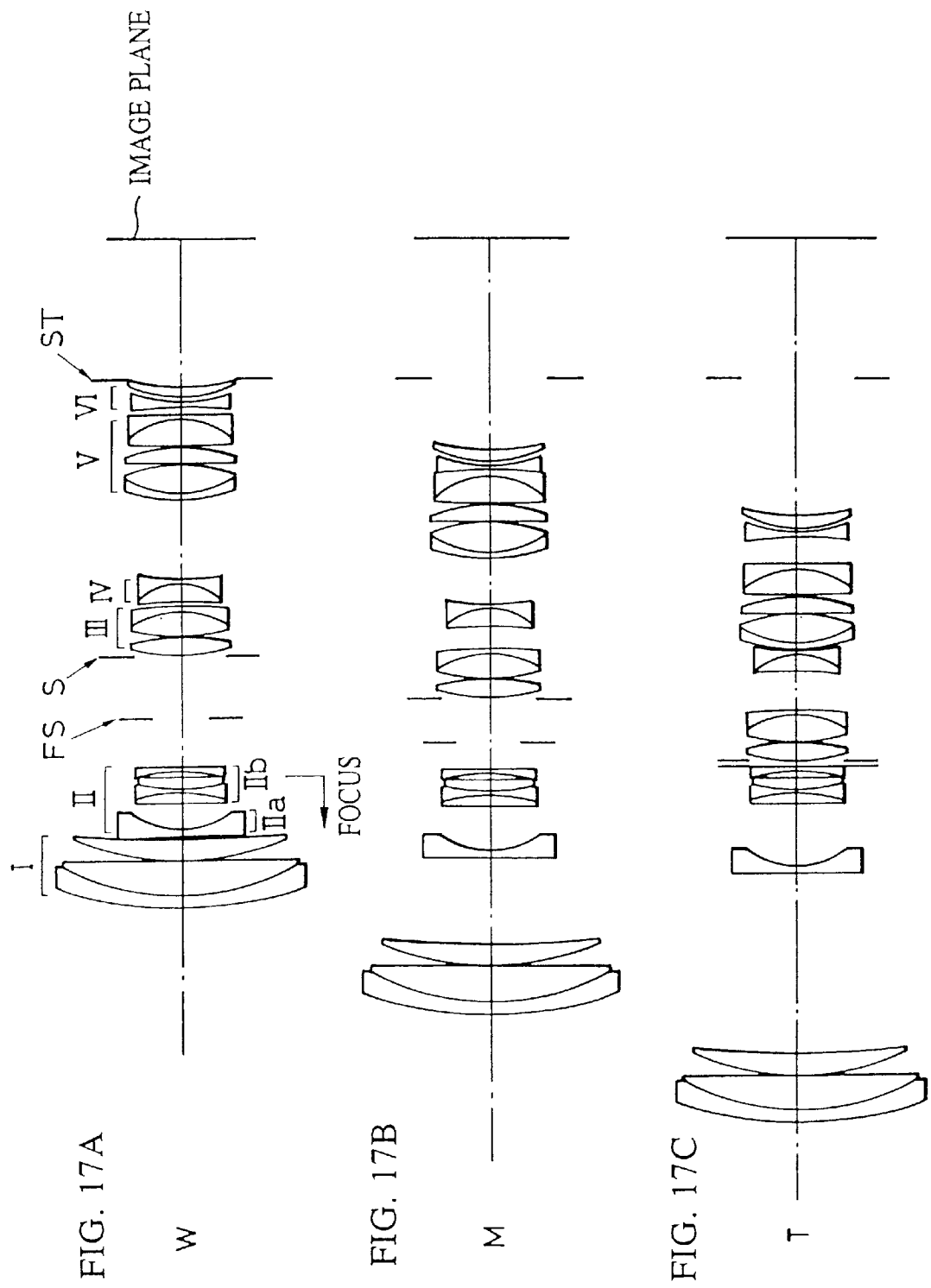

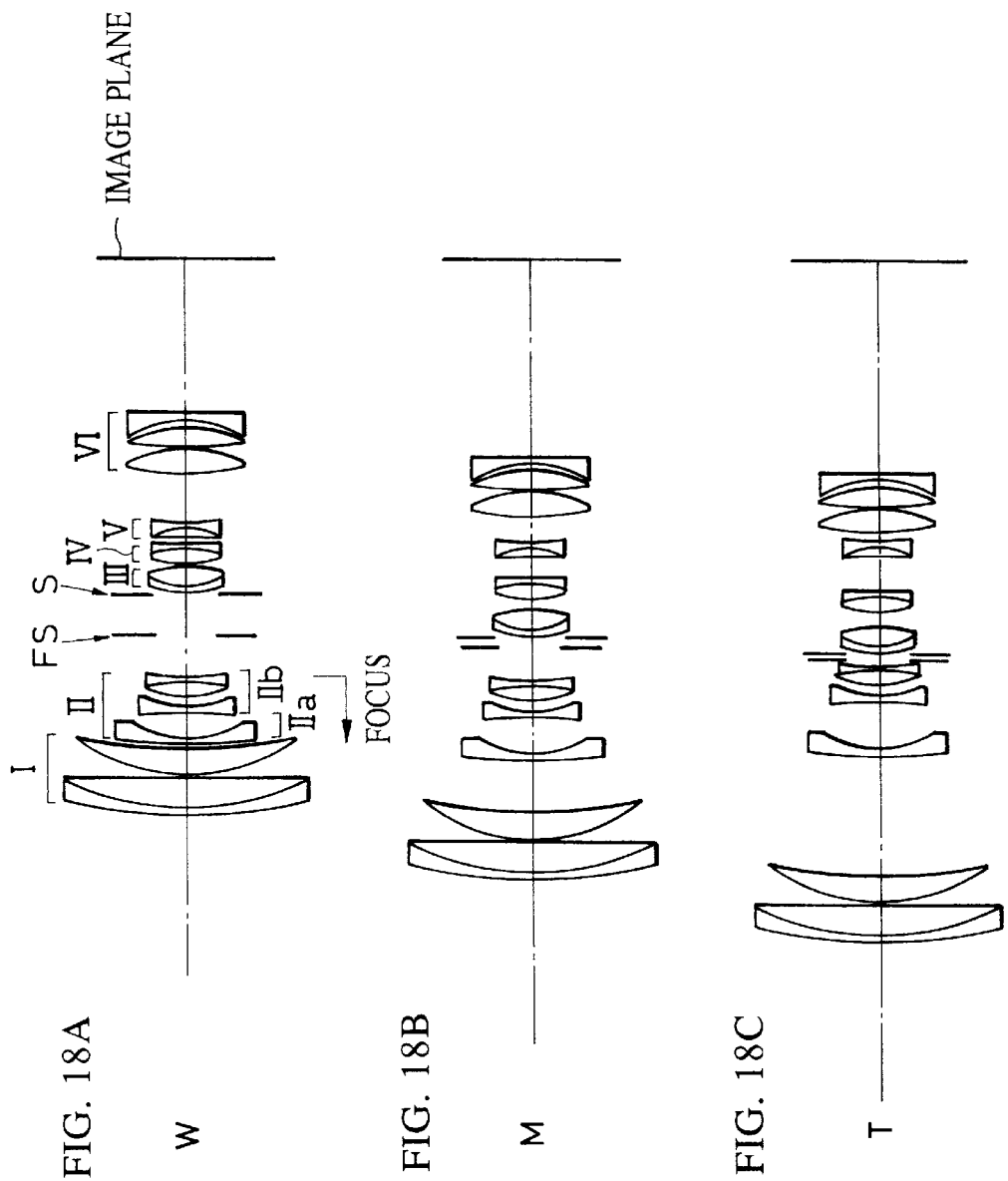

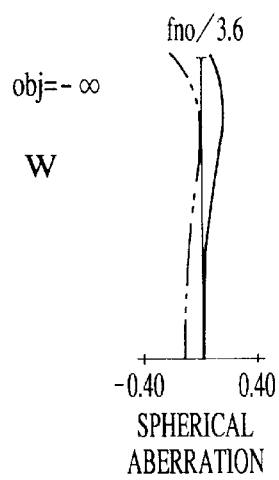
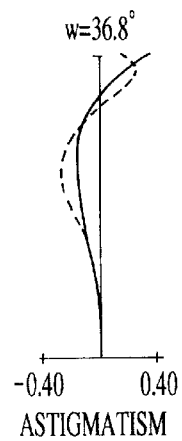
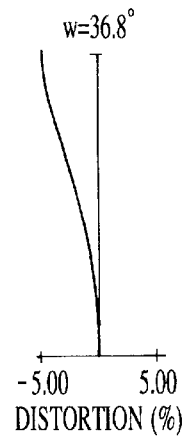
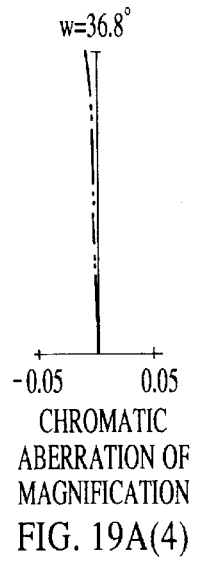
FIG. 19A(1)  FIG. 19A(2)  FIG. 19A(3)  FIG. 19A(4)
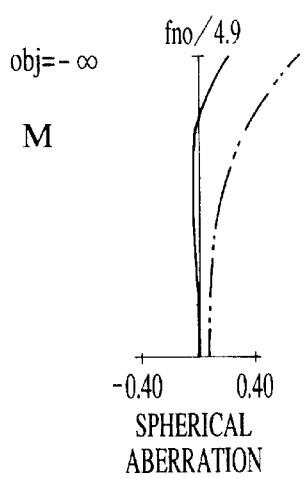
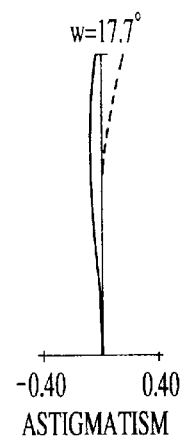
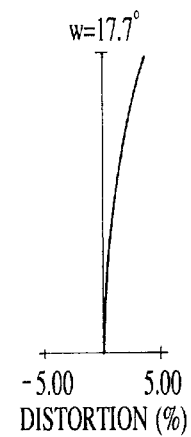
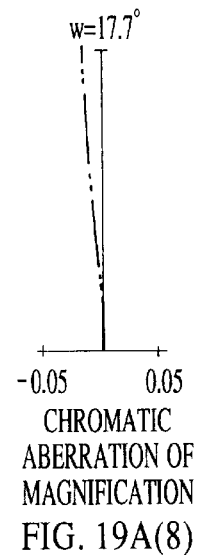
FIG. 19A(5)  FIG. 19A(6)  FIG. 19A(7)  FIG. 19A(8)
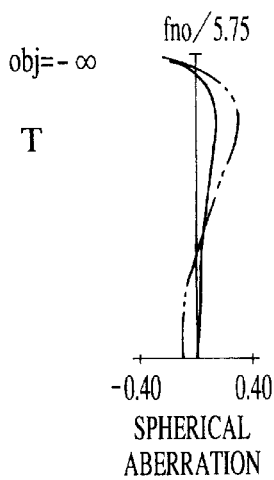
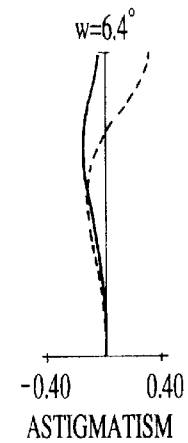
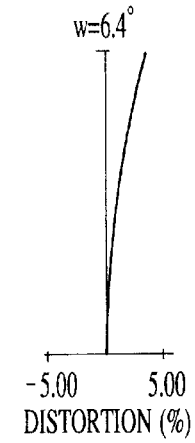
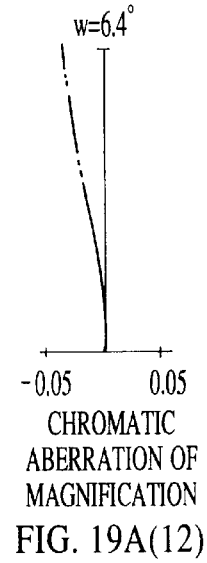
FIG. 19A(9)  FIG. 19A(10)  FIG. 19A(11)  FIG. 19A(12)

obj=-500
W fno/3.6
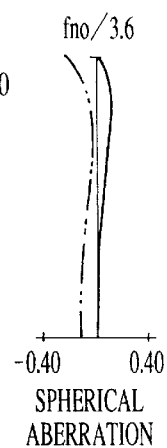
-0.40   0.40
SPHERICAL
ABERRATION
FIG. 19B(1)

w=36.8°
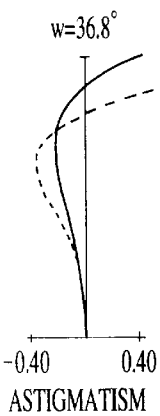
-0.40   0.40
ASTIGMATISM
FIG. 19B(2)

w=36.8°
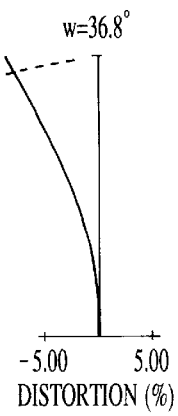
-5.00   5.00
DISTORTION (%)
FIG. 19B(3)

w=36.8°
-0.05   0.05
CHROMATIC
ABERRATION OF
MAGNIFICATION
FIG. 19B(4)

obj=-500
M fno/4.9
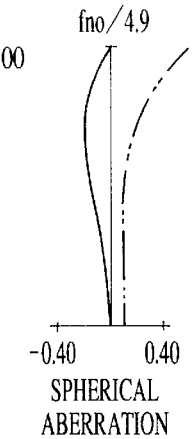
-0.40   0.40
SPHERICAL
ABERRATION
FIG. 19B(5)

w=17.7°
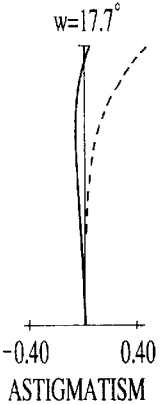
-0.40   0.40
ASTIGMATISM
FIG. 19B(6)

w=17.7°
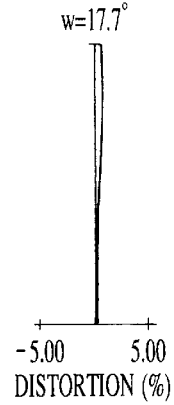
-5.00   5.00
DISTORTION (%)
FIG. 19B(7)

w=17.7°
-0.05   0.05
CHROMATIC
ABERRATION OF
MAGNIFICATION
FIG. 19B(8)

obj=-500
T fno/5.75
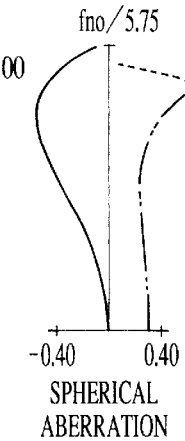
-0.40   0.40
SPHERICAL
ABERRATION
FIG. 19B(9)

w=6.4°
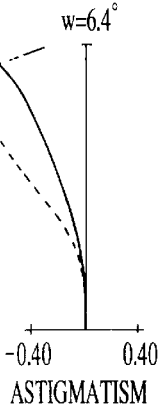
-0.40   0.40
ASTIGMATISM
FIG. 19B(10)

w=6.4°
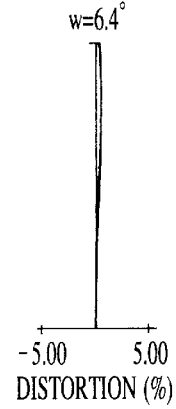
-5.00   5.00
DISTORTION (%)
FIG. 19B(11)

w=6.4°
-0.05   0.05
CHROMATIC
ABERRATION OF
MAGNIFICATION
FIG. 19B(12)

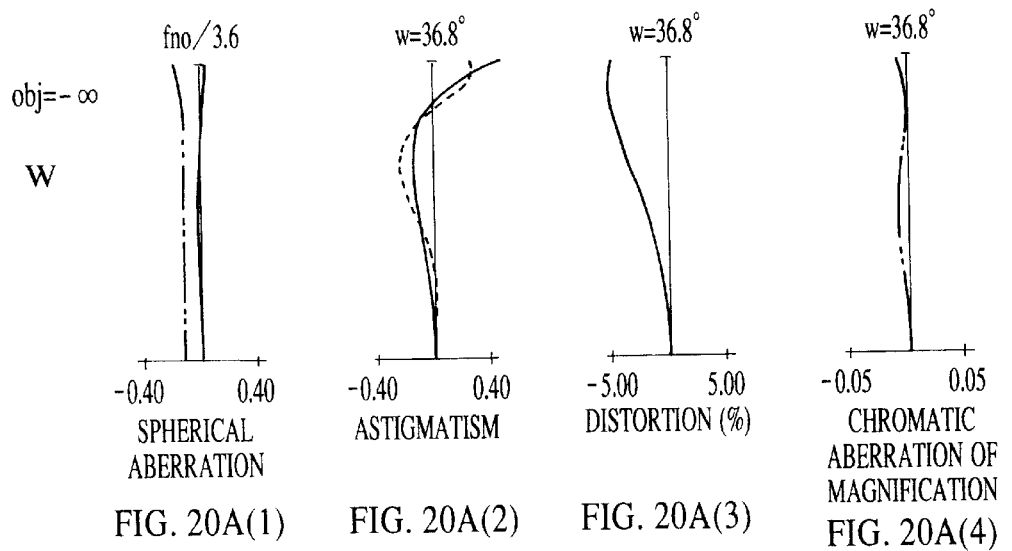
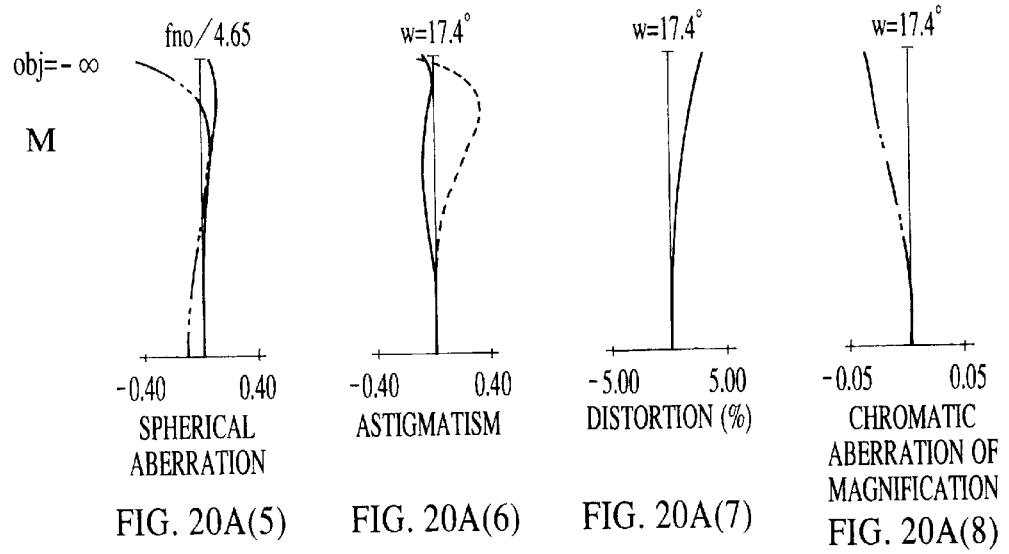
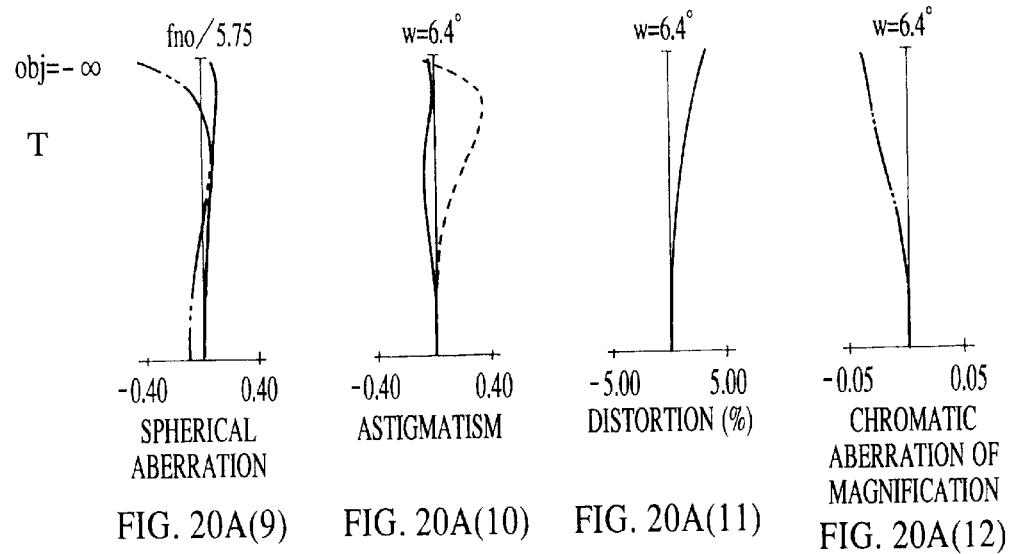

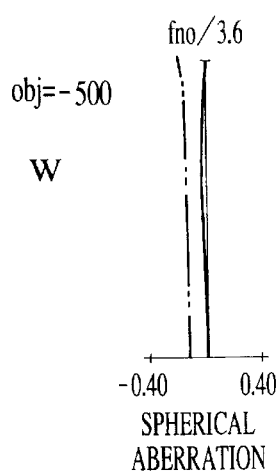
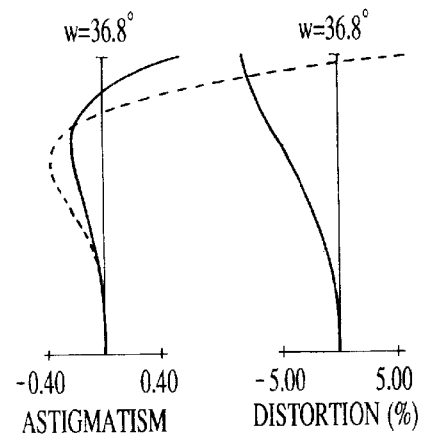
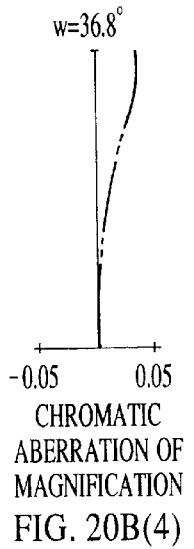
FIG. 20B(1)  FIG. 20B(2)  FIG. 20B(3)  FIG. 20B(4)
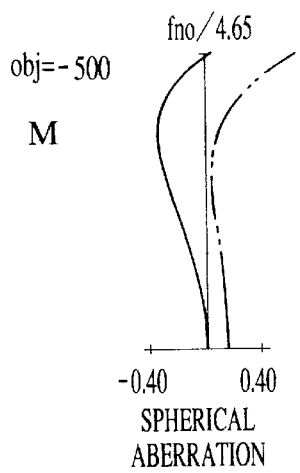
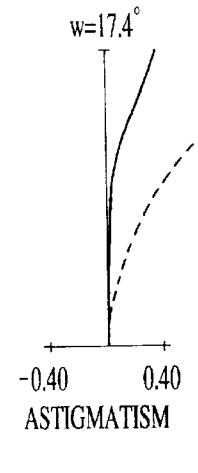
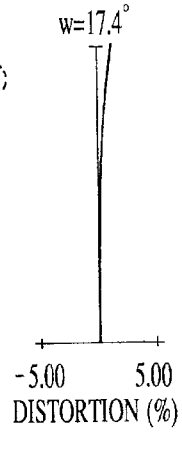
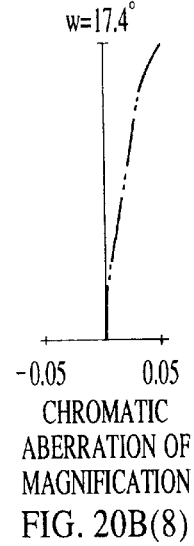
FIG. 20B(5)  FIG. 20B(6)  FIG. 20B(7)  FIG. 20B(8)
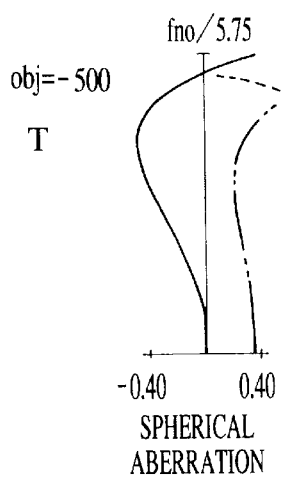
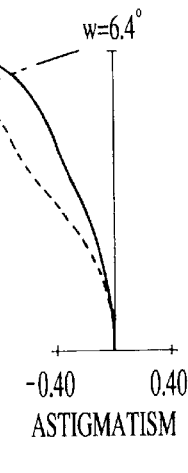
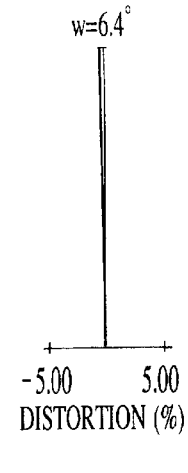
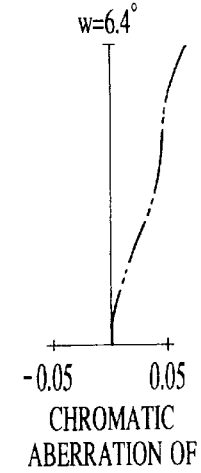
FIG. 20B(9)  FIG. 20B(10)  FIG. 20B(11)  FIG. 20B(12)

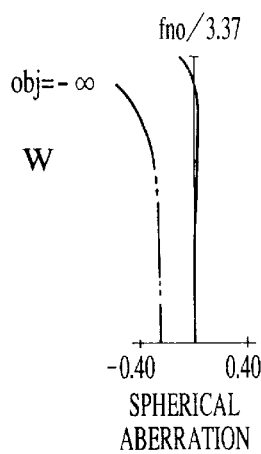
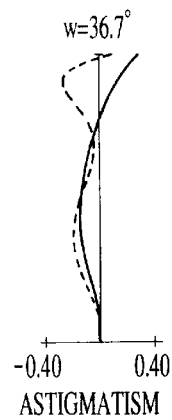
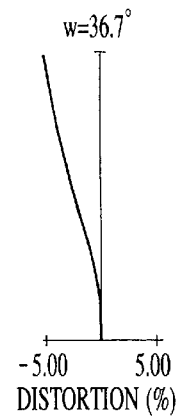
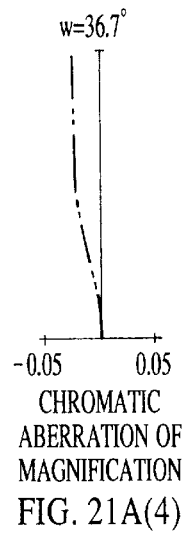
FIG. 21A(1)    FIG. 21A(2)    FIG. 21A(3)    FIG. 21A(4)
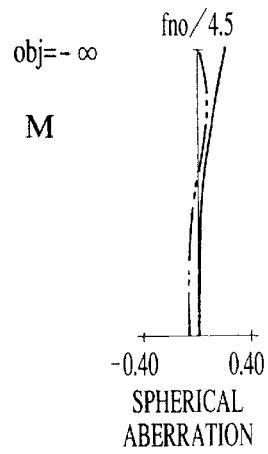
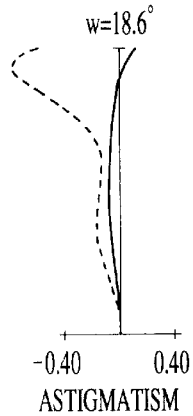
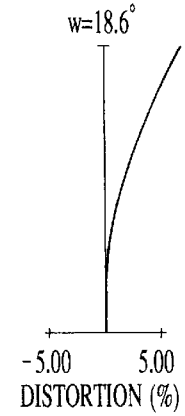
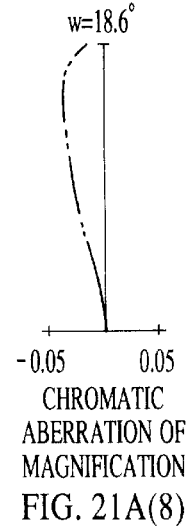
FIG. 21A(5)    FIG. 21A(6)    FIG. 21A(7)    FIG. 21A(8)
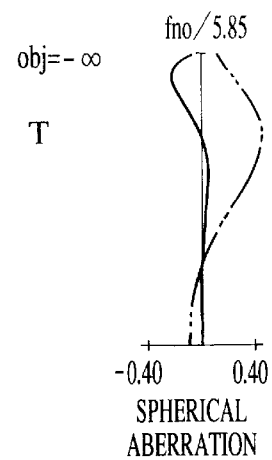
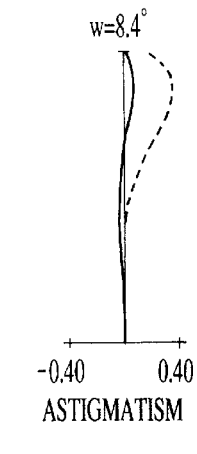
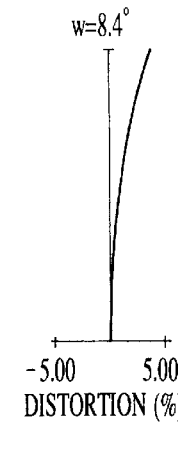
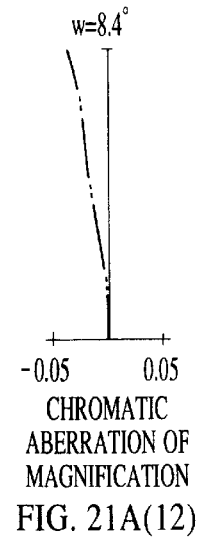
FIG. 21A(9)    FIG. 21A(10)    FIG. 21A(11)    FIG. 21A(12)

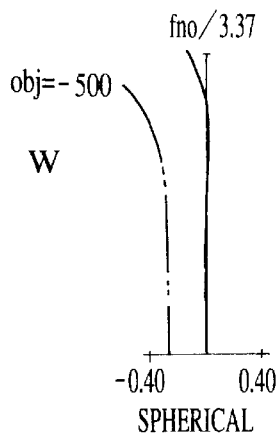
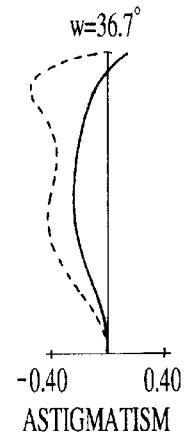
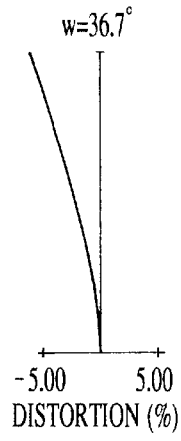
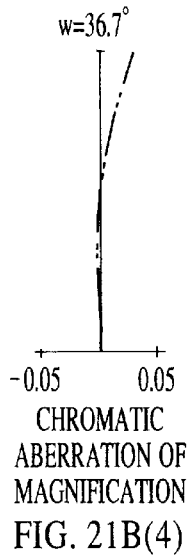
FIG. 21B(1)　　FIG. 21B(2)　　FIG. 21B(3)　　FIG. 21B(4)
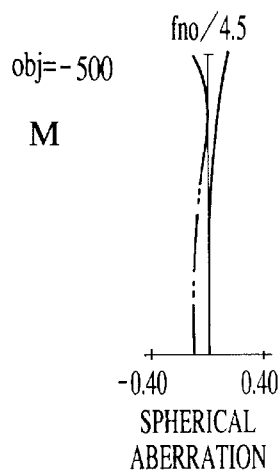
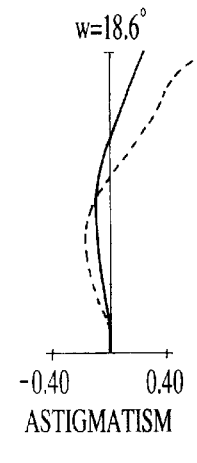
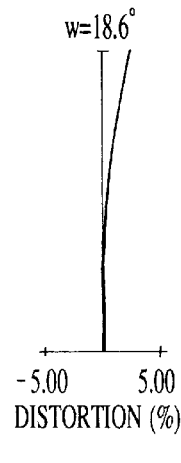
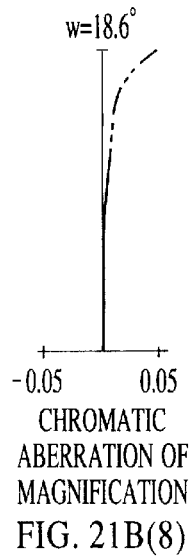
FIG. 21B(5)　　FIG. 21B(6)　　FIG. 21B(7)　　FIG. 21B(8)
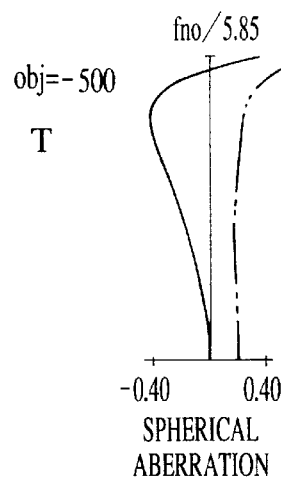
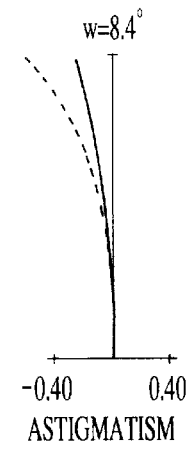
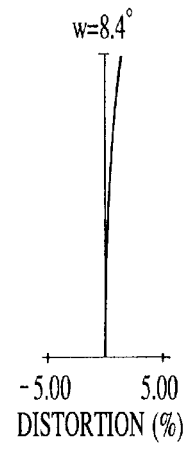
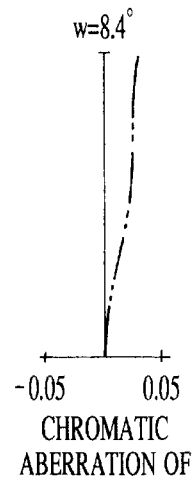
FIG. 21B(9)　　FIG. 21B(10)　　FIG. 21B(11)　　FIG. 21B(12)

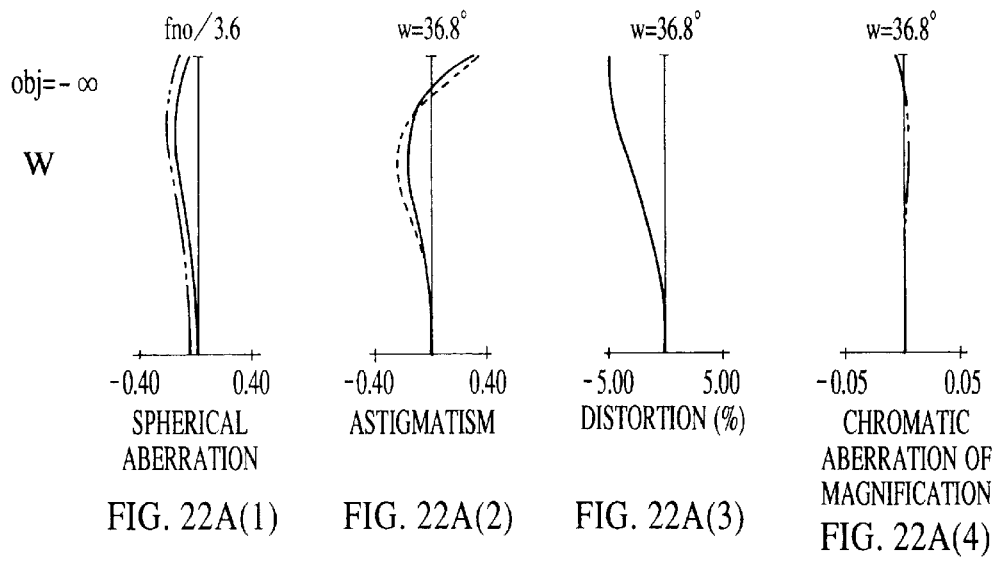
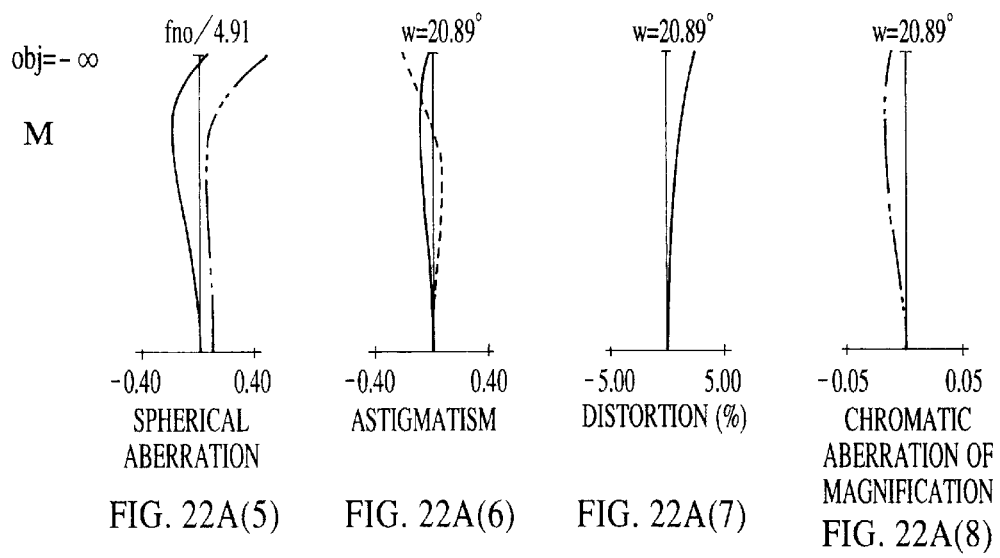
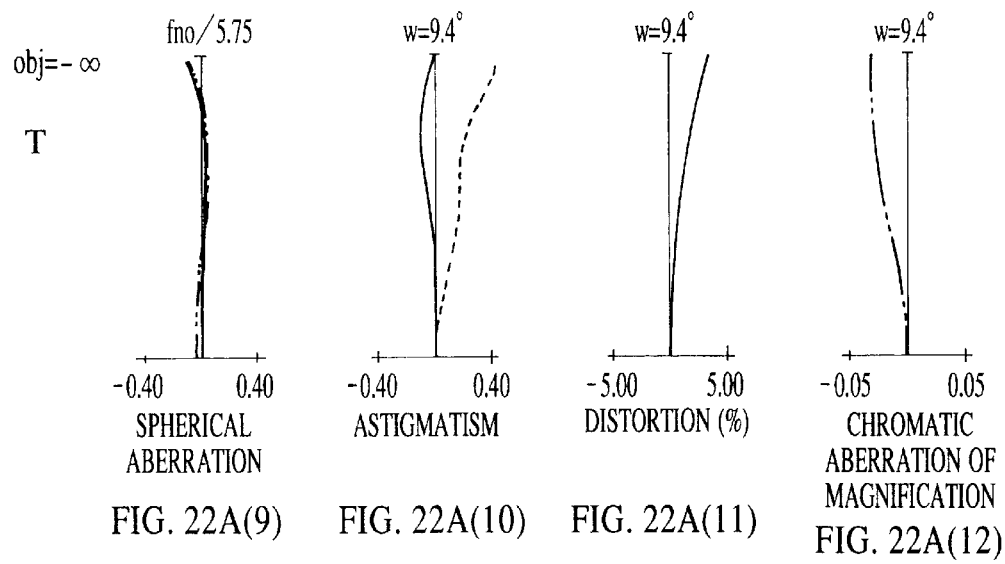

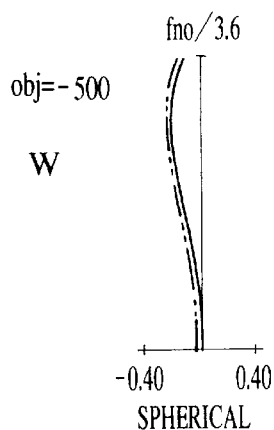
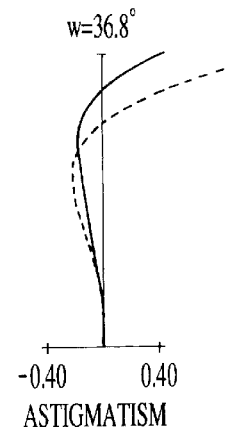
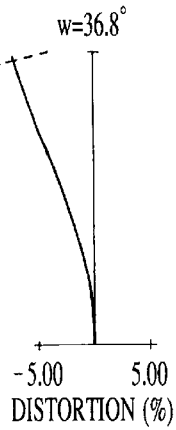
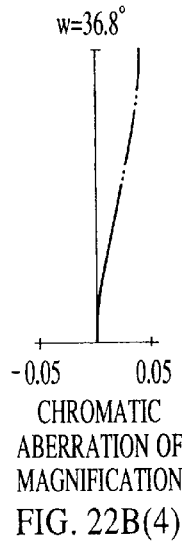
FIG. 22B(1)    FIG. 22B(2)    FIG. 22B(3)    FIG. 22B(4)
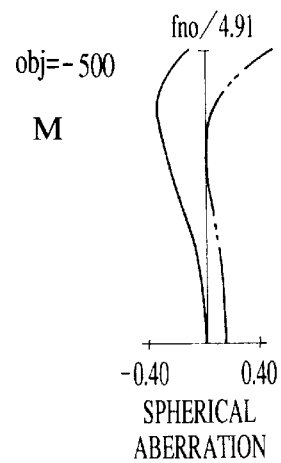
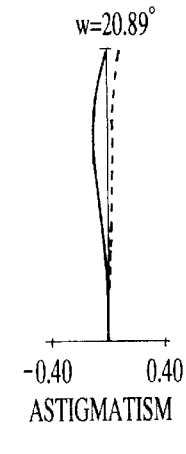
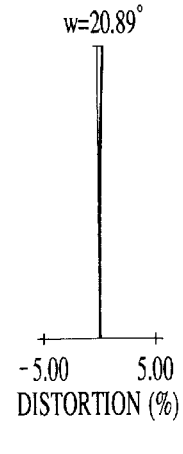
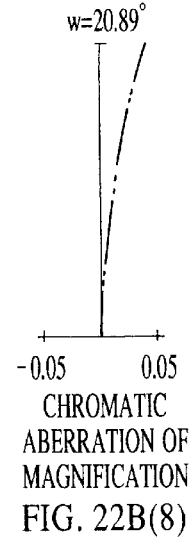
FIG. 22B(5)    FIG. 22B(6)    FIG. 22B(7)    FIG. 22B(8)
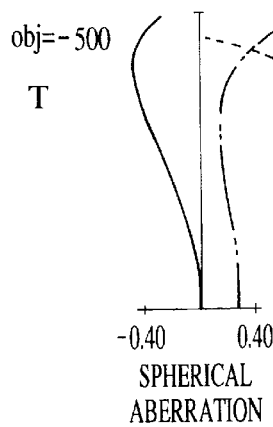
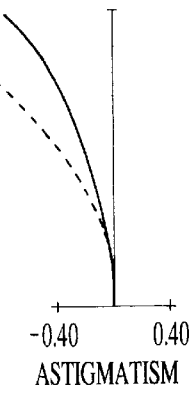
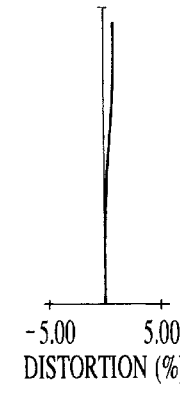
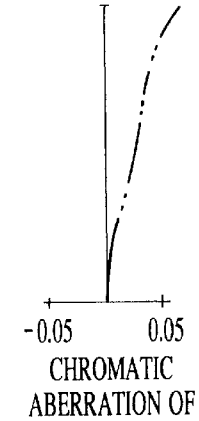
FIG. 22B(9)    FIG. 22B(10)    FIG. 22B(11)    FIG. 22B(12)

ZOOM LENS HAVING FOCUSING SUBUNIT IN SECOND LENS UNIT AND OPTICAL APPARATUS EQUIPPED WITH THE SAME

BACKGROUND OF THE INVENTION

1. Field of the Invention

The present invention relates to a zoom lens and, in particular, to a high-variable-power-ratio zoom lens suitable for use in a single-lens reflex camera, a video camera, etc.

2. Description of the Related Art

Conventionally known zoom-lens focusing systems include a so-called front lens focusing system, in which the first lens unit is moved in the direction of the optical axis, and a so-called inner focusing system and a rear focusing system, in which a lens unit other than the first lens unit is moved in the direction of the optical axis.

Generally speaking, compared with a zoom lens of the front lens focusing system, a zoom lens of the inner focusing system or the rear focusing system is advantageous in that the size of the entire lens system can be reduced since the effective aperture of the first lens unit is small. Further, since focusing is performed moving a relatively small and light-weight lens unit, quick focusing is possible in auto-focusing cameras, which are currently in vogue.

As an example of such a zoom lens of the inner focusing system or the rear focusing system, the present applicant has disclosed in Japanese Patent Laid-Open Nos. 3-228008, 5-119260 and 6-230285 a so-called positive lead type zoom lens system which includes a first, positive lens unit, a second, negative lens unit, and subsequent lens units that are positive as a whole, arranged in that order from the object side, and which effects power variation by varying air gaps between the units, wherein focusing is effected by moving the second, negative lens unit.

This system provides to a sufficient degree the above-mentioned advantage, particularly in a high-variable-power zoom lens including a standard range, and is endowed with an optical performance which is satisfactory over the entire object distance from an object at infinity to a near object.

Here, the magnification of the second, negative lens unit when power variation is effected in a zoom lens of the positive lead type will be explained.

Generally speaking, the second, negative lens unit of a positive lead type zoom lens has a negative reduction ratio at the wide-angle end, and the absolute value of the magnification increases as power variation is effected toward the telephoto end. Further, since the second lens unit is the principal power variation unit of the positive lead type zoom lens, the increase in magnification when power variation of the entire optical system from the wide-angle end to the telephoto end is effected is great (−1 is approached from the negative reduction ratio), which is particularly conspicuous in the case of a high-variable-power zoom lens.

The magnification of a focusing lens unit and the focus sensitivity (the ratio of displacement of focus to displacement of a focus unit) can be expressed by the following formula:

$$ES = (1 - \beta f^2) \times \beta r^2$$

where
ES: focus sensitivity
βf: magnification of focus lens unit
βr: combined magnification of all the lens units arranged on the image side with respect to the focus lens unit.

The above formula shows that the focus sensitivity is 0 when the absolute value of the magnification of the focus lens unit is 1, and that it increases as the absolute value departs from 1.

However, as described above, the second, negative lens unit of a positive lead type zoom lens undergoes variation in power such that −1 is approached from a negative reduction ratio when variation In power is effected in the entire optical system from the wide-angle end to the telephoto end. Thus, when, for example, a near object is photographed with a high power variation zoom lens, the focus sensitivity of the second, negative lens unit decreases near the telephoto end, and the displacement of the focus lens unit increases to an excessive degree. Further, when the magnification of the second, negative lens unit becomes −1 during power variation, the focus sensitivity becomes 0, so that focusing becomes impossible.

SUMMARY OF THE INVENTION

The present invention has been made with a view toward solving the above problems. Accordingly, it is an object of the present invention to provide a small-sized zoom lens in which the displacement of the focus lens unit does not excessively increase during focusing even in the case of a high-power-variable zoom lens.

To achieve the above object, there is provided, in accordance with the present invention, a zoom lens of the type which includes a first lens unit of positive refractive power, a second lens unit of negative refractive power, and a subsequent unit composed of a plurality of or a single lens unit that is positive as a whole, arranged in that order from the long conjugate side, and in which, when variation in power is effected from the wide-angle end to the telephoto end, the distance between the first lens unit and the second lens unit increases and the distance between the second lens unit and the subsequent lens unit decreases, wherein the second lens unit includes a subunit 2a of negative refractive power and a subunit 2b of negative refractive power which is closer to the short conjugate side than the subunit 2a, focusing being performed by the subunit 2b, and wherein, assuming that the magnification of the subunit 2b at the wide-angle end is β2bw, the following condition is satisfied:

$$0 < \beta 2bw < 1.$$

In view of the foregoing, in one aspect, the present invention relates to a zoom lens comprising, in order from a long conjugate side, a first lens unit of positive refractive power; a second lens unit of negative refractive power, the second lens unit comprising a first lens subunit of negative refractive power and a second lens subunit of negative refractive power which is closer to a short conjugate side than the first lens subunit; and a subsequent unit composed of at least one lens unit, the subsequent lens unit being of positive refractive power as a whole, wherein, when variation in power is effected from a wide-angle end to a telephoto end, a distance between the first lens unit and the second lens unit increases and a distance between the second lens unit and the subsequent lens unit decreases, and wherein, assuming that the magnification of the subunit at the wide-angle end is β2bw, the following condition is satisfied:

$$0 < \beta 2bw < 1.$$

In another aspect, the present invention relates to an optical apparatus comprising a zoom lens as discussed above, and a member for supporting the zoom lens.

In yet another aspect, the present invention relates to a zoom lens comprising, in order from the object side to the image side: a first lens unit of positive refractive power; a second lens unit of negative refractive power, the second lens unit comprising, in order from the object side to the image side, a first lens subunit of negative refractive power and a second lens subunit of negative refractive power, focusing being performed by moving the second lens subunit in the optical axis direction while keeping the first lens subunit stationary; and one or more lens units having, as a whole, positive refractive power, wherein, when variation in power is effected from a wide-angle end to a telephoto end, a distance between the first lens unit and the second lens unit increases and a distance between the second lens unit and the one or more lens units decreases, and wherein, assuming that the magnification of the subunit at the wide-angle end is $\beta 2bw$, the following condition is satisfied:

$$0 < \beta 2bw < 1.$$

These and other aspects, objects, advantages, and features of the present invention will become apparent from the following detailed description of preferred embodiments thereof taken In connection with the accompanying drawings.

BRIEF DESCRIPTION OF THE DRAWINGS

FIGS. 1A, 1B, and 1C are sectional views of a zoom lens according to a first embodiment of the present invention;

FIGS. 2A, 2B, and 2C are sectional views of a zoom lens according to a second embodiment of the present invention;

FIGS. 3A, 3B, and 3C are sectional views of a zoom lens according to a third embodiment of the present invention;

FIGS. 4A, 4B, and 4C are sectional views of a zoom lens according to a fourth embodiment of the present invention;

FIGS. 5A, 5B, and 5C are sectional views of a zoom lens according to a fifth embodiment of the present invention;

FIGS. 7A(1)–7A(12) and 7B(1)–7B(12) are aberration diagrams of the zoom lens of the first embodiment of the present invention;

FIGS. 8A(1)–8A(12) and 8B(1)–8B(12) are aberration diagrams of the zoom lens of the second embodiment of the present invention;

FIGS. 9A(1)–9A(12) and 9B(1)–9B(12) are aberration diagrams of the zoom lens of the third embodiment of the present invention;

FIGS. 10A(1)–10A(12) and 10B(1)–10B(12) are aberration diagrams of the zoom lens of the fourth embodiment of the present invention;

FIGS. 11A(1)–11A(12) and 11B(1)–11B(12) are aberration diagrams of the zoom lens of the fifth embodiment of the present invention;

FIGS. 12A(1)–12A(12) and 12B(1)–12B(12) are aberration diagrams of the zoom lens of the sixth embodiment of the present invention;

FIGS. 13A and 13B are diagrams for illustrating the principle of the zoom lens of the present invention.

FIGS. 16A, 16B, and 16C are sectional views of a zoom lens according to an eighth embodiment of the present invention;

FIGS. 17A, 17B, and 17C are sectional views of a zoom lens according to a ninth embodiment of the present invention;

FIGS. 18A, 18B, and 18C are sectional views of a zoom lens according to a tenth embodiment of the present invention;

FIGS. 19A(1)–19A(12) and 19B(1)–19B(12) are aberration diagrams of the zoom lens of the seventh embodiment;

FIGS. 20A(1)–20A(12) and 20B(1)–20B(12) are aberration diagrams of the zoom lens of the eighth embodiment;

FIGS. 21A(1)–21A(12) and 21B(1)–21B(12) are aberration diagrams of the zoom lens of the ninth embodiment; and FIGS. 22A(1)–22A(12) and 22B(1)–22B(12) are aberration diagrams of the zoom lens of the tenth embodiment.

DESCRIPTION OF THE PREFERRED EMBODIMENTS

Figures 6A, 6B, 6C:
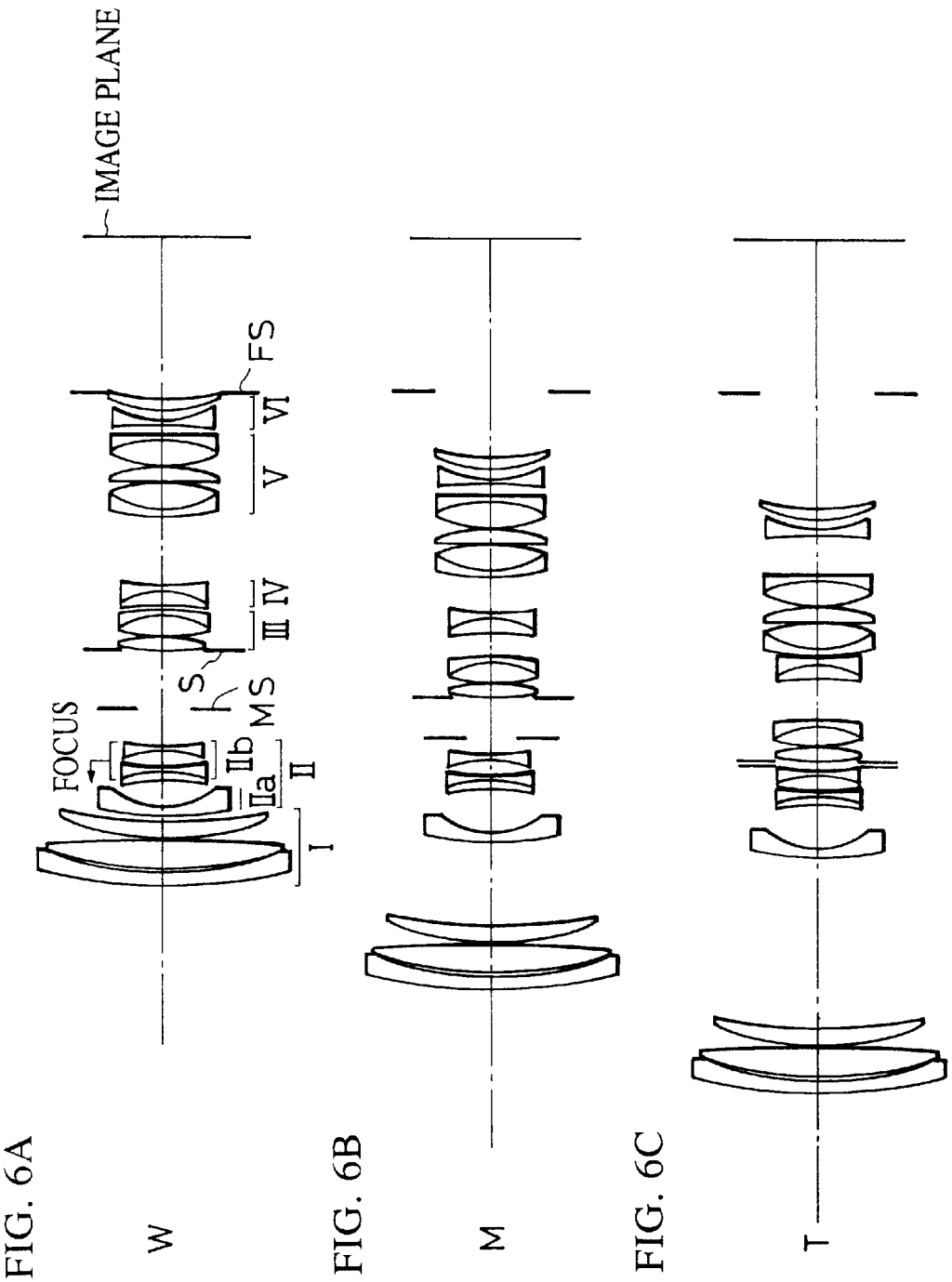
FIGS. 6A, 6B, and 6C are sectional views of a zoom lens according to a sixth embodiment of the present invention.

Embodiments of the zoom lens of the present invention will be described.

As stated above, the focusing by the second, negative lens unit of a positive lead type zoom lens becomes impossible or the focusing displacement excessively increases when the magnification of the second lens unit is −1 or close to −1.

In the zoom lens of the present invention, the second, negative lens unit is divided at least into a negative subunit 2*a* and a negative subunit 2*b*, and focusing is effected by moving the subunit 2*b*, which is arranged nearer to the image than the subunit 2*a*, in the direction of the optical axis. In this arrangement, the negative refractive power of the second lens unit is separated at least into two, so that, as compared to the case in which focusing is effected by the entire second lens unit, the negative refractive power of the focus lens unit is smaller, and it might seem that the focus sensitivity is still lower. However, in reality, the focus sensitivity increases. This principle will now be explained with reference to FIG. 13A and 13B.

As shown in FIGS. 13A and 13B, the image point P1 of the first lens unit is also the object point of the subunit 2*a* (where reference numeral IIa indicates subunit 2*a*), an image being formed at P2*a* by the subunit 2*a*. Further, the point P2*a* is not only the image point of the subunit 2*a*, but also the object point of the subunit 2*b* (where reference numeral IIb indicates subunit 2*b*), an image being formed at P2*b* by the subunit 2*b*. The point P2*b* is not only the image point of the subunit 2*b*, but also the image point of the entire second lens unit.

When, as in the case of FIG. 13A, the magnification of the subunit 2*a* is positive (when the object point P1 and the image point P2*a* of the subunit 2*a* are on the same side of the subunit 2*a*), image formation of P2*a* is effected nearer to the image plane than P1 since the subunit 2*a* is a negative lens. The image point of the entire second lens unit and the image point of the subunit 2*b* are both P2*b*, that is, the same point, so that, when the entire second lens unit and the subunit 2*b* are compared with each other, the absolute value of the magnification of the subunit 2*b*, of which the object point farther, is smaller. Since the magnification of the entire second lens unit is negative, the magnification of the subunit 2*b* is shifted toward the positive side from the magnification of the entire second lens unit.

Conversely, when, as in the case of FIG. 13B, the magnification of the subunit 2*a* is negative (when the object point P1 and the image point P2a of the subunit 2a are on the opposite sides of the subunit 2a), the object point P2a and the image point P2b of the subunit 2b are on the object side of the subunit 2b, so that the magnification of the subunit 2b is positive. The magnification of the entire second lens unit is negative, so that, in this case also, the magnification of the subunit 2b Is shifted toward the positive side from the magnification of the entire second lens unit.

Due to this effect, even when the magnification of the entire second lens unit is −1 or close to −1, as in the case, for example, of a high-variable-power zoom lens, the focus sensitivity of the entire subunit 2b is high, so that focusing of a near object is possible. Within the range in which the effect is obtainable, the subunit 2a may be moved at a speed different from that of the subunit 2b during focusing, or an aberration correction unit, etc. may be arranged between the subunit 2a and the subunit 2b. Further, in the second lens unit, a subsequent lens unit may be provided nearer to the image than the subunit 2b.

Another feature of the zoom lens of the present invention is that it preferably satisfies the following condition:

$$0<\beta 2bw<1 \tag{1}$$

where $\beta 2bw$ is the magnification of the subunit 2b at the wide-angle end.

Formula (1) represents the condition determining the magnification of the subunit 2b. When the upper end of formula (1) is exceeded, the absolute value of the magnification of the entire second lens unit at the wide-angle end becomes too large, with the result that it is difficult to shorten the focal length of the entire optical system at the wide-angle end. On the other hand, beyond the lower end of formula (1), the refractive power of the entire second lens unit at the wide-angle end becomes too weak, so that it is difficult to adopt a retrofocus type lens construction.

Further, the zoom lenses of the first to sixth embodiments satisfy the following condition:

$$-0.8<\beta 2bt<0.8 \tag{2}$$

where $\beta 2bt$ is the magnification of the subunit 2b at the telephoto end.

Formula (2) is the condition determining the magnification of the subunit 2b at the telephoto end. When the condition of formula (2) is not satisfied and the value of $\beta 2bt$ is in the following ranges:

$$0.8 \leq \beta 2bt \leq 1.2$$

$$-1.2 \leq \beta 2bt \leq -0.8$$

the focus sensitivity of the subunit 2b at the telephoto end is too low, so that the focusing displacement becomes too large or focusing becomes impossible. When the value of $\beta 2bt$ is further deviated from the condition and in the following ranges:

$$1.2<\beta 2bt$$

$$\beta 2bt<-1.2$$

the balance in the magnification sharing with the other optical systems in the second lens unit is deteriorated, with the result that it is difficult to correct field curvature, variation in spherical aberration as a result of focusing, etc.

Preferably, the range of formula (1) should be as follows:

$$0<\beta 2bw<0.5 \tag{3}$$

Further, in addition to formula (1) or formulas (1) and (2), the zoom lenses of the first through sixth embodiments satisfy the following conditions:

$$-2<1/\beta 2at<0.9 \tag{4}$$

$$-0.5<\beta 2bt<0.8 \tag{5}$$

$$\beta 2bt<\beta 2bw \tag{6}$$

$$0.3<\log Z2/\log Z<0.9 \tag{7}$$

where
$Z2=\beta 2t/\beta 2w$
$Z=ft/fw$
$\beta 2at$: magnification of the subunit 2a at the telephoto end
$\beta 2w$: magnification of the second lens unit at the wide-angle end
$\beta 2t$: magnification of the second lens unit at the telephoto end
fw: focal length of the entire system at the wide-angle end
ft: focal length of the entire system at the telephoto end In the present specification, "log" represents a common logarithm (the base of which is 10).

Formula (4) is the condition determining the magnification of the subunit 2a at the telephoto end. When the condition of formula (4) is departed from, it becomes difficult for the absolute value of the magnification of the subunit 2b at the telephoto end to be far from 1, and the focus sensitivity of the subunit 2b becomes too low.

Formula (5) is the condition for determining the lower limit of formula (2) in a still more desirable range.

Formula (6) is the condition determining the relationship between the magnifications at the wide-angle end and the telephoto end of the subunit 2b. When the condition of formula (6) is satisfied, and the magnification of the subunit 2b at the telephoto end is positive, it becomes easier, from the above formula of focus sensitivity, to increase the focus sensitivity at the telephoto end. Further, even when the condition of formula (6) is satisfied, and the magnification of the subunit 2b at the telephoto end is negative, the above effect is not impaired much as long as the range of formula (5) is not departed from.

Formula (7) is the condition for determining the sharing of power variation of the second lens unit in the entire optical system. When the upper limit of formula (7) is exceeded, the power variation sharing of the second lens unit becomes too large, so that it becomes difficult to correct variation in aberrations of the second lens unit during zooming. On the other hand, beyond the lower limit of formula (7), the power variation sharing of the lens units other than the second lens unit becomes too large, so that it becomes difficult to correct variation in aberrations of the lens units other than the second lens unit during zooming.

Further, it is desirable that formulas (4) and (5) be in the following ranges:

$$-0.9<1/\beta 2at<0.5 \tag{8}$$

$$-0.3<\beta 2bt<0.3 \tag{9}$$

Further, in addition to formula (1), or formulas (1) and (2), or formulas (1), (2) and (4) through (7), the zoom lenses of the first to sixth embodiments satisfy the following condition:

$$Dabw<Dabt \tag{10}$$

where Dabw: air gap between the subunit 2a and the subunit 2b at the wide-angle end Dabt: air gap between the subunit 2a and the subunit 2b at the telephoto end Formula (10) is the condition for determining the relationship between the air gap between the subunit 2a and the subunit 2b at the wide-angle end and the air gap between the subunit 2a and the subunit 2b at the telephoto end. In accordance with the present invention, the focus sensitivity at the telephoto end of the zoom lens is made appropriate. However, depending upon restrictions in design in terms of, for example, the necessity to secure aberration correction and power variation, it can happen that the focus sensitivity at the telephoto end is lower than the focus sensitivity at the wide-angle end. When formula (10) is satisfied, it is possible to efficiently secure the replacement of the focus lens unit of the subunit 2b at the wide-angle end and the telephoto end, so that it is possible, for example, to prevent an increase in the size of the front lens system at the wide-angle end.

Next, zoom lenses according to first through sixth embodiments will be more specifically described.

FIG. 1 is a sectional view of a zoom lens according to a first embodiment of the present invention. In the drawing, numeral I indicates a first, positive lens unit, numeral II indicates a second, negative lens unit, numeral IIa indicates a negative subunit 2a, numeral IIb indicates a negative subunit 2b, numeral III indicates a third, positive lens unit, numeral IV indicates a fourth, negative lens unit, numeral V indicates a fifth, positive lens unit, and symbol S indicates a diaphragm.

When power variation is effected from the wide-angle end to the telephoto end, the first lens unit I moves toward the object, the subunit 2a, indicated by IIa, moves toward the object while increasing the distance between it and the first lens unit I, the subunit 2b, indicated by IIb, moves toward the object while increasing the distance between it and the subunit 2a, indicated by IIa, the third lens unit III moves toward the object while decreasing the distance between it and the second subunit 2b, indicated by IIb, the fourth lens unit IV moves toward the object while increasing the distance between it and the third lens unit III, and the fifth lens unit V moves toward the object integrally with the third lens unit III while increasing the distance between it and the fourth lens unit IV. The subunit 2b, indicated by IIb, is a focus lens unit, and moves from an infinite object toward the object in short-range focusing.

FIGS. 2A, 2B and 2C are sectional views of a zoom lens according to a second embodiment of the present invention. In the drawing, numeral I indicates a first, positive lens unit, numeral II indicates a second, negative lens unit, numeral IIa indicates a negative subunit 2a, numeral IIb indicates a negative subunit 2b, numeral III indicates a third, positive lens unit, numeral IV indicates a fourth, positive lens unit, and symbol S indicates a diaphragm.

When power variation is effected from the wide-angle end to the telephoto end, the first lens unit I moves toward the object, the subunit 2a, indicated by IIa, moves toward the object while increasing the distance between it and the first lens unit I, the subunit 2b, indicated by IIb, moves toward the object while increasing the distance between it and the subunit 2a, indicated by IIa, the third lens unit III moves toward the object while decreasing the distance between it and the second subunit 2b, indicated by IIb, and the fourth lens unit IV moves toward the object while decreasing the distance between it and the third lens unit III. The subunit 2b, indicated by IIb, is a focus lens unit, and moves from an infinite object toward the object in short-range focusing.

FIGS. 3A, 3B and 3C and 4A, 4B and 4C are sectional views of zoom lenses according to third and fourth embodiments of the present invention, respectively. In the drawings, numeral I indicates a first, positive lens unit, numeral II indicates a second, negative lens unit, numeral IIa indicates a negative subunit 2a, numeral IIb indicates a negative subunit 2b, numeral III indicates a third, positive lens unit, numeral IV indicates a fourth, negative lens unit, numeral V indicates a fifth, positive lens unit, and symbol S indicates a diaphragm.

When power variation is effected from the wide-angle end to the telephoto end, the first lens unit I moves toward the object, the subunit 2a, indicated by IIa, moves toward the object while increasing the distance between it and the first lens unit I, the subunit 2b, indicated by IIb, moves over in a locus convex toward the object while increasing the distance between it and the subunit 2a, indicated by IIa, the third lens unit III moves toward the object while decreasing the distance between it and the second subunit 2b, indicated by IIb, the fourth lens unit IV moves toward the object while increasing the distance between it and the third lens unit III, and the fifth lens unit V moves toward the object integrally with the third lens unit III while decreasing the distance between it and the fourth lens unit IV. The subunit 2b, indicated by IIb, Is a focus lens unit, and moves from an infinite object toward the object in short-range focusing.

FIGS. 5A, 5B and 5C and 6A, 6B and 6C are sectional views of zoom lenses according to fifth and sixth embodiments of the present invention, respectively. In the drawings, numeral I indicates a first, positive lens unit, numeral II indicates a second, negative lens unit, numeral IIa indicates a negative subunit 2a, numeral IIb indicates a negative subunit 2b, numeral III indicates a third, positive lens unit, numeral IV indicates a fourth, negative lens unit, numeral V indicates a fifth, positive lens unit, numeral VI indicates a sixth, negative lens unit, symbol S indicates a diaphragm, symbol MS indicates a movable diaphragm, and symbol FS indicates a flare cutter.

When power variation is effected from the wide-angle end to the telephoto end, the first lens unit I moves toward the object, the subunit 2a, indicated by IIa, moves toward the object while increasing the distance between it and the first lens unit I, the subunit 2b, indicated by IIb, moves toward the object while increasing the distance between it and the subunit 2a, indicated by IIa, the movable diaphragm MS moves toward the object while decreasing the distance between it and the subunit 2b, indicated by IIb, and enlarging the aperture diameter, the third lens unit III moves toward the object while decreasing the distance between it and the subunit 2b, indicated by IIb, the fourth lens unit IV moves toward the object while increasing the distance between it and the third lens unit III, the fifth lens unit V moves toward the object while decreasing the distance between it and the fourth lens unit IV, and the sixth lens unit VI moves toward the object while increasing the distance between it and the fifth lens unit V. The subunit 2b, indicated by IIb, is a focus lens unit, and moves from an infinite object toward the object in short-range focusing. The flare cutter FS is stationary with respect to the image plane.

In FIGS. 1A through 6C, W, M and T respectively correspond to the wide-angle end, an intermediate focal length, and the telephoto end.

Numerical examples of the embodiments are given below. Numerical examples 1 through 6 correspond to the zoom lenses of the first through sixth embodiments, respectively.

In the numerical examples, symbol Ri indicates (in mm) the radius of curvature of the i-th lens surface as counted from the object side, symbol Di indicates (in mm) the thickness or the air gap of the i-th lens as counted from the object side, and Ni and νi respectively indicate the refractive index and the Abbe number of the i-th lens as counted from the object side. Symbols A, B, C, D and E indicate aspherical coefficients. The notation e+i stands for ×10$^{i}$ and e-i for ×10$^{-i}$. Assuming that the intersection of the lens surface and the optical axis is the origin and that the direction in which light travels is positive, the aspherical configuration is expressed as follows:

$$X = \frac{Y^2/r}{1+\sqrt{1-(Y/r)^2}} + AY^2 + BY^4 + CY^6 + DY^8 + EY^{10}$$

where X is the position in the optical axis direction, and Y is the position perpendicular to the optical axis.

FIGS. 7A(1)–7B(12) through 12A(1)–12B(12) are aberration diagrams corresponding to the zoom lenses of numerical examples 1 through 6, respectively. In the drawings, W represents an aberration diagram at the wide-angle end, M represents an aberration diagram at intermediate focal length, and T represents an aberration diagram at the telephoto end. Part A shows a case in which the object is at infinity, and part B shows a case in which the object is near.

In the aberration diagrams of FIGS. 7A(1) through 12B (12) showing spherical aberrations, the solid line indicates the d-line wavelength, the two-dot chain line indicates g-line wavelength, and the broken line indicates the sine condition. In the aberration diagrams showing astigmatism, the solid line indicates the sagittal image surface, and the dashed line indicates the meridional image surface.

NUMERICAL EXAMPLE 1

| f = 28.90–101.58 | $F_{no}$ = 3.57–4.67 | | 2ω = 73.6–24.1 |
|---|---|---|---|
| R1 = 102.026 | D1 = 2.00 | N1 = 1.846659 | ν1 = 23.8 |
| R2 = 51.893 | D2 = 6.04 | N2 = 1.696797 | ν2 = 55.5 |
| R3 = 424.300 | D3 = 0.12 | | |
| R4 = 44.599 | D4 = 4.78 | N3 = 1.696797 | ν3 = 55.5 |
| R5 = 129.757 | D5 = variable | | |
| R6 = 66.293 | D6 = 1.20 | N4 = 1.712995 | ν4 = 53.8 |
| R7 = 15.769 | D7 = variable | | |
| R8 = −66.529 | D8 = 1.10 | N5 = 1.882997 | ν5 = 40.8 |
| R9 = 24.176 | D9 = 1.13 | | |
| R10 = 24.357 | D10 = 3.26 | N6 = 1.846658 | ν6 = 23.9 |
| R11 = −53.985 | D11 = 0.35 | | |
| R12 = −38.850 | D12 = 1.10 | N7 = 1.834000 | ν7 = 37.2 |
| R13 = 112.860 | D13 = variable | | |
| R14 = diaphragm | D14 = 0.00 | | |
| R15 = 24.496 | D15 = 1.20 | N8 = 1.846659 | ν8 = 23.8 |
| R16 = 13.997 | D16 = 5.42 | N9 = 1.603112 | ν9 = 60.7 |
| R17 = −66.163 | D17 = 0.12 | | |
| R18 = 28.916 | D18 = 1.86 | N10 = 1.772499 | ν10 = 49.6 |
| R19 = 61.152 | D19 = variable | | |
| R20 = −39.670 | D20 = 2.92 | N11 = 1.755199 | ν11 = 27.5 |
| R21 = −12.463 | D21 = 1.10 | N12 = 1.804000 | ν12 = 46.6 |
| R22 = −564.896 | D22 = variable | | |
| R23 = 206.930 | D23 = 5.62 | N13 = 1.487490 | ν13 = 70.2 |
| R24 = 918.031 | D24 = 0.12 | | |
| R25 = 86.970 | D25 = 2.65 | N14 = 1.696797 | ν14 = 55.5 |
| R26 = −67.777 | D26 = 2.81 | | |
| R27 = −18.100 | D27 = 1.40 | N15 = 1.846659 | ν15 = 23.8 |
| R28 = −49.826 | | | |
| variable-distance\focal-length | 28.90 | 50.00 | 101.58 |
| D5 | 0.50 | 11.27 | 24.99 |
| D7 | 6.87 | 7.74 | 10.17 |
| D13 | 14.94 | 8.77 | 2.29 |
| D19 | 2.58 | 6.69 | 10.13 |
| D22 | 7.70 | 3.59 | 0.15 |

NUMERICAL EXAMPLE 2

| f = 29.00–100.53 | $F_{no}$ = 3.45–4.65 | | 2ω = 73.5–24.3 |
|---|---|---|---|
| R1 = 70.805 | D1 = 1.70 | N1 = 1.846659 | ν1 = 23.8 |
| R2 = 42.561 | D2 = 7.99 | N2 = 1.696797 | ν2 = 55.5 |
| R3 = 170.878 | D3 = 0.10 | | |
| R4 = 56.638 | D4 = 4.92 | N3 = 1.696797 | ν3 = 55.5 |
| R5 = 179.665 | D5 = variable | | |
| *R6 = 68.405 | D6 = 1.50 | N4 = 1.804000 | ν4 = 46.6 |
| R7 = 16.581 | D7 = 4.65 | | |
| R8 = 1611.036 | D8 = 1.55 | N5 = 1.805181 | ν5 = 25.4 |
| R9 = −120.905 | D9 = variable | | |
| R10 = −51.179 | D10 = 1.00 | N6 = 1.804000 | ν6 = 26.6 |
| R11 = 25.714 | D11 = 0.45 | | |
| R12 = 23.010 | D12 = 2.93 | N7 = 1.805181 | ν7 = 25.4 |
| R13 = −127.838 | D13 = 0.73 | | |
| R14 = −35.068 | D14 = 0.80 | N8 = 1.772499 | ν8 = 49.6 |
| R15 = 174.407 | D15 = variable | | |
| R16 = diaphragm | D16 = 0.30 | | |
| R17 = 211.934 | D17 = 1.55 | N9 = 1.603112 | ν9 = 60.7 |
| R18 = −96.893 | D18 = 0.22 | | |
| R19 = 22.077 | D19 = 4.88 | N10 = 1.696797 | ν10 = 55.5 |
| R20 = −37.091 | D20 = 0.37 | | |
| R21 = −26.587 | D21 = 3.94 | N11 = 1.800999 | ν11 = 35.0 |
| R22 = 132.289 | D22 = variable | | |
| R23 = 67.196 | D23 = 5.90 | N12 = 1.583126 | ν12 = 59.4 |
| *R24 = −19.777 | D24 = 3.56 | | |
| R25 = −13.582 | D25 = 1.29 | N13 = 1.805181 | ν13 = 25.4 |
| R26 = −20.431 | | | |
| variable-distance\focal-length | 29.00 | 49.99 | 100.53 |
| D5 | 0.50 | 11.41 | 26.87 |
| D9 | 2.06 | 3.46 | 5.33 |
| D15 | 14.02 | 7.50 | 1.65 |
| D22 | 10.23 | 8.37 | 7.18 |

Aspherical Coefficient surface 6: A=0.00000e+00 B=1.40664e−06 C=−2.16669e−09 D=6.23480e−12 E=0.00000e+00 surface 24: A=0.00000e+00 B=3.84723e−06 C=−3.92884e−08 D=3.96369e−10 E=−4.61841e−12

NUMERICAL EXAMPLE 3

| f = 28.90–101.53 | $F_{no}$ = 3.63–4.67 | | 2ω = 73.6–24.1 |
|---|---|---|---|
| R1 = 97.387 | D1 = 2.00 | N1 = 1.846659 | ν1 = 23.8 |
| R2 = 53.704 | D2 = 6.45 | N2 = 1.696797 | ν2 = 55.5 |
| R3 = 285.841 | D3 = 0.12 | | |
| R4 = 45.288 | D4 = 5.50 | N3 = 1.696797 | ν3 = 55.5 |
| R5 = 133.190 | D5 = variable | | |
| R6 = 67.158 | D6 = 1.20 | N4 = 1.804000 | ν4 = 46.6 |
| R7 = 17.316 | D7 = 4.75 | | |
| R8 = −214.243 | D8 = 1.50 | N5 = 1.698947 | ν5 = 30.1 |
| R9 = −142.144 | D9 = variable | | |
| R10 = −65.466 | D10 = 1.10 | N6 = 1.882997 | ν6 = 40.8 |
| R11 = 22.588 | D11 = 1.72 | | |
| R12 = 25.191 | D12 = 2.99 | N7 = 1.846658 | ν7 = 23.9 |
| R13 = −81.927 | D13 = 0.36 | | |
| R14 = −50.106 | D14 = 1.10 | N8 = 1.806098 | ν8 = 41.0 |
| R15 = 155.874 | D15 = variable | | |
| R16 = diaphragm | D16 = 0.00 | | |
| R17 = 25.211 | D17 = 1.20 | N9 = 1.846659 | ν9 = 23.8 |
| R18 = 13.902 | D18 = 5.41 | N10 = 1.603112 | ν10 = 60.7 |
| R19 = −71.675 | D19 = 0.12 | | |
| R20 = 28.195 | D20 = 1.75 | N11 = 1.772499 | ν11 = 49.6 |
| R21 = 54.525 | D21 = variable | | |
| R22 = −53.616 | D22 = 3.21 | N12 = 1.755199 | ν12 = 27.5 |
| R23 = −12.463 | D23 = 1.10 | N13 = 1.804000 | ν13 = 46.6 |
| R24 = −632.315 | D24 = variable | | |
| R25 = 304.344 | D25 = 5.06 | N14 = 1.487490 | ν14 = 70.2 |
| R26 = −18.198 | D26 = 0.12 | | |
| R27 = 72.084 | D27 = 2.66 | N15 = 1.696797 | ν15 = 55.5 |
| R28 = −69.699 | D28 = 2.75 | | |
| R29 = −18.477 | D29 = 1.40 | N16 = 1.846659 | ν16 = 23.8 |
| R30 = −74.753 | | | |

| -continued | | | |
|---|---|---|---|
| variable-distance\focal-length | 28.90 | 50.00 | 101.53 |
| D5 | 0.50 | 11.26 | 26.01 |
| D9 | 2.21 | 2.91 | 5.87 |
| D15 | 15.52 | 8.99 | 2.26 |
| D21 | 2.31 | 7.14 | 10.18 |
| D24 | 8.12 | 3.29 | 0.25 |

NUMERICAL EXAMPLE 4

| f = 28.90–129.62 | $F_{no}$ = 3.63–5.05 | $2\omega$ = 73.6–18.9 | |
|---|---|---|---|
| R1 = 99.438 | D1 = 2.00 | N1 = 1.846659 | $\nu 1$ = 23.8 |
| R2 = 53.376 | D2 = 8.81 | N2 = 1.696797 | $\nu 2$ = 55.5 |
| R3 = 416.468 | D3 = 0.12 | | |
| R4 = 42.711 | D4 = 6.58 | N3 = 1.696797 | $\nu 3$ = 55.5 |
| R5 = 104.659 | D5 = variable | | |
| R6 = 61.437 | D6 = 1.20 | N4 = 1.804000 | $\nu 4$ = 46.6 |
| R7 = 18.345 | D7 = 5.45 | | |
| R8 = −164.382 | D8 = 1.50 | N5 = 1.698947 | $\nu 5$ = 30.1 |
| R9 = −63.504 | D9 = variable | | |
| R10 = −52.701 | D10 = 1.10 | N6 = 1.882997 | $\nu 6$ = 40.8 |
| R11 = 19.537 | D11 = 1.31 | | |
| R12 = 21.028 | D12 = 3.35 | N7 = 1.846658 | $\nu 7$ = 23.9 |
| R13 = −126.059 | D13 = 0.61 | | |
| R14 = −45.272 | D14 = 1.10 | N8 = 1.806098 | $\nu 8$ = 41.0 |
| R15 = 113.769 | D15 = variable | | |
| R16 = diaphragm | D16 = 0.00 | | |
| R17 = 25.691 | D17 = 1.20 | N9 = 1.846659 | $\nu 9$ = 23.8 |
| R18 = 13.450 | D18 = 4.76 | N10 = 1.603112 | $\nu 10$ = 60.7 |
| R19 = −70.911 | D19 = 0.12 | | |
| R20 = 26.195 | D20 = 1.77 | N11 = 1.772499 | $\nu 11$ = 49.6 |
| R21 = 63.034 | D21 = variable | | |
| R22 = −52.944 | D22 = 3.08 | N12 = 1.755199 | $\nu 12$ = 27.5 |
| R23 = −12.463 | D23 = 1.10 | N13 = 1.804000 | $\nu 13$ = 46.6 |
| R24 = 579.525 | D24 = variable | | |
| R25 = 132.613 | D25 = 4.95 | N14 = 1.487490 | $\nu 14$ = 70.2 |
| R26 = −18.301 | D26 = 0.12 | | |
| R27 = 79.081 | D27 = 2.45 | N15 = 1.696797 | $\nu 15$ = 55.5 |
| R28 = −73.176 | D28 = 3.70 | | |
| R29 = −17.191 | D29 = 1.40 | N16 = 1.846659 | $\nu 16$ = 23.8 |
| R30 = −62.994 | | | |
| variable-distance\focal-length | 28.90 | 58.86 | 129.62 |
| D5 | 0.50 | 14.24 | 28.14 |
| D9 | 1.28 | 2.46 | 6.60 |
| D15 | 16.62 | 9.04 | 1.77 |
| D21 | 1.97 | 7.12 | 9.48 |
| D24 | 7.74 | 2.59 | 0.23 |

NUMERICAL EXAMPLE 5

| f = 28.94–193.10 | $F_{no}$ = 3.40–5.85 | $2\omega$ = 73.6–12.8 | |
|---|---|---|---|
| R1 = 148.679 | D1 = 2.90 | N1 = 1.846658 | $\nu 1$ = 23.9 |
| R2 = 83.648 | D2 = 0.91 | | |
| R3 = 89.856 | D3 = 7.86 | N2 = 1.592400 | $\nu 2$ = 68.3 |
| R4 = −435.833 | D4 = 0.15 | | |
| R5 = 69.249 | D5 = 4.99 | N3 = 1.729157 | $\nu 3$ = 54.7 |
| R6 = 199.367 | D6 = variable | | |
| R7 = 102.576 | D7 = 1.50 | N4 = 1.804000 | $\nu 4$ = 46.6 |
| R8 = 20.203 | D8 = variable | | |
| R9 = −40.571 | D9 = 1.10 | N5 = 1.882997 | $\nu 5$ = 40.8 |
| R10 = 82.046 | D10 = 0.25 | | |
| R11 = 47.203 | D11 = 4.14 | N6 = 1.846660 | $\nu 6$ = 23.8 |
| R12 = −35.566 | D12 = 0.18 | | |
| R13 = −33.768 | D13 = 1.10 | N7 = 1.882997 | $\nu 7$ = 40.8 |
| R14 = 150.049 | D14 = variable | | |
| R15 = adjustable diaphragm | D15 = variable | | |
| R16 = diaphragm | D16 = 0.00 | | |
| R17 = 66.231 | D17 = 3.29 | N8 = 1.603112 | $\nu 8$ = 60.7 |
| *R18 = 67.824 | D18 = 0.15 | | |
| R19 = 42.000 | D19 = 5.85 | N9 = 1.696797 | $\nu 9$ = 55.5 |
| R20 = −22.270 | D20 = 1.15 | N10 = 2.022040 | $\nu 10$ = 29.1 |
| R21 = −91.685 | D21 = variable | | |
| R22 = −106.676 | D22 = 4.05 | N11 = 1.846660 | $\nu 11$ = 23.8 |
| R23 = −19.073 | D23 = 1.10 | N12 = 1.834807 | $\nu 12$ = 42.7 |
| R24 = 82.915 | D24 = variable | | |
| R25 = 62.805 | D25 = 1.50 | N13 = 1.728250 | $\nu 13$ = 28.5 |
| R26 = 25.086 | D26 = 6.79 | N14 = 1.603112 | $\nu 14$ = 60.7 |
| R27 = −59.528 | D27 = 0.15 | | |
| R28 = 325.424 | D28 = 4.27 | N15 = 1.516330 | $\nu 15$ = 64.2 |
| *R29 = −39.058 | D29 = 0.15 | | |
| R30 = 40.900 | D30 = 6.90 | N16 = 1.516330 | $\nu 16$ = 64.2 |
| R31 = −34.710 | D31 = 1.20 | N17 = 1.901355 | $\nu 17$ = 31.6 |
| R32 = 1136.527 | D32 = variable | | |
| R33 = −76.329 | D33 = 1.30 | N18 = 1.772499 | $\nu 18$ = 49.6 |
| R34 = 30.046 | D34 = 2.42 | | |
| R35 = 33.653 | D35 = 3.18 | N19 = 1.846658 | $\nu 19$ = 23.9 |
| R36 = 70.208 | D36 = variable | | |
| R37 = flare cutter | | | |
| variable-distance\focal-length | 28.94 | 60.30 | 193.10 |
| D6 | 1.00 | 21.02 | 43.71 |
| D8 | 9.49 | 14.14 | 13.77 |
| D14 | 9.48 | 3.97 | 0.83 |
| D15 | 15.32 | 10.40 | 1.19 |
| D21 | 1.30 | 6.31 | 11.32 |
| D24 | 18.00 | 9.32 | 0.50 |
| D32 | 2.11 | 3.02 | 10.52 |
| D36 | 1.76 | 15.98 | 28.04 |

NUMERICAL EXAMPLE 6

| f = 29.01–293.80 | $F_{no}$ = 3.71–5.85 | $2\omega$ = 73.4–8.4 | |
|---|---|---|---|
| R1 = 183.319 | D1 = 2.90 | N1 = 1.846658 | $\nu 1$ = 23.9 |
| R2 = 88.512 | D2 = 0.83 | | |
| R3 = 93.306 | D3 = 9.51 | N2 = 1.592400 | $\nu 2$ = 68.3 |
| R4 = −239.268 | D4 = 0.15 | | |
| R5 = 55.594 | D5 = 5.49 | N3 = 1.729157 | $\nu 3$ = 54.7 |
| R6 = 117.057 | D6 = variable | | |
| R7 = 115.092 | D7 = 1.50 | N4 = 1.804000 | $\nu 4$ = 46.6 |
| R8 = 20.275 | D8 = variable | | |
| R9 = −39.253 | D9 = 1.76 | N5 = 1.805181 | $\nu 5$ = 25.4 |
| R10 = −31.927 | D10 = 1.00 | N6 = 1.882997 | $\nu 6$ = 40.8 |
| R11 = 86.386 | D11 = 0.15 | | |
| R12 = 49.417 | D12 = 4.45 | N7 = 1.846660 | $\nu 7$ = 23.8 |
| R13 = −35.125 | D13 = 0.08 | | |
| R14 = −35.387 | D14 = 1.10 | N8 = 1.882997 | $\nu 8$ = 40.8 |
| R15 = 111.411 | D15 = variable | | |
| R16 = adjustable diaphragm | D16 = variable | | |
| R17 = diaphragm | D17 = 0.00 | | |
| R18 = 51.158 | D18 = 4.34 | N9 = 1.603112 | $\nu 9$ = 60.7 |
| *R19 = −58.489 | D19 = 0.15 | | |
| R20 = 41.917 | D20 = 6.96 | N10 = 1.696797 | $\nu 10$ = 55.5 |
| R21 = −21.065 | D21 = 1.15 | N11 = 2.022040 | $\nu 11$ = 29.1 |
| R22 = −115.329 | D22 = variable | | |
| R23 = −83.130 | D23 = 4.38 | N12 = 1.846660 | $\nu 12$ = 23.8 |
| R24 = −17.289 | D24 = 1.10 | N13 = 1.834807 | $\nu 13$ = 42.7 |
| R25 = 61.631 | D25 = variable | | |
| R26 = 47.886 | D26 = 1.50 | N14 = 1.728250 | $\nu 14$ = 28.5 |
| R27 = 26.482 | D27 = 7.17 | N15 = 1.603112 | $\nu 15$ = 60.7 |
| R28 = −85.988 | D28 = 0.15 | | |
| R29 = 188.993 | D29 = 4.65 | N16 = 1.516330 | $\nu 16$ = 64.2 |
| *R30 = −344.991 | D30 = 0.15 | | |
| R31 = 48.830 | D31 = 7.40 | N17 = 1.516330 | $\nu 17$ = 64.2 |
| R32 = −30.259 | D32 = 1.20 | N18 = 1.901355 | $\nu 18$ = 31.6 |
| R33 = −463.789 | D33 = variable | | |
| R34 = −230.987 | D34 = 1.30 | N19 = 1.772499 | $\nu 19$ = 49.6 |
| R35 = 28.265 | D35 = 3.03 | | |
| R36 = 36.311 | D36 = 3.28 | N20 = 1.846658 | $\nu 20$ = 23.9 |
| R37 = 80.886 | D37 = variable | | |
| R38 = flare cutter | | | |
| variable-distance\focal-length | 29.01 | 68.17 | 293.80 |
| D6 | 1.00 | 24.53 | 49.47 |
| D8 | 8.15 | 11.88 | 14.20 |

-continued

| | | | |
|---|---|---|---|
| D15 | 11.01 | 6.03 | 1.04 |
| D16 | 15.03 | 10.57 | 1.18 |
| D22 | 1.30 | 6.00 | 10.71 |
| D25 | 19.33 | 9.86 | 0.48 |
| D33 | 1.95 | 2.52 | 7.63 |
| D37 | 3.51 | 18.51 | 33.79 |

Aspherical Coefficient
surface 19: A=−0.00000e+00 B=−4.25847e−06 C=−1.01614e−08 D=−4.72845e−11 E=−0.00000e+00
surface 30: A=0.00000e+00 B=1.54192e−06 C=−9.35298e−10 D=−2.63002e−12 E=0.00000e+00

Table 1 shows values of the parameters in the conditional expressions in the numerical examples.

TABLE 1

| | Numerical Example 1 | Numerical Example 2 | Numerical Example 3 | Numerical Example 4 | Numerical Example 5 | Numerical Example 6 |
|---|---|---|---|---|---|---|
| β2bw | 0.372 | 0.267 | 0.342 | 0.137 | 0.422 | 0.404 |
| β2bt | 0.223 | 0.125 | 0.182 | −0.161 | 0.269 | 0.107 |
| 1/β2at | −0.338 | −0.218 | −0.270 | 0.185 | −0.438 | −0.109 |
| logZ2/logZ | 0.585 | 0.572 | 0.605 | 0.672 | 0.505 | 0.609 |
| Dabw | 6.870 | 2.060 | 2.210 | 1.280 | 9.490 | 8.150 |
| Dabt | 10.170 | 5.330 | 5.870 | 6.600 | 13.770 | 14.200 |

As described above, in zoom lenses according to the above-described embodiments of the present invention, there is no concern that the displacement of the focusing lens unit will increase to an excessive degree during focusing.

Next, zoom lenses of forms (seventh through tenth embodiments) different from those of the first through sixth embodiments will be described.

Like the zoom lenses of the first through sixth embodiments, the zoom lenses of the seventh through tenth embodiments are positive lead type zoom lenses, in which a second lens unit of negative refractive power is divided into first and second lens subunits $2a$ and $2b$, focusing being effected with the subunit $2b$.

In the zoom lenses of the seventh through tenth embodiments, a negative lens is arranged on the most object side of the subunit $2a$, and at least one aspheric surface is provided, whereby a reduction in the size of the optical system and a satisfactory optical performance are achieved.

Due to the aspheric surface in the subunit $2a$, the correction of distortion aberration is facilitated. The aspheric surface is formed such that the positive refractive power increases toward the periphery, and is provided on the object-side surface of the lens on the most object side of the subunit $2a$, whereby the negative distortion aberration on the wide-angle side, in particular, can be corrected in a satisfactory manner. Further, a negative refractive power is arranged on the most object side of the second lens unit, and the entrance pupil of the optical system as a whole is shifted toward the object side, whereby the reduction in the size of the front lens is facilitated as in the above-described first through sixth embodiments.

Further, in the zoom lenses of the seventh through tenth embodiments, the following conditions are satisfied in addition to formula (1):

$$0.20 < f1/ft < 0.75 \quad (11)$$

$$-0.40 < f2a/ft < -0.05 \quad (12)$$

$$-0.35 < f2b/ft < -0.05 \quad (13)$$

$$-0.50 < \beta 2bt < 0.50 \quad (14)$$

$$-1.50 < \beta 2t < -0.65 \quad (15)$$

where
f1: focal length of the first lens unit
f2a: focal length of the subunit $2a$
f2b: focal length of the subunit $2b$
ft: focal length of the zoom lens as a whole at the telephoto end
β2bt: magnification of the subunit $2b$ at the telephoto end
β2t: magnification of the second lens unit at the telephoto end.

Formula (11) is a condition determining the focal length of the first lens unit; when the upper limit is exceeded, it is impossible to obtain a sufficient telephoto type at the telephoto end, and it is difficult to secure the requisite F number; when the lower limit is exceeded, the front lens tends to be large, which is undesirable.

Formula (12) is a condition determining the focal length of the subunit 2a; when the upper limit is exceeded, the correction of the negative distortion aberration on the wide-angle side, in particular, is difficult; when the lower limit is exceeded, it is difficult to secure a sufficient variable power ratio. Further, since the focus sensitivity of the subunit $2b$ is reduced, the focus displacement of the subunit $2b$ increases.

Formula (13) is a condition determining the focal length of the subunit $2b$; when the upper limit is exceeded, the negative spherical aberration and coma-aberration generated in the subunit $2b$ increase, so that the fluctuations in aberration as a result of focusing increase; when the lower limit is exceeded, the focus displacement increases, which is not desirable.

Formula (15) is a condition determining the magnification of the second lens unit at the telephoto end; when the upper limit is exceeded, the magnification of the second lens unit (the absolute value thereof) becomes too low, so that, to satisfy the specifications, the relay magnification of the subsequent unit becomes too high, with the result that the aberration correction of the optical system as a whole becomes difficult; when the lower limit is exceeded, the magnification of the second lens group (the absolute value thereof) becomes too high, so that, the residual aberration of the first lens unit is enlarged by the second lens unit, with the result that the aberration cannot be cancelled with the subsequent unit, making it difficult to effect aberration correction on the optical system as a whole. Further, an attempt to make the residual aberration of the first lens unit infinitely close to zero will lead to an increase in the number of lenses of the first lens unit, resulting in an increase in size, which is not desirable.

More preferably, formulas (11) through (15) are set in the following ranges:

$$0.25 < f1/ft < 0.65 \quad (16)$$

$$-0.35 < f2a/ft < -0.05 \quad (17)$$

$$-0.30 < f2b/ft < -0.12 \quad (18)$$

$$-0.10 < \beta 2bt < 0.45 \quad (19)$$

$$-1.20 < \beta 2t < -0.70 \quad (20)$$

Further, in addition to formulas (11) through (15), the zoom lenses of the seventh through tenth embodiments satisfy the following conditions:

$$-1.0 < 1/\beta 2at < 0.5 \tag{21}$$

$$\beta 2bt < \beta 2bw \tag{22}$$

$$0.3 < \log Z2/\log Z < 0.9 \tag{23}$$

Formula (21) is a condition determining the magnification of the subunit 2a at the telephoto end, specifying the upper and lower limit values of formula (4) to the seventh through tenth embodiments to set them in more desirable ranges.

Formulas (22) and (23) are completely the same as formulas (6) and (7), respectively, their effects also being the same.

More preferably, formulas (21) and (23) are set to the following ranges:

$$-0.5 < 1/\beta 2at < 0.1 \tag{24}$$

$$0.45 < \log Z2/\log Z < 0.8 \tag{25}$$

Further, the zoom lenses of the seventh through tenth embodiments satisfy the following condition:

$$Dabw < Dabt \tag{26}$$

where

Dabw: air gap between the subunit 2a and the subunit 2b at the wide-angle end

Dabt: air gap between the subunit 2a and the subunit 2b at the telephoto end.

Formula (26) is completely the same as formula (10), the effects thereof also being the same.

The effects of the above conditional formulas can be obtained by individually satisfying each of them. However, it is naturally more desirable to satisfy all the conditional formulas simultaneously.

The construction of the zoom lenses of the seventh through tenth embodiments will be specifically described.

Figure 15A:
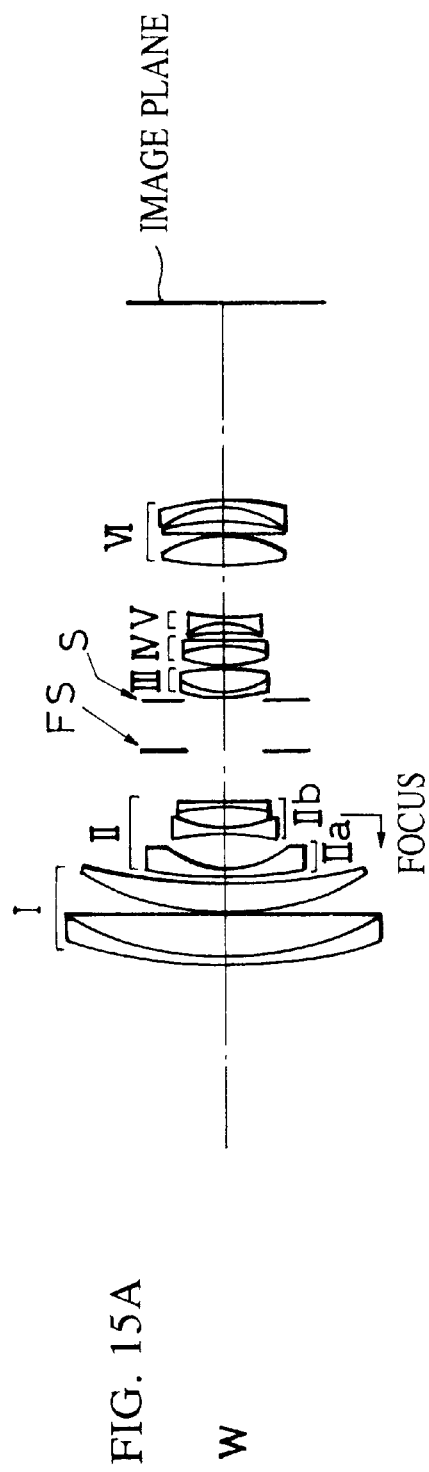
FIGS. 15A, 15B, and 15C are sectional views of a zoom lens according to a seventh embodiment of the present invention.
Figure 15B:
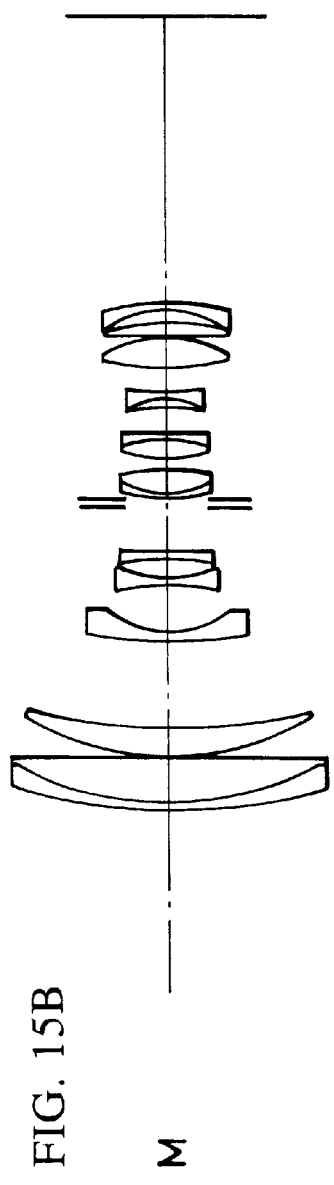
Figure 15C:
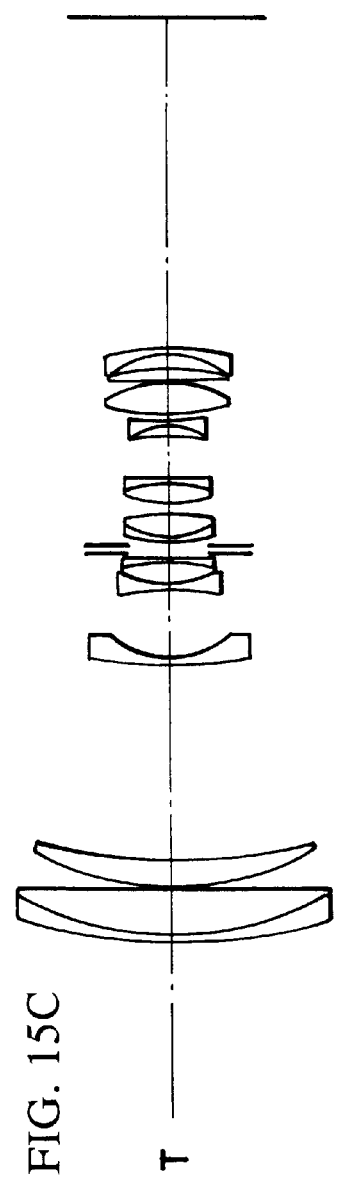

FIGS. 15A, 15B, and 15C are sectional views of the seventh embodiment.

Numeral I indicates a first, positive lens unit, numeral II indicates a second, negative lens unit, numeral IIa indicates a negative subunit 2a, numeral IIb indicates a negative subunit 2b, numeral III indicates a third, positive lens unit, numeral IV indicates a fourth, positive lens unit, numeral V indicates a fifth, negative lens unit, numeral VI indicates a sixth, negative lens unit, symbol FS indicates a movable flare cutter, and symbol S indicates a diaphragm.

When power variation is effected from the wide-angle end to the telephoto end, the first lens unit I moves toward the object, the subunit 2a, indicated by IIa, moves toward the object while increasing the distance between it and the first lens unit I, the subunit 2b, indicated by IIb, moves toward the object while increasing the distance between it and the subunit 2a, indicated by IIa, the third lens unit III moves toward the object while decreasing the distance between it and the second subunit 2b, indicated by IIb, the fourth lens unit IV moves toward the object while increasing the distance between it and the third lens unit III, the fifth lens unit V moves toward the object while increasing the distance between it and the fourth lens unit IV, and the sixth lens unit VI moves toward the object integrally with the third lens unit III while decreasing the distance between it and the fifth lens unit V, the flare cutter moves toward the object while decreasing the distance between it and the subunit 2b, and the diaphragm S moves toward the object integrally with the third lens group III. The subunit 2b, indicated by IIb, is a focus lens unit, and moves toward the object in focusing from an infinite object toward the object in short-range focusing.

FIGS. 16A, 16B, and 16C are sectional views of the eighth embodiment. Numeral I indicates a first, positive lens unit, numeral II indicates a second, negative lens unit, numeral IIa indicates a negative subunit 2a, numeral IIb indicates a negative subunit 2b, numeral III indicates a third, positive lens unit, numeral IV indicates a fourth, positive lens unit, numeral V indicates a fifth, negative lens unit, numeral VI indicates a sixth, positive lens group, symbol FS indicates a movable flare cutter, and symbol S indicates a diaphragm.

When power variation is effected from the wide-angle end to the telephoto end, the first lens unit I moves toward the object, the subunit 2a, indicated by IIa, moves toward the object while increasing the distance between it and the first lens unit I, the subunit 2b, indicated by IIb, moves toward the object while increasing the distance between it and the subunit 2a, indicated by IIa, the third lens unit III moves toward the object while decreasing the distance between it and the second subunit 2b, indicated by IIb, and the fourth lens unit IV moves toward the object while increasing the distance between it and the third lens unit III until the intermediate focus and decreasing the distance between it and the third lens unit III from the intermediate focus to the telephoto end, the fifth lens unit moves toward the object while increasing the distance between it and the fourth lens unit IV, the sixth lens unit VI moves toward the object while decreasing the distance between it and the fifth lens unit V, the flare cutter FS moves toward the object while decreasing the distance between it and the subunit 2b, and the diaphragm S moves toward the object integrally with the third lens unit III. The subunit 2b, indicated by IIb, is a focus lens unit, and moves toward the object in focusing from an infinite object toward the object in short-range focusing.

FIGS. 17A, 17B, and 17C are sectional views of the ninth embodiment. Numeral I indicates a first, positive lens unit, numeral II indicates a second, negative lens unit, numeral IIa indicates a negative subunit 2a, numeral IIb indicates a negative subunit 2b, numeral III indicates a third, positive lens unit, numeral IV indicates a fourth, negative lens unit, numeral V indicates a fifth, positive lens unit, numeral VI indicates a sixth, negative lens unit, symbol S indicates a diaphragm, symbol FS indicates a movable flare cutter, and numeral ST indicates a stationary flare cutter.

When power variation is effected from the wide-angle end to the telephoto end, the first lens unit I moves toward the object, the subunit 2a, indicated by IIa, moves toward the object while increasing the distance between it and the first lens unit I, the subunit 2b, indicated by IIb, moves over in a locus convex toward the object while increasing the distance between it and the subunit 2a, indicated by IIa, the third lens unit III moves toward the object while decreasing the distance between it and the second subunit 2b, indicated by IIb, the fourth lens unit IV moves toward the object while Increasing the distance between it and the third lens unit III, the fifth lens unit V moves toward the object while decreasing the distance between it and the fourth lens unit IV, the sixth lens unit VI moves toward the object while decreasing the distance between it and the fifth lens unit V until the intermediate focus and increasing the distance between it and the fifth lens unit V from the intermediate focus to the telephoto end, the flare cutter FS moves toward the object while decreasing the distance between it and the subunit 2b and enlarging the aperture diameter, the diaphragm S moves toward the object integrally with the third lens unit III, and the stationary flare cutter ST is stationary with respect to the image plane. The subunit 2b, indicated by IIb, is a focus lens unit, and moves toward the object in focusing from an infinite object toward the object in short-range focusing.

FIGS. 18A, 18B, and 18C are sectional views of the tenth embodiment. Numeral I indicates a first, positive lens unit, numeral II indicates a second, negative lens unit, numeral IIa indicates a negative subunit 2a, numeral IIb indicates a negative subunit 2b, numeral III indicates a third, positive lens unit, numeral IV indicates a fourth, positive lens unit, numeral V indicates a fifth, negative lens unit, numeral VI indicates a sixth, positive lens unit, symbol FS indicates a movable flare cutter, and symbol S indicates a diaphragm.

When power variation is effected from the wide-angle end to the telephoto end, the first lens unit I moves toward the object, the subunit 2a, indicated by IIa, moves over in a locus convex toward the object while increasing the distance between it and the first lens unit I, the subunit 2b, indicated by IIb, moves over in a locus convex toward the object while increasing the distance between it and the subunit 2a, indicated by IIa, the third lens unit III moves toward the object while decreasing the distance between it and the second subunit 2b, indicated by IIb, the fourth lens unit IV moves toward the object while increasing the distance between it and the third lens unit III, the fifth lens unit V moves over in a locus convex toward the object while decreasing the distance between it and the fourth lens unit IV, the sixth lens unit VI moves toward the object integrally with the third lens unit III while decreasing the distance between it and the fifth lens unit V, the flare cutter FS moves toward the object while decreasing the distance between it and the subunit 2b, indicated by IIb, and the diaphragm S moves toward the object integrally with the third lens unit III. The subunit 2b, indicated by IIb, is a focus lens unit, and moves toward the object in focusing from an infinite object toward the object in short-range focusing.

Numerical examples of the seventh through tenth embodiments are shown below. Numerical Examples 7 through 10 respectively correspond to the seventh through tenth embodiments.

FIGS. 19A(1)–19B(12) through 22A(1)–22B(12) are aberration diagrams, which, like FIGS. 15 through 18, correspond to the seventh through tenth embodiments.

NUMERICAL EXAMPLE 7

| f = 28.90–193.24 | $F_{no}$ = 3.60–5.75 | 2ω = 73.6–12.8 | |
|---|---|---|---|
| R1 = 110.462 | D1 = 1.50 | N1 = 1.846658 | ν1 = 23.9 |
| R2 = 65.858 | D2 = 9.62 | N2 = 1.569070 | ν2 = 71.3 |
| R3 = 3801.583 | D3 = 0.20 | | |
| R4 = 57.450 | D4 = 6.76 | N3 = 1.712995 | ν3 = 53.9 |
| R5 = 153.053 | D5 = variable | | |
| *R6 = 98.252 | D6 = 1.70 | N4 = 1.696797 | ν4 = 55.5 |
| R7 = 20.065 | D7 = variable | | |
| R8 = −53.136 | D8 = 1.10 | N5 = 1.882997 | ν5 = 40.8 |
| R9 = 23.560 | D9 = 0.52 | | |
| R10 = 24.222 | D10 = 4.12 | N6 = 1.846660 | ν6 = 23.8 |
| R11 = −48.645 | D11 = 0.40 | | |
| R12 = −35.185 | D12 = 1.00 | N7 = 1.882997 | ν7 = 40.8 |
| R13 = 278.283 | D13 = variable | | |
| R14 = movable flare cutter | D14 = variable | | |
| R15 = diaphragm | D15 = 0.39 | | |
| R16 = 29.436 | D16 = 1.00 | N8 = 1.846660 | ν8 = 23.8 |
| R17 = 16.511 | D17 = 5.42 | N9 = 1.696797 | ν9 = 55.5 |
| R18 = −45.131 | D18 = variable | | |
| R19 = 27.883 | D19 = 4.52 | N10 = 1.487490 | ν10 = 70.2 |
| R20 = −25.709 | D20 = 1.00 | N11 = 1.882997 | ν11 = 40.8 |
| R21 = 368.478 | D21 = variable | | |
| R22 = −33.741 | D22 = 2.25 | N12 = 1.846660 | ν12 = 23.8 |
| R23 = −14.714 | D23 = 1.00 | N13 = 1.712995 | ν13 = 53.9 |
| R24 = 97.111 | D24 = variable | | |
| R25 = 62.233 | D25 = 6.63 | N14 = 1.563839 | ν14 = 60.7 |
| R26 = −25.157 | D26 = 0.20 | | |
| R27 = −1590.680 | D27 = 2.76 | N15 = 1.487490 | ν15 = 70.2 |
| *R28 = −44.310 | D28 = 3.13 | | |
| R29 = −21.158 | D29 = 1.40 | N16 = 1.846658 | ν16 = 23.9 |
| R30 = −50.050 | | | |
| variable-distance\focal-length | 28.90 | 67.79 | 193.24 |
| D5 | 1.00 | 18.64 | 42.21 |
| D7 | 7.97 | 10.57 | 15.25 |
| D13 | 11.39 | 10.27 | 1.13 |
| D14 | 11.24 | 1.38 | 1.49 |
| D18 | 0.80 | 2.27 | 2.42 |
| D21 | 1.80 | 6.06 | 9.55 |
| D24 | 11.46 | 5.73 | 2.09 |

Aspherical Coefficient surface 6: $A=0.00000e+00$ $B=2.78935e-06$ $C=-4.14745e-09$ $D=8.35869e-12$ $E=3.40595e-15$ surface 28: $A=0.00000e+00$ $B=7.15437e-06$ $C=-1.89273e-11$ $D=8.90354e-11$ $E=-2.70570e-13$

NUMERICAL EXAMPLE 8

| f = 28.90–193.17 | $F_{no}$ = 3.58–5.75 | 2ω = 73.6–12.8 | |
|---|---|---|---|
| R1 = 117.085 | D1 = 2.00 | N1 = 1.846659 | ν1 = 23.8 |
| R2 = 69.555 | D2 = 10.59 | N2 = 1.592400 | ν2 = 68.3 |
| R3 = −400.829 | D3 = 0.15 | | |
| R4 = 58.695 | D4 = 5.12 | N3 = 1.712995 | ν3 = 53.8 |
| R5 = 110.569 | D5 = variable | | |
| *R6 = 116.203 | D6 = 1.20 | N4 = 1.772499 | ν4 = 49.6 |
| R7 = 24.948 | D7 = variable | | |
| R8 = −51.434 | D8 = 1.10 | N5 = 1.834807 | ν5 = 42.7 |
| R9 = 25.950 | D9 = 0.67 | | |
| R10 = 25.829 | D10 = 4.42 | N6 = 1.846659 | ν6 = 23.8 |
| R11 = −52.258 | D11 = 0.28 | | |
| R12 = −42.033 | D12 = 1.10 | N7 = 1.834807 | ν7 = 42.7 |
| R13 = 78.563 | D13 = variable | | |
| R14 = movable flare cutter | D14 = variable | | |
| R15 = diaphragm | D15 = 0.30 | | |
| R16 = 31.898 | D16 = 1.00 | N8 = 1.846659 | ν8 = 23.8 |
| R17 = 17.393 | D17 = 5.26 | N9 = 1.639300 | ν9 = 44.9 |
| R18 = −57.523 | D18 = variable | | |
| R19 = 24.876 | D19 = 5.04 | N10 = 1.487490 | ν10 = 70.2 |
| R20 = −35.107 | D20 = 1.00 | N11 = 1.846659 | ν11 = 23.8 |
| R21 = −439.995 | D21 = variable | | |
| R22 = −63.863 | D22 = 3.51 | N12 = 1.846660 | ν12 = 23.8 |
| R23 = −17.080 | D23 = 1.00 | N13 = 1.772499 | ν13 = 49.6 |
| R24 = 62.417 | D24 = variable | | |
| R25 = 101.234 | D25 = 4.89 | N14 = 1.583126 | ν14 = 59.4 |
| *R26 = −32.722 | D26 = 0.15 | | |
| R27 = −215.499 | D27 = 2.82 | N15 = 1.516330 | ν15 = 64.2 |
| R28 = −37.755 | D28 = 5.20 | | |
| R29 = −17.384 | D29 = 1.80 | N16 = 1.846659 | ν16 = 23.8 |
| R30 = −30.941 | | | |
| variable-distance\focal-length | 28.90 | 74.72 | 193.17 |
| D5 | 1.00 | 21.70 | 42.28 |
| D7 | 8.27 | 10.85 | 15.61 |
| D13 | 11.61 | 4.80 | 1.56 |
| D14 | 14.49 | 8.77 | 1.46 |
| D18 | 0.80 | 3.19 | 0.99 |
| D21 | 1.80 | 5.85 | 6.89 |
| D24 | 12.34 | 6.41 | 2.09 |

Aspherical Coefficient surface 6: $A=0.00000e+00$ $B=1.21212e-06$ $C=-2.25771e-09$ $D=8.60639e-12$ $E=-1.05530e-14$ surface 26: $A=0.00000e+00$ $B=-2.22453e-06$ $C=-2.75194e-08$ $D=1.02088e-10$ $E=-5.33539e-13$

NUMERICAL EXAMPLE 9

| f = 29.01–293.62 | $F_{no}$ = 3.37–5.85 | 2ω = 73.4–8.4 | |
|---|---|---|---|
| R1 = 105.399 | D1 = 2.90 | N1 = 1.846658 | ν1 = 23.9 |
| R2 = 65.146 | D2 = 0.69 | | |
| R3 = 66.481 | D3 = 9.60 | N2 = 1.592400 | ν2 = 68.3 |
| R4 = 2247.452 | D4 = 0.15 | | |
| R5 = 77.227 | D5 = 5.78 | N3 = 1.729157 | ν3 = 54.7 |
| R6 = 296.702 | D6 = variable | | |
| *R7 = −211.721 | D7 = 1.50 | N4 = 1.772499 | ν4 = 49.6 |
| R8 = 22.555 | D8 = variable | | |
| R9 = −1356.061 | D9 = 2.93 | N5 = 1.805181 | ν5 = 25.4 |
| R10 = −42.608 | D10 = 1.00 | N6 = 1.882997 | ν6 = 40.8 |
| R11 = 55.575 | D11 = 0.15 | | |
| R12 = 44.532 | D12 = 3.20 | N7 = 1.846660 | ν7 = 23.8 |
| R13 = −691.545 | D13 = 1.54 | | |
| R14 = −46.696 | D14 = 1.10 | N8 = 1.882997 | ν8 = 40.8 |
| R15 = −3613.461 | D15 = variable | | |
| R16 = movable flare cutter | D16 = variable | | |
| R17 = diaphragm | D17 = 0.00 | | |
| R18 = 44.529 | D18 = 5.15 | N9 = 1.603112 | ν9 = 60.7 |
| *R19 = −62.539 | D19 = 0.15 | | |
| R20 = 48.533 | D20 = 7.54 | N10 = 1.696797 | ν10 = 55.5 |
| R21 = −24.694 | D21 = 1.15 | N11 = 2.022040 | ν11 = 29.1 |
| R22 = −121.827 | D22 = variable | | |
| R23 = −89.876 | D23 = 4.80 | N12 = 1.846660 | ν12 = 23.8 |
| R24 = −18.504 | D24 = 1.10 | N13 = 1.834807 | ν13 = 42.7 |
| R25 = 65.409 | D25 = variable | | |
| R26 = 50.719 | D26 = 1.50 | N14 = 1.846660 | ν14 = 23.8 |
| R27 = 28.316 | D27 = 8.11 | N15 = 1.603112 | ν15 = 60.7 |
| R28 = −50.456 | D28 = 0.15 | | |
| R29 = 401.413 | D29 = 4.91 | N16 = 1.516330 | ν16 = 64.2 |
| *R30 = −41.026 | D30 = 0.15 | | |
| R31 = 146.253 | D31 = 8.05 | N17 = 1.639799 | ν17 = 34.5 |
| R32 = −22.289 | D32 = 1.20 | N18 = 1.901355 | ν18 = 31.6 |
| R33 = −307.942 | D33 = variable | | |
| R34 = −98.739 | D34 = 1.30 | N19 = 1.882997 | ν19 = 40.8 |
| R35 = 41.939 | D35 = 1.12 | | |
| R36 = 34.991 | D36 = 2.85 | N20 = 1.846658 | ν20 = 23.9 |
| R37 = 58.689 | D37 = variable | | |
| R38 = stationary flare cutter | | | |

| variable-distance\focal-length | 29.01 | 66.33 | 293.62 |
|---|---|---|---|
| D6 | 1.00 | 24.47 | 49.93 |
| D8 | 7.60 | 12.96 | 17.88 |
| D15 | 13.30 | 7.65 | 0.47 |
| D16 | 17.85 | 12.17 | 1.16 |
| D22 | 1.30 | 6.37 | 11.00 |
| D25 | 22.28 | 12.98 | 0.46 |
| D33 | 2.04 | 0.47 | 7.56 |
| D37 | 2.13 | 20.18 | 38.55 |

Aspherical Coefficient surface 7: A=0.00000e+00 B=4.85872e−06 C=−2.45613e−09 D=2.05320e−11 E=−9.53801e−14 F=1.22963e−16 surface 19: A=−0.00000e+00 B=3.36075e−07 C=−5.40669e−09 D=−1.19043e−11 E=−0.00000e+00 surface 30: A=0.00000e+00 B=3.98970e−06 C=5.13108e−09 D=−2.36767e−11 E=0.00000e+00

NUMERICAL EXAMPLE 10

| f = 28.90–130.81 | $F_{no}$ = 3.60–5.75 | 2ω = 73.6–18.8 | |
|---|---|---|---|
| R1 = 125.660 | D1 = 1.50 | N1 = 1.846660 | ν1 = 23.8 |
| R2 = 63.983 | D2 = 8.18 | N2 = 1.622992 | ν2 = 58.2 |
| R3 = −2908.494 | D3 = 0.20 | | |
| R4 = 45.133 | D4 = 6.40 | N3 = 1.712995 | ν3 = 53.9 |
| R5 = 111.631 | D5 = variable | | |
| *R6 = 158.004 | D6 = 1.70 | N4 = 1.772499 | ν4 = 49.6 |
| R7 = 24.066 | D7 = variable | | |
| R8 = −121.300 | D8 = 1.10 | N5 = 1.882997 | ν5 = 40.8 |
| R9 = 20.782 | D9 = 2.83 | | |
| R10 = 24.864 | D10 = 3.76 | N6 = 1.846660 | ν6 = 23.8 |
| R11 = −67.923 | D11 = 0.08 | | |
| R12 = −63.426 | D12 = 1.00 | N7 = 1.882997 | ν7 = 40.8 |
| R13 = 57.613 | D13 = variable | | |
| R14 = movable flare cutter | D14 = variable | | |
| R15 = diaphragm | D15 = 0.39 | | |
| R16 = 28.480 | D16 = 1.00 | N8 = 1.846660 | ν8 = 23.8 |
| R17 = 14.559 | D17 = 5.20 | N9 = 1.696797 | ν9 = 55.5 |
| R18 = −43.893 | D18 = variable | | |
| R19 = 28.417 | D19 = 4.04 | N10 = 1.516330 | ν10 = 64.1 |
| R20 = −26.283 | D20 = 1.00 | N11 = 1.882997 | ν11 = 40.8 |
| R21 = 181.303 | D21 = variable | | |
| R22 = −59.195 | D22 = 2.61 | N12 = 1.846660 | ν12 = 23.8 |
| R23 = −14.290 | D23 = 1.00 | N13 = 1.772499 | ν13 = 49.6 |
| R24 = 57.734 | D24 = variable | | |
| R25 = 61.833 | D25 = 6.37 | N14 = 1.583126 | ν14 = 59.4 |
| *R26 = −29.255 | D26 = 0.20 | | |
| R27 = 92.873 | D27 = 5.11 | N15 = 1.570989 | ν15 = 50.8 |
| R28 = −31.972 | D28 = 2.07 | | |
| R29 = −23.212 | D29 = 1.40 | N16 = 1.846660 | ν16 = 23.8 |
| R30 = 4315.550 | | | |

| variable-distance\focal-length | 28.90 | 61.48 | 130.81 |
|---|---|---|---|
| D5 | 1.00 | 12.71 | 29.68 |
| D7 | 6.63 | 9.38 | 12.01 |
| D13 | 10.87 | 8.85 | 1.68 |
| D14 | 10.32 | 2.50 | 1.53 |
| D18 | 0.80 | 2.95 | 3.90 |
| D21 | 1.80 | 5.43 | 9.19 |
| D24 | 12.58 | 6.81 | 2.10 |

Aspherical Coefficient surface 6: A=0.00000e+00 B=1.99338e−06 C=1.68526e−10 D=0.00000e+00 E=0.00000e+00 surface 26: A=0.00000e+00 B=5.05093e−06 C=−2.17169e−10 D=3.36024e−11 E=−1.92890e−13

Table 2 shows values of the parameters in the conditional expressions in Numerical Examples 7 through 10.

TABLE 2

| | Numerical Example 1 | Numerical Example 2 | Numerical Example 3 | Numerical Example 4 |
|---|---|---|---|---|
| f1/ft | 0.4642 | 0.4760 | 0.3205 | 0.5827 |
| f2a/ft | −0.1889 | −0.2140 | −0.0896 | −0.2825 |
| f2b/ft | −0.1729 | −0.1723 | −0.2041 | −0.2519 |
| β2bt | 0.0391 | −0.0027 | 0.3329 | 0.0297 |
| β2t | −0.8239 | −0.8024 | −0.8899 | −0.8190 |
| 1/β2at | −0.0475 | 0.0034 | −0.3741 | −0.0363 |
| logZ2/logZ | 0.5946 | 0.5807 | 0.5214 | 0.7443 |

By constructing the zoom lens as described above, it is easy to achieve a reduction in the size of the entire optical system, to simplify the structure of the lens barrel for focusing, to achieve a reduction in cost, etc. Further, even in focusing in tight close-up photographing, there is no concern that the displacement of the focus lens unit will increase to an excessive degree.

Figure 14:
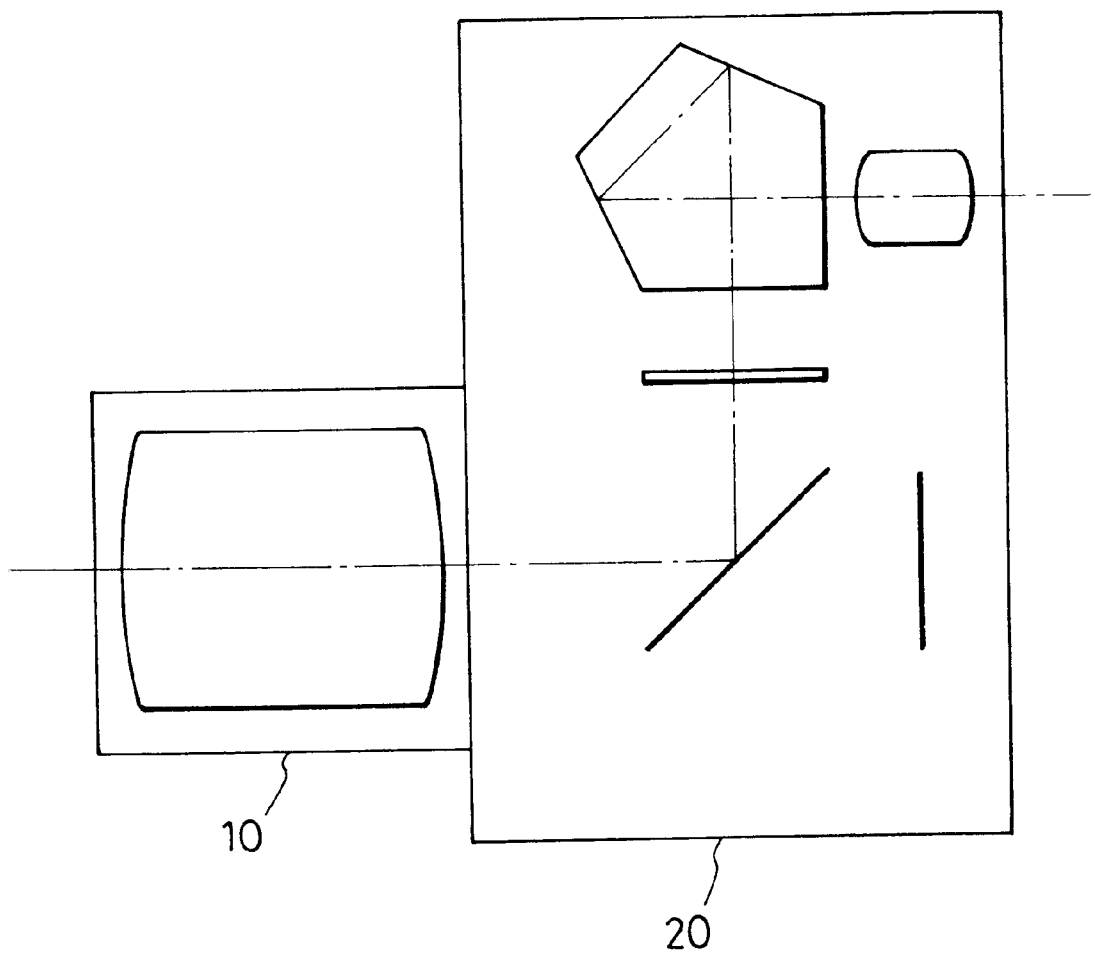
FIG. 14 is a schematic diagram showing the essential part of a single-lens reflex camera equipped with a zoom lens according to the present invention.

FIG. 14 shows an example of a single-lens reflex camera equipped with a zoom lens according to the present invention. In the drawing, numeral 10 indicates a zoom lens according to the present invention, and numeral 20 indicates a camera body (which supports the zoom lens). In this way, the zoom lens of the present invention is suitable for use in optical apparatus, such as single-lens reflex cameras and video cameras, for example.

Except as otherwise disclosed herein, the various components shown in outline in block form in the figures are individually well-known and their internal construction and operation are not critical either to the making or using of this invention or to a description of the best mode of the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens comprising, in order from a long conjugate side:
    a first lens unit of positive refractive power;
    a second lens unit of negative refractive power, said second lens unit comprising a first lens subunit of negative refractive power and a second lens subunit of negative refractive power which is closer to a short conjugate side than said first lens subunit, focusing being performed by moving said second lens subunit in the optical axis direction while keeping said first lens subunit stationary; and
    a subsequent lens unit comprising at least one lens unit, said subsequent lens unit being of positive refractive power as a whole,
    wherein, when a variation in power is effected from a wide-angle end to a telephoto end, a distance between said first lens unit and said second lens unit increases and a distance between said second lens unit and said subsequent lens unit decreases, and
    wherein, assuming that the magnification of said second lens subunit at the wide-angle end is β2bw, the following condition is satisfied:

$0 < \beta 2bw < 1$.

2. A zoom lens according to claim 1, wherein the following condition is satisfied:

$-0.8 < \beta 2bt < 0.8$ where β2bt is the magnification of said second lens subunit at the telephoto end.

3. A zoom lens according to claim 1, wherein the following condition is satisfied:

$0 < \beta 2bw < 0.5$.

4. A zoom lens according to claim 1, wherein the following conditions are satisfied:

$-2 < 1/\beta 2at < 0.9$ $-0.5 < \beta 2bt < 0.8$ $\beta 2bt < \beta 2bw$ $0.3 < \log Z2/\log Z < 0.9$ where
    $Z2 = \beta 2t/\beta 2w$
    $Z = ft/fw$ β2at: magnification of said first lens subunit at the telephoto end
β2w: magnification of said second lens unit at the wide-angle end
β2bt: magnification of said second lens subunit at the telephoto end
fw: focal length of said zoom lens as a whole at the wide-angle end
ft: focal length of said zoom lens as a whole at the telephoto end.

5. A zoom lens according to claim 4, wherein the following conditions are satisfied:

$-0.9 < 1/\beta 2at < 0.5$ $-0.3 < \beta 2bt < 0.3$

6. A zoom lens according to claim 1, wherein the following condition is satisfied:

Dabw<Dabt where
    Dabw: air gap between said first lens subunit and said second lens subunit at the wide-angle end
    Dabt: air gap between said first lens subunit and said second lens subunit at the telephoto end.

7. An optical apparatus comprising:
    a zoom lens as claimed in any one of claims 1 through 6; and
    a member for supporting said zoom lens.

8. A zoom lens according to claim 1, wherein said first lens subunit is equipped with at least one aspheric surface and has a lens of negative refractive power on the most object side.

9. A zoom lens according to claim 8, wherein the following conditions are satisfied:

$0.20 < f1/ft < 0.75$ $-0.40 < f2a/ft < -0.05$ $-0.35 < f2b/ft < -0.05$ $-0.50 < \beta 2bt < 0.50$ $-1.50 < \beta 2t < -0.65$ where
    f1: focal length of said first lens unit
    f2a: focal length of said first lens subunit
    f2b: focal length of said second lens subunit
    ft: focal length of said zoom lens as a whole at the telephoto end
    β2bt: magnification of said second lens subunit at the telephoto end
    β2t: magnification of said second lens unit at the telephoto end.

10. A zoom lens according to claim 8, wherein the following conditions are satisfied:

$-1.0 < 1/\beta 2at < 0.5$ $\beta 2bt < \beta 2bw$ $0.3 < \log Z2/\log Z < 0.9$ where Z2=β2bt/β2bw Z=ft/fw β2at: magnification of said first lens subunit at the telephoto end β2bt: magnification of said second lens subunit at the telephoto end β2bw: magnification of said second lens unit at the wide-angle end fw: focal length of said zoom lens as a whole at the wide-angle end.

11. An optical apparatus comprising:

a zoom lens as claimed in any one of claims 8 through 10, and a member for supporting said zoom lens.

12. A zoom lens comprising, in order from the object side to the image side:

a first lens unit of positive refractive power;

a second lens unit of negative refractive power, said second lens unit comprising, in order from the object side to the image side, a first lens subunit of negative refractive power and a second lens subunit of negative refractive power, focusing being performed by moving said second lens subunit in the optical axis direction while keeping said first lens subunit stationary; and one or more lens units having, as a whole, positive refractive power, wherein, when variation in power is effected from a wide-angle end to a telephoto end, a distance between said first lens unit and said second lens unit increases and a distance between said second lens unit and said one or more lens units decreases, and wherein, assuming that the magnification of said second lens subunit at the wide-angle end is β2bw, the following condition is satisfied:

0<β2bw<1.

13. A zoom lens according to claim 12, wherein said one or more lens units comprises, in order from the object side to the image side, a third lens unit of positive refractive power, a fourth lens unit of negative refractive power, and a fifth lens unit of positive refractive power.

14. A zoom lens according to claim 13, wherein when variation in power is effected from the wide-angle end to the telephoto end, (a) said first lens unit, said first lens subunit, said second lens subunit, said third lens unit, said fourth lens unit, and said fifth lens unit move toward the object side, and (b) a distance between said second lens unit and said third lens unit decreases, a distance between said third lens unit and said fourth lens unit increases, and a distance between said fourth lens unit and said fifth lens unit decreases.

15. A zoom lens according to claim 14, wherein said third lens unit and said fifth lens unit move integrally.

16. A zoom lens according to claim 12, wherein said one or more lens units comprises, in order from the object side to the image side, a third lens unit of positive refractive power and a fourth lens unit of positive refractive power.

17. A zoom lens according to claim 13, wherein when variation in power is effected from the wide-angle end to the telephoto end, (a) said first lens unit, said first lens subunit, said second lens subunit, said third lens unit, and said fourth lens unit move toward the object side, and (b) a distance between said second lens unit and said third lens unit decreases and a distance between said third lens unit and said fourth lens unit decreases.

18. A zoom lens according to claim 12, wherein said one or more lens units comprises, in order from the object side to the image side, a third lens unit of positive refractive power, a fourth lens unit of negative refractive power, and a fifth lens unit of positive refractive power, and wherein when variation in power is effected from the wide-angle end to the telephoto end, (a) said first lens unit, said first lens subunit, said third lens unit, said fourth lens unit, and said fifth lens unit move toward the object side, and said second lens subunit moves in a locus convex toward the object side, and (b) a distance between said second lens unit and said third lens unit decreases, a distance between said third lens unit and said fourth lens unit increases, and a distance between said fourth lens unit and said fifth lens unit decreases.

19. A zoom lens according to claim 12, further comprising a diaphragm disposed between said second lens unit and said third lens unit.

20. A zoom lens according to claim 12, wherein said one or more lens units comprises, in order from the object side to the image side, a third lens unit of positive refractive power, a fourth lens unit of negative refractive power, a fifth lens unit of positive refractive power, and a sixth lens unit of positive refractive power, and wherein when variation in power is effected from the wide-angle end to the telephoto end, (a) said first lens unit, said first lens subunit, said second lens subunit, said third lens unit, said fourth lens unit, said fifth lens unit, and said sixth lens unit move toward the object side, and (b) a distance between said second lens unit and said third lens unit decreases, a distance between said third lens unit and said fourth lens unit increases, a distance between said fourth lens unit and said fifth lens unit decreases, and a distance between said fifth lens unit and said sixth lens unit increases.

21. A zoom lens according to claim 20, further comprising a first diaphragm and a second diaphragm disposed between said second lens unit and said third lens unit, wherein when variation in power is effected from the wide-angle end to the telephoto end, said first diaphragm moves toward the object side and a distance between said second lens subunit and said first diaphragm decreases.

22. A zoom lens according to claim 21, further comprising a flare cutter disposed at the object side of said sixth lens unit and being stationary with respect to the image plane during zooming.

23. A zoom lens according to claim 12, wherein a most object-side lens of said first lens subunit is a negative meniscus lens convex toward the object side.

24. A zoom lens according to claim 12, wherein said second lens subunit is composed of, in order from the object side to the image side, one of (a) a biconcave negative lens, a biconvex positive lens, and a biconcave negative lens, and (b) a meniscus positive lens convex toward the image side, a biconcave negative lens, and a biconcave negative lens.

* * * * *

UNITED STATES PATENT AND TRADEMARK OFFICE
CERTIFICATE OF CORRECTION

PATENT NO. : 6,147,810
DATED : November 14, 2000
INVENTOR(S) : Makoto Misaka

It is certified that error appears in the above-identified patent and that said Letters Patent is hereby corrected as shown below:

Column 2,
Line 8, "In" should read -- in --.

Column 3,
Line 23, "In" should read -- in --.

Column 4,
Line 40, "FIG." should read -- FIGS. --.

Column 5,
Line 7, "Is" should read -- is --.

Column 8,
Line 25, "Is" should read -- is --.

Column 12,
Line 27, "Numerical Example 6" should read
-- Aspherical coefficient
   surface 18: A=-0.00000e+00 B=2.31211e-06 C=-4.22675e-09
        D=-4.34007e-11 E=-0.00000e+00
   surface 29: A=0.00000e+00 B=2.11082e-06 C=-1.33353e-09
        D=4.20637e-12 E=0.00000e+00
        Numerical Example 6 --.

Column 16,
Line 53, "Increasing" should read -- increasing --.

Signed and Sealed this

Twenty-second Day of January, 2002

Attest:

*Attesting Officer*

JAMES E. ROGAN
*Director of the United States Patent and Trademark Office*